US012081326B2

(12) United States Patent
Yang et al.

(10) Patent No.: US 12,081,326 B2
(45) Date of Patent: Sep. 3, 2024

(54) METHOD AND APPARATUS FOR DETERMINING A TRANSPORT BLOCK SIZE (TBS)

(71) Applicant: HUAWEI TECHNOLOGIES CO., LTD., Guangdong (CN)

(72) Inventors: Hongjian Yang, Beijing (CN); Lei Guan, Beijing (CN); Jinhuan Xia, Beijing (CN); Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 17/489,327

(22) Filed: Sep. 29, 2021

(65) Prior Publication Data

US 2022/0021474 A1 Jan. 20, 2022

Related U.S. Application Data

(63) Continuation of application No. PCT/CN2019/116699, filed on Nov. 8, 2019.

(30) Foreign Application Priority Data

Mar. 29, 2019 (WO) ................ PCT/CN2019/080674
Sep. 12, 2019 (WO) ................ PCT/CN2019/105790

(51) Int. Cl.
*H04L 1/00* (2006.01)
*H04L 27/26* (2006.01)
(Continued)

(52) U.S. Cl.
CPC .......... *H04L 1/0003* (2013.01); *H04L 1/0009* (2013.01); *H04L 27/2605* (2013.01); *H04W 72/044* (2013.01); *H04W 72/30* (2023.01)

(58) Field of Classification Search
CPC . H04L 1/0003; H04L 1/0009; H04L 27/2605; H04L 1/0016; H04L 27/2602; H04W 72/30; H04W 72/044
See application file for complete search history.

(56) References Cited

U.S. PATENT DOCUMENTS 8,284,732 B2 10/2012 Nimbalker et al.
2013/0329661 A1 12/2013 Chen et al.
(Continued)

FOREIGN PATENT DOCUMENTS

CN 101640579 A 2/2010
CN 102448122 A 5/2012
(Continued)

OTHER PUBLICATIONS

Extended European Search Report issued in European Application No. 19922660.6 on Mar. 25, 2022, 14 pages.
(Continued)

*Primary Examiner* — Ian N Moore
*Assistant Examiner* — Latresa A McCallum
(74) *Attorney, Agent, or Firm* — Fish & Richardson P.C.

(57) ABSTRACT

The present disclosure relates to transport block size (TBS) determining methods and apparatus. One example TBS determining method includes determining a second intermediate variable based on a determined TBS index, a frequency domain resource occupied by a first broadcast channel, and a second table, and determining a TBS based on the second intermediate variable and a scale factor, where the scale factor is greater than 1.

13 Claims, 12 Drawing Sheets

(51) Int. Cl.
*H04W 72/044* (2023.01)
*H04W 72/30* (2023.01)

(56) References Cited

U.S. PATENT DOCUMENTS

| | | | |
|---|---|---|---|
| 2015/0146811 A1 | 5/2015 | Wong et al. | |
| 2015/0271794 A1 | 9/2015 | Kang et al. | |
| 2017/0135098 A1 | 5/2017 | Kang et al. | |
| 2017/0207878 A1* | 7/2017 | Chen | H04L 5/0096 |
| 2017/0311286 A1 | 10/2017 | Yi et al. | |
| 2019/0229836 A1* | 7/2019 | Perotti | H04L 1/206 |
| 2019/0327730 A1* | 10/2019 | Sandberg | H04L 1/1893 |
| 2021/0211232 A1 | 7/2021 | Hwang et al. | |

FOREIGN PATENT DOCUMENTS

| | | | | |
|---|---|---|---|---|
| CN | 103378924 A | 10/2013 | | |
| CN | 103534969 A | 1/2014 | | |
| CN | 103580776 A | 2/2014 | | |
| CN | 104272603 A | 1/2015 | | |
| CN | 107306453 A | 10/2017 | | |
| CN | 108353285 A | 7/2018 | | |
| CN | 108462556 A | 8/2018 | | |
| CN | 108781454 A | 11/2018 | | |
| CN | 109150370 A | 1/2019 | | |
| CN | 109152052 A | 1/2019 | | |
| CN | 109495968 A | 3/2019 | | |
| WO | WO-2014137525 A1 * | 9/2014 | | H04L 1/0003 |
| WO | 2017166078 A1 | 10/2017 | | |
| WO | 2018174564 A1 | 9/2018 | | |

OTHER PUBLICATIONS

Huawei, HiSilicon, "On new numerologies for PMCH to support rooftop reception," 3GPP TSG RAN WGI Meeting #98, R1-1908093, Prague, Czech Republic, Aug. 26-30, 2019, 6 pages.

Qualcomm Incorporated, "New WID on LTE-based 5G terrestrial broadcast," 3GPP TSG RAN Meeting #83, RP-190732, Shenzhen, China, Mar. 18-21, 2019, 6 pages.

Office Action issued in Chinese Application No. 201980094995.3 on May 6, 2022, 9 pages.

PCT International Search Report and Written Opinion issued in International Application No. PCT/CN2019/080674 on Jan. 2, 2020, 15 pages (with English translation).

PCT International Search Report and Written Opinion issued in International Application No. PCT/CN2019/105790 on Dec. 27, 2019, 15 pages (with English translation).

PCT International Search Report and Written Opinion issued in International Application No. PCT/CN2019/116699 on Jan. 2, 2020, 15 pages (with English translation).

Office Action issued in Chinese Application No. 201980094995.3 on Oct. 10, 2022, 7 pages.

Ma, "Development and Research of Adaptive Link Technology on TD-LTE Protocol Analysis Instrument," Thesis for the degree of Master, Beijing University of Posts and Telecommunication, Nov. 4, 2014, 66 pages (with English abstract).

Huawei et al., "Discussion on modified MCS table with TBS scaling factor 1," 3GPP TSG RAN WG1 Meeting #92, R1-1801421, Athens, Greece, Feb. 26-Mar. 2, 2018, 4 pages.

* cited by examiner

METHOD AND APPARATUS FOR DETERMINING A TRANSPORT BLOCK SIZE (TBS)

CROSS-REFERENCE TO RELATED APPLICATIONS

This application is a continuation of International Application No. PCT/CN2019/116699, filed on Nov. 8, 2019, which claims priority to International Patent Application No. PCT/CN2019/080674, filed on Mar. 29, 2019, and International Patent Application No. PCT/CN2019/105790, filed on Sep. 12, 2019. All of the aforementioned patent applications are hereby incorporated by reference in their entireties.

TECHNICAL FIELD

This application relates to the field of wireless communication technologies, and in particular, to a transport block size (Transport Block Size, TBS) determining method and apparatus.

BACKGROUND

To support a multimedia broadcast multicast service single frequency network (Multimedia Broadcast multicast service Single Frequency Network, MBSFN) to provide a broadcast service for user equipment (User Equipment, UE) in a larger coverage area, a new work item (Work Item, WI), namely, LTE-based 5th generation (5th-Generation, 5G) terrestrial broadcasting is introduced in long term evolution (Long Term Evolution, LTE) R (Release, release) 16, where one of important work items is standardization of a new numerology (numerology) whose cyclic prefix (Cyclic prefix, CP) length exceeds 300 μs. As shown in FIG. 1, a complete orthogonal frequency division multiplexing (Orthogonal Frequency Division Multiplexing, OFDM) symbol includes a CP and an OFDM symbol.

When a length of an existing subframe is 1 ms, the UE determines a modulation order and a TBS index based on a first table and an MCS index that is of a physical multicast channel (Physical Multicast Channel, PMCH) and that is configured at a higher layer. The first table shows a correspondence between the MCS index, the modulation order, and the TBS index. The UE determines a TBS based on the TBS index, a quantity of resource blocks (Resource Block, RB), and a second table. The quantity of RBs is a total quantity of downlink (DL) RBs. The second table shows a correspondence between the TBS index, the quantity of RBs, and the TBS.

The CP length of the new numerology introduced in the R16 WI exceeds 300 μs, a length of a symbol excluding a CP exceeds 2.4 milliseconds (ms), and a length of an entire OFDM symbol exceeds 2.7 ms. In this case, a length of a subframe exceeds 2.7 ms and is greater than an existing subframe in LTE, whose length is 1 ms. However, an amount of data transmitted within 1 ms is determined in a conventional manner. For a numerology whose symbol length exceeds 1 ms, an amount of data configured in the conventional manner is at most the amount of data transmitted within 1 ms. Consequently, a TBS configured by using a numerology whose symbol length exceeds 1 ms in the MBSFN is relatively small, and an amount of data transmitted in each subframe is relatively small, limiting a signal transmission rate of a system.

SUMMARY

This application provides a TBS determining method and apparatus, to resolve a problem that a signal transmission rate of a system is limited in a conventional technology.

According to a first aspect, a TBS determining method is provided, including the following process:

A communication device determines, based on a modulation and coding scheme MCS corresponding to a first broadcast channel and a frequency domain resource occupied by the first broadcast channel, a TBS corresponding to the first broadcast channel in one or more of the following manners:

The communication device determines a first TBS index based on an index of the MCS and a first table, determines a first intermediate variable based on the first TBS index, the frequency domain resource, and a second table, and determines the TBS based on the first intermediate variable and a third table, where the first table includes a correspondence between the MCS index and the TBS index, the second table includes a correspondence between the frequency domain resource, the TBS index, and the first intermediate variable, the third table includes a correspondence between the TBS and the first intermediate variable, the third table is corresponding to a TBS table in which a quantity of layers to which a transport block is mapped is greater than 1, and a quantity of layers to which a transport block carried on the first broadcast channel is mapped is 1;

the communication device determines a first TBS index based on an index of the MCS and a first table, determines a second intermediate variable based on the first TBS index, the frequency domain resource, and a second table, and determines the TBS based on the second intermediate variable and a first scale factor, where the first scale factor is greater than 1; or the communication device determines a quantity of REs based on the frequency domain resource, and determines the TBS based on the quantity of REs and an index of the MCS.

In a possible implementation, the first broadcast channel has at least one of the following characteristics: a time domain resource occupied by a cyclic prefix CP is not less than a first threshold, a time domain resource occupied by an OFDM symbol is not less than a second threshold, a subcarrier spacing SCS is not greater than a third threshold, and a fast Fourier transformation FFT length is not less than a fourth threshold.

In a possible implementation, the first threshold is 300 microseconds μs, the second threshold is 2.4 milliseconds ms, the third threshold is 417 hertz Hz, and the fourth threshold is 36864.

When the communication device determines that the first broadcast channel specifically has at least one of the foregoing characteristics, in other words, when the communication device determines that a subframe whose length exceeds 1 ms needs to be used, the communication device may determine the TBS in one or more manners in this application. When this condition is not met, the TBS may be determined in a conventional manner or in another manner, so that manners in the TBS determining process are more diversified and flexible.

In a possible implementation, the frequency domain resource is greater than a fifth threshold; and if the communication device is a terminal device UE, the fifth threshold is predefined or is configured by using higher layer signaling; or if the communication device is a network side device, the fifth threshold is predefined or is sent by the network side device to UE.

When the communication device determines that the frequency domain resource occupied by the first broadcast channel is greater than the fifth threshold, the communication device may determine the TBS in the first manner provided in this application, a TBS value determined by using the third table that is the TBS table in which a quantity of layers to which the transport block is mapped is greater than 1 is larger, and a larger amount of data can be transmitted in each subframe, thereby further improving a signal transmission rate of a system.

In a possible implementation, the third table is further corresponding to a TBS table in which a quantity of layers to which a transport block is mapped is 2, the third table is further corresponding to a TBS table in which a quantity of layers to which a transport block is mapped is 3, or the third table is further corresponding to a TBS table in which a quantity of layers to which a transport block is mapped is 4.

When determining the TBS by using the third table, the communication device may use a TBS table in which a quantity of layers to which a transport block is mapped is a plurality of layers, and an existing table may be reused, thereby reducing maintenance costs.

In a possible implementation, the first scale factor is 3 or 4.

When the first scale factor is greater than 1, the communication device scales the second intermediate variable based on the first scale factor greater than 1, and a determined TBS is a scaled TBS. Therefore, a value of the determined TBS is larger, and an amount of data that can be transmitted in each subframe is larger. Therefore, the signal transmission rate of the system is further improved.

In a possible implementation, that the communication device determines a quantity of REs based on the frequency domain resource includes: The communication device determines the quantity of REs based on the frequency domain resource and a sixth threshold, where the sixth threshold is greater than 156 and less than or equal to 846, and the sixth threshold is a threshold corresponding to a quantity of available REs of one or more RBs in the frequency domain resource.

An upper limit, namely, the sixth threshold, may be set for a to-be-determined quantity of REs, and the communication device determines the quantity of REs based on the specified upper limit and the frequency domain resource, to meet a limitation that may exist on REs in a communication system.

According to a second aspect, a TBS determining method is provided, including:

UE determines an MCS index corresponding to a PMCH.

The UE determines a third correspondence, where the third correspondence includes a correspondence between the MCS index, a modulation order, and a TBS index.

The UE determines the modulation order and the TBS index based on the MCS index and the third correspondence.

The UE determines, based on the TBS index, a TBS corresponding to the PMCH.

A maximum modulation order included in the third correspondence is equal to 6, and a maximum TBS index corresponding to a modulation order 2 is greater than or equal to 10, and/or a maximum TBS index corresponding to a modulation order 4 is greater than or equal to 16.

Alternatively, a maximum modulation order included in the third correspondence is equal to 8, and a maximum TBS index corresponding to a modulation order 2 is greater than or equal to 9, and/or a maximum TBS index corresponding to a modulation order 4 is greater than or equal to 16, and/or a maximum TBS index corresponding to a modulation order 6 is greater than or equal to 25.

In the foregoing method, a maximum TBS index corresponding to a modulation order is increased, and spectral efficiency determined based on the increased maximum TBS index is further improved, so that spectral efficiency corresponding to a switching point of switching a modulation scheme is also improved. Therefore, better link performance can be ensured when the modulation scheme is switched at the switching point, and a PMCH demodulation success rate of the UE can be increased, thereby increasing a system throughput.

In a possible implementation, before the UE determines the third correspondence, the method further includes: The UE receives information that is about a maximum modulation order and that is sent by a network device.

For example, the information about the maximum modulation order is a value of the maximum modulation order, and/or information about a modulation scheme corresponding to the maximum modulation order.

For another example, the information about the maximum modulation order is one bit. A value 0 of the one bit indicates that the maximum modulation order is 6, and a value 1 of the one bit indicates that the maximum modulation order is 8. Alternatively, a value 0 of the one bit indicates that the maximum modulation order is 8, and a value 1 of the one bit indicates that the maximum modulation order is 6.

In a possible implementation, a maximum modulation order included in the third correspondence is equal to 6, a maximum TBS index corresponding to a modulation order 2 in the third correspondence is 11, and a maximum TBS index corresponding to a modulation order 4 is 15.

Optionally, in the third correspondence, when the MCS index is 10, a corresponding modulation order is 2, and a corresponding TBS index is 10; when the MCS index is 11, a corresponding modulation order is 2, and a corresponding TBS index is 11.

In a possible implementation, a maximum modulation order included in the third correspondence is equal to 6, a maximum TBS index corresponding to a modulation order 2 in the third correspondence is 9, and a maximum TBS index corresponding to a modulation order 4 is 17.

Optionally, in the third correspondence, when the MCS index is 17, a corresponding modulation order is 4, and a corresponding TBS index is 16; when the MCS index is 18, a corresponding modulation order is 4, and a corresponding TBS index is 17.

In a possible implementation, a maximum modulation order included in the third correspondence is equal to 6, a maximum TBS index corresponding to a modulation order 2 in the third correspondence is 9, and a maximum TBS index corresponding to a modulation order 4 is 19.

Optionally, in the third correspondence, when the MCS index is 17, a corresponding modulation order is 4, and a corresponding TBS index is 16; when the MCS index is 18, a corresponding modulation order is 4, and a corresponding TBS index is 17; when the MCS index is 19, a corresponding modulation order is 4, and a corresponding TBS index is 18; when the MCS index is 20, a corresponding modulation order is 4, and a corresponding TBS index is 19.

In a possible implementation, a maximum modulation order included in the third correspondence is equal to 6, a maximum TBS index corresponding to a modulation order 2 in the third correspondence is 11, and a maximum TBS index corresponding to a modulation order 4 is 17.

Optionally, in the third correspondence, when the MCS index is 10, a corresponding modulation order is 2, and a corresponding TBS index is 10; when the MCS index is 11, a corresponding modulation order is 2, and a corresponding TBS index is 11; when the MCS index is 17, a corresponding modulation order is 4, and a corresponding TBS index is 16; when the MCS index is 18, a corresponding modulation order is 4, and a corresponding TBS index is 17.

In a possible implementation, a maximum modulation order included in the third correspondence is equal to 6, a maximum TBS index corresponding to a modulation order 2 in the third correspondence is 11, and a maximum TBS index corresponding to a modulation order 4 is 19.

Optionally, in the third correspondence, when the MCS index is 10, a corresponding modulation order is 2, and a corresponding TBS index is 10; when the MCS index is 11, a corresponding modulation order is 2, and a corresponding TBS index is 11; when the MCS index is 17, a corresponding modulation order is 4, and a corresponding TBS index is 16; when the MCS index is 18, a corresponding modulation order is 4, and a corresponding TBS index is 17; when the MCS index is 19, a corresponding modulation order is 4, and a corresponding TBS index is 18; when the MCS index is 20, a corresponding modulation order is 4, and a corresponding TBS index is 19.

In a possible implementation, a maximum modulation order included in the third correspondence is equal to 8, and in the third correspondence, a maximum TBS index corresponding to a modulation order 2 is one of 8, 10, and 11, and/or a maximum TBS index corresponding to a modulation order 4 is one of 15, 16, 17, 18, and 19, and/or a maximum TBS index corresponding to a modulation order 6 is one of 24, 25, and 27.

In other words, the third correspondence meets one or more of the following: A maximum TBS index corresponding to the modulation order 2 is one of 8, 10, and 11, a maximum TBS index corresponding to the modulation order 4 is one of 15, 16, 17, 18, and 19, or a maximum TBS index corresponding to the modulation order 6 is one of 24, 25, and 27.

In a possible implementation, a maximum modulation order included in the third correspondence is equal to 8, and in the third correspondence, a maximum TBS index corresponding to a modulation order 2 is 11, and/or a maximum TBS index corresponding to a modulation order 4 is 19, and/or a maximum TBS index corresponding to a modulation order 6 is 25.

In other words, the third correspondence meets one or more of the following: A maximum TBS index corresponding to a modulation order 2 is 11, a maximum TBS index corresponding to a modulation order 4 is 19, or a maximum TBS index corresponding to a modulation order 6 is 25.

Optionally, when the MCS index is 5, a corresponding modulation order is 2, and a corresponding TBS index is 10; when the MCS index is 6, a corresponding modulation order is 2, and a corresponding TBS index is 11; when the MCS index is 11, a corresponding modulation order is 4, and a corresponding TBS index is 16; when the MCS index is 12, a corresponding modulation order is 4, and a corresponding TBS index is 17; when the MCS index is 13, a corresponding modulation order is 4, and a corresponding TBS index is 18; when the MCS index is 14, a corresponding modulation order is 4, and a corresponding TBS index is 19; when the MCS index is 20, a corresponding modulation order is 6, and a corresponding TBS index is 25.

According to a third aspect, a TBS determining apparatus is provided. The apparatus provided in this application has a function of implementing behavior of a communication device in the foregoing method aspects, and includes corresponding components (means) configured to perform steps or functions described in the foregoing method aspects. The steps or functions may be implemented by using software, hardware (for example, a circuit), or a combination of hardware and software.

In a possible design, the apparatus includes one or more processors and a communication unit. The one or more processors are configured to support the apparatus in performing corresponding functions of the communication device in the foregoing methods.

Optionally, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

In another possible design, the apparatus includes a transceiver, a processor, and a memory. The processor is configured to control the transceiver or an input/output circuit to receive or send a signal. The memory is configured to store a computer program. The processor is configured to run the computer program in the memory, to enable the apparatus to perform the method completed by the communication device in the first aspect, the second aspect, any one of the possible implementations of the first aspect, or any one of the possible implementations of the second aspect.

In a possible design, the apparatus includes one or more processors and a communication unit. The one or more processors are configured to support the apparatus in performing corresponding functions of the communication device in the foregoing methods.

Optionally, the apparatus may further include one or more memories. The memory is configured to be coupled to the processor, and the memory stores program instructions and/or data necessary for the communication device. The one or more memories may be integrated with the processor, or may be disposed independent of the processor. This is not limited in this application.

The apparatus may be located in the communication device or may be the communication device.

In another possible design, the apparatus includes a transceiver, a processor, and a memory. The processor is configured to control the transceiver or an input/output circuit to receive or send a signal. The memory is configured to store a computer program. The processor is configured to run the computer program in the memory, to enable the apparatus to perform the method completed by the communication device in the first aspect, the second aspect, any one of the possible implementations of the first aspect, or any one of the possible implementations of the second aspect.

According to a fourth aspect, a computer-readable storage medium is provided. The computer-readable storage medium is configured to store a computer program. The computer program includes instructions used to perform the method in the first aspect, the second aspect, any one of the possible implementations of the first aspect, or any one of the possible implementations of the second aspect.

According to a fifth aspect, a computer program product is provided. The computer program product includes computer program code. When the computer program code is run on a computer, the computer is enabled to perform the method in the first aspect, the second aspect, any one of the possible implementations of the first aspect, or any one of the possible implementations of the second aspect.

DESCRIPTION OF EMBODIMENTS

The following further describes the present invention in detail with reference to the accompanying drawings.

The technical solutions in the embodiments of this application may be applied to various communication systems, for example, a 4th generation (4th Generation, 4G) system, where the 4G system includes a long term evolution (long term evolution, LTE) system and a worldwide interoperability for microwave access (worldwide interoperability for microwave access, WiMAX) communication system; a 5th generation (5th Generation, 5G) system, for example, a new radio access technology (new radio access technology, NR); and a future communication system, for example, a 6G system, provided that one entity in the communication system needs to send a signal and another entity needs to receive the signal, and a size of a signal transport block needs to be determined, where the entity may be understood as a communication device in the communication system.

Figure 2:
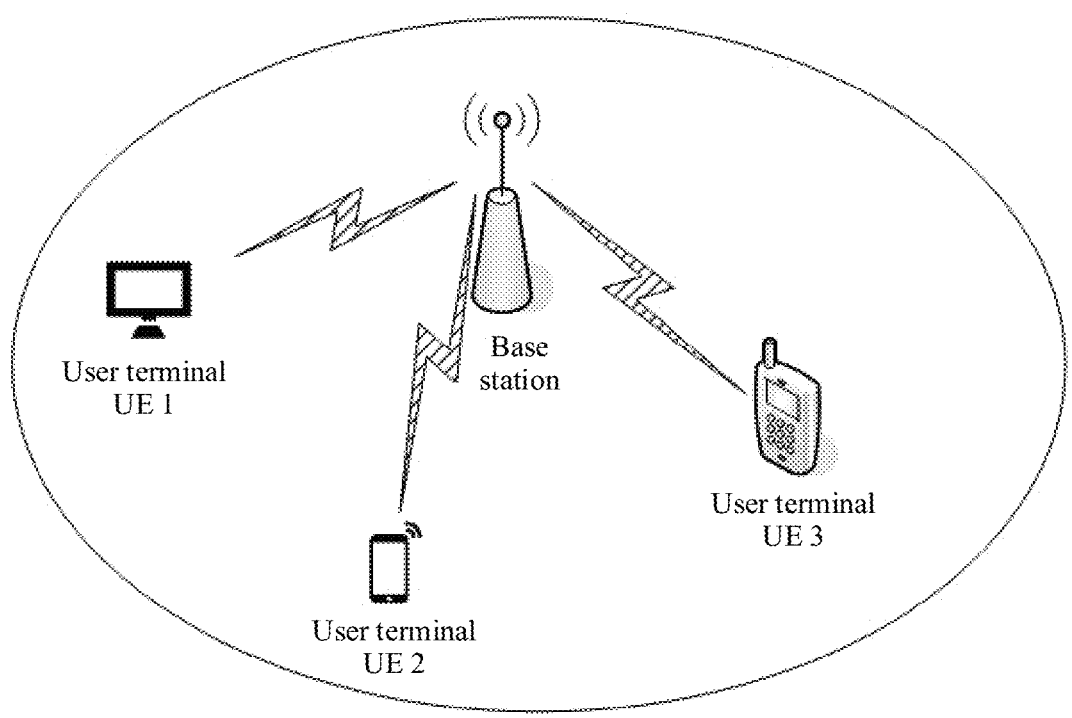
FIG. 2 is a schematic structural diagram of a communication system.

For example, the communication system may be a communication system shown in FIG. 2. The communication system includes a base station (Base station) and UE 1 to UE 3. In the communication system, the base station may send downlink data to the UE 1 to the UE 3. The base station mentioned in the present invention may be a high-tower high-power base station with a high antenna installation platform, a large transmit power, and a far coverage area, or may be a low-tower low-power base station with a low antenna installation platform, a small transmit power, and a near coverage area.

This application presents all aspects, embodiments, or features by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may be aware that: With evolution of the network architecture and emergence of new service scenarios, the technical solutions provided in the embodiments of this application are also applicable to similar technical problems.

The following describes some terms in the embodiments of this application, to facilitate understanding by a person skilled in the art.

(1) A communication device includes a radio access network (Radio Access Network, RAN) device and user equipment (User Equipment, UE), where the RAN device is an entity, for example, an eNB or a gNB, that is on a network side and that is configured to transmit or receive a signal, and the UE is a terminal device, and is an entity, for example, a mobile phone UE or a large-screen television, that is on a user side and that is configured to receive a signal.

(2) A broadcast channel is an information channel used for transmitting information through broadcasting, and for example, includes a physical multicast channel (Physical Multicast Channel, PMCH).

(3) A transport block size (Transport Block Size, TBS), TBS is an amount of data that can be transmitted in each subframe, and is mainly determined by using a subframe (subframe) length, a modulation and coding scheme (Modulation and Coding Scheme, MCS), and a quantity of resource blocks (Resource Block, RB).

(4) A frequency domain resource is a transmission resource in frequency domain, and for example, includes an RB and a resource element (Resource Element, RE).

The term "and/or" in this application describes an association relationship for describing associated objects and represents that three relationships may exist. For example, A and/or B may represent the following three cases: Only A exists, both A and B exist, and only B exists. The character "/" generally indicates an "or" relationship between the associated objects.

In this application, "a plurality of" refers to two or more than two.

In addition, it should be understood that in descriptions of this application, terms such as "first" and "second" are merely used for differentiation and description, but should not be understood as an indication or implication of relative importance or an indication or implication of an order.

For ease of understanding of the embodiments of this application, an application scenario used in this application is first described.

First, broadcast and multicast technologies are briefly introduced. With rapid development of internet technologies and rapid popularization of large-screen multimedia terminals, a large quantity of high-bandwidth and high-rate multimedia services are generated, such as television broadcasting, ball game relay broadcasting, internet live broadcasting, and video conferencing. Compared with a common mobile data service, the multimedia service allows a plurality of users to simultaneously receive same data, and has characteristics of a high data transmission rate and a large coverage area. To effectively utilize radio network resources, an evolved multimedia broadcast/multicast service (evolved Multimedia Broadcast/Multicast Service, eMBMS) is introduced in the 3rd generation partnership project (3rd Generation Partnership Project, 3GPP) to implement point-to-multipoint data transmission, and improve utilization of air interface resources. Conventional long term evolution (Long Term Evolution, LTE) defines a physical multicast channel (Physical Multicast Channel, PMCH) that is used to transmit data of the eMBMS service.

In the eMBMS service, a plurality of cells that are mutually synchronized jointly transmit an eMBMS signal on same time domain, frequency domain, and space domain resources through a multimedia broadcast multicast service single frequency network (Multimedia Broadcast multicast service Single Frequency Network, MBSFN). Then, the signals of the plurality of cells are combined in the air. This combination occurs on a same frequency, and therefore is also referred to as a single frequency network (Single Frequency Network, SFN) combination. The plurality of cells that jointly transmit the signals are distributed in a specific geographical location. The specific geographical location is referred to as an MBSFN area.

Figure 1:
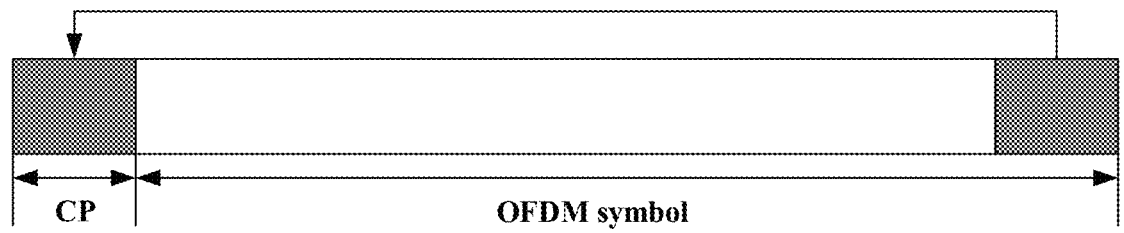
FIG. 1 is a schematic structural diagram of a complete OFDM symbol.

Next, a numerology of the PMCH is described: In an LTE downlink transmission mechanism, orthogonal multi-carriers (referred to as subcarriers) are used based on orthogonal frequency division multiplexing (Orthogonal Frequency Division Multiplexing, OFDM) to transmit an information flow. A spacing between adjacent subcarriers in frequency domain is a subcarrier spacing (Sub-Carrier Spacing, SCS), and a smaller SCS indicates a longer OFDM symbol period Tu (Tu=1/SCS). A complete OFDM symbol further includes a cyclic prefix (Cyclic prefix, CP). As shown in FIG. 1, the CP is a cyclic extension signal generated by moving a signal at a tail of an OFDM symbol to a head. In this way, a guard interval is formed between symbols, and is used to resist inter-symbol interference (Inter-Symbol Interference, ISI).

Figure 3:
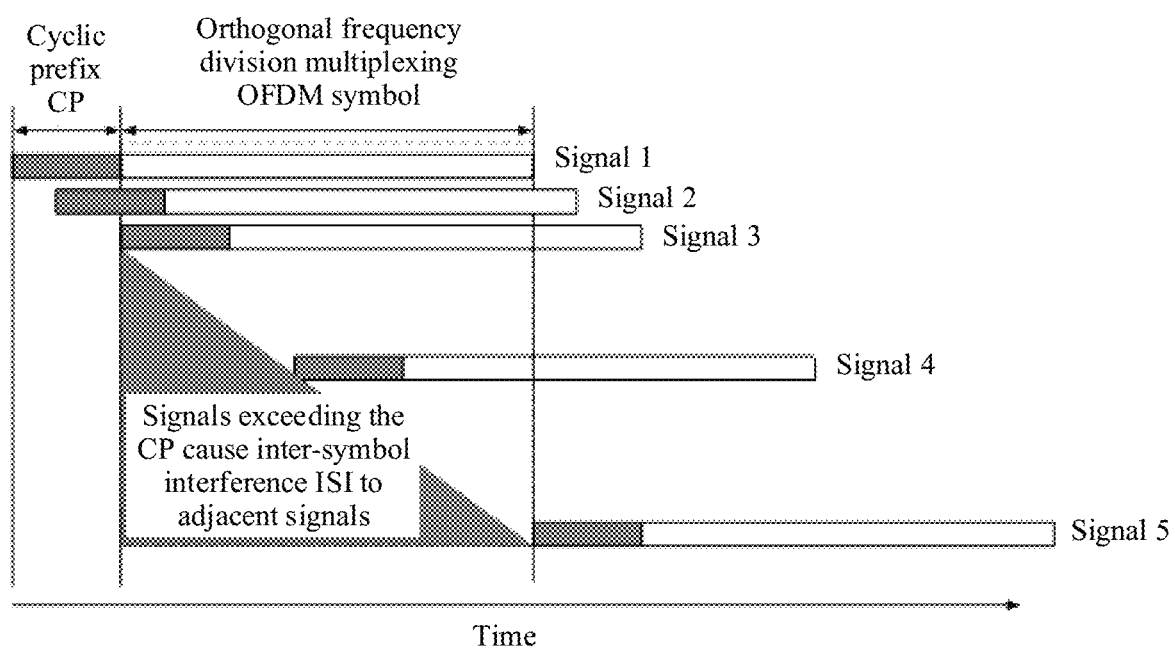
FIG. 3 is a schematic diagram of a relationship between a CP length and delay spreads of signals of a plurality of cells according to an embodiment of this application.

In an MBSFN system, signals sent by base stations of a plurality of cells in an MBSFN area are considered as useful signals. In this case, the CP needs to cover delay spreads of the signals of the plurality of cells. FIG. 3 explains a relationship between a CP length and a delay spread of the signals of the plurality of cells: Time when a signal 1 arrives at UE is the earliest, and delays of a signal 2 and a signal 3 relative to the signal 1 do not exceed the CP length, so that ISI is not caused to the signal 1. A delay of a signal 4 relative to the signal 1 exceeds the CP length, and this causes a loss of received energy of the OFDM symbol and ISI, but some symbol energy can still be captured by a receiver. A delay of a signal 5 relative to the signal 1 exceeds a length of an entire symbol, and consequently all symbol energy cannot be captured by the receiver, and ISI is caused.

If the MBSFN area is scaled, the delay spreads of the signals of the plurality of cells increase, and a larger CP is required to resist ISI. Currently, in an MBSFN in LTE, an extended cyclic prefix (Extended Cyclic Prefix, ECP) is used, SCSs of 15 kHz, 7.5 kHz, and 1.25 kHz are supported, and corresponding CP lengths are 16.7 μs, 33.3 μs, and 200 μs respectively. To support the MBSFN to provide a broadcast service for UE in a wider coverage area, a new WI, namely, LTE-based 5G terrestrial broadcasting is introduced in LTE R16, where one of important work items is standardization of a new numerology (numerology) whose CP length exceeds 300 μs.

Then, a method for calculating a TBS of the PMCH is briefly described. Step 1: A higher layer (generally, a network side device) configures an MCS index $I_{MCS}$ of the PMCH for the UE, and the UE determines a modulation order $Q_m$ and a TBS index $I_{TBS}$ based on the MCS index $I_{MCS}$ and a first table. The first table shows a correspondence between the MCS index $I_{MCS}$, and the modulation order $Q_m$ and the TBS index $I_{TBS}$.

Different modulation schemes that are supported by the UE and that are configured by the higher layer are different, and correspondingly used first tables are different. Specifically, if the higher layer configures the UE to perform decoding by using quadrature phase shift keying (Quadrature Phase Shift Keying, QPSK), 16 quadrature amplitude modulation (Quadrature Amplitude Modulation, QAM), 64QAM, and 256QAM, the first table may be shown as Table 1. Otherwise, the first table may be shown as Table 2, where reserved is reserved data.

TABLE 1

| MCS Index $I_{MCS}$ | Modulation Order $Q_m$ | Modulation Order $Q'_m$ | TBS Index $I_{TBS}$ |
| --- | --- | --- | --- |
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 10 |
| 6 | 4 | 6 | 11 |
| 7 | 4 | 6 | 12 |
| 8 | 4 | 6 | 13 |
| 9 | 4 | 6 | 14 |
| 10 | 4 | 8 | 15 |
| 11 | 6 | 8 | 16 |
| 12 | 6 | 8 | 17 |
| 13 | 6 | 8 | 18 |
| 14 | 6 | 8 | 19 |
| 15 | 6 | 8 | 20 |
| 16 | 6 | 8 | 21 |
| 17 | 6 | 8 | 22 |
| 18 | 6 | 8 | 23 |
| 19 | 6 | 8 | 24 |
| 20 | 8 | 8 | 25 |
| 21 | 8 | 8 | 27 |
| 22 | 8 | 8 | 28 |
| 23 | 8 | 8 | 29 |
| 24 | 8 | 8 | 30 |
| 25 | 8 | 8 | 31 |
| 26 | 8 | 8 | 32 |
| 27 | 8 | 8 | 33/33A/33B |
| 28 | 2 | 2 | Reserved |
| 29 | 4 | 4 | |
| 30 | 6 | 6 | |
| 31 | 8 | 8 | |

TABLE 2

| MCS Index $I_{MCS}$ | Modulation Order $Q_m$ | Modulation Order $Q'_m$ | TBS Index $I_{TBS}$ |
| --- | --- | --- | --- |
| 0 | 2 | 2 | 0 |
| 1 | 2 | 2 | 1 |
| 2 | 2 | 2 | 2 |
| 3 | 2 | 2 | 3 |

TABLE 2-continued

| MCS Index $I_{MCS}$ | Modulation Order $Q_m$ | Modulation Order $Q'_m$ | TBS Index $I_{TBS}$ |
|---|---|---|---|
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | Reserved |
| 30 | 4 | 4 | |
| 31 | 6 | 6 | |

Step 2: The UE determines a TBS based on the TBS index $I_{TBS}$, a quantity $N_{PRB}$ of RBs, and a second table. The quantity $N_{PRB}$ of RBs is a total quantity of downlink (DL) RBs. The second table shows a correspondence between the TBS index $I_{TBS}$, the quantity $N_{PRB}$ of RBs, and the TBS. The second table may be described as Table 3.

TABLE 3

| $I_{TBS}$ | $N_{PRB}$ = 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

| $I_{TBS}$ | $N_{PRB}$ = 11 | 12 | 13 | 14 | 15 | 16 | 17 | 18 | 19 | 20 |
|---|---|---|---|---|---|---|---|---|---|---|
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |

TABLE 3-continued

| $I_{TBS}$ | | | | | | | | | |
|---|---|---|---|---|---|---|---|---|---|
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |
| 26A | 7224 | 7736 | 8504 | 9144 | 9912 | 10296 | 11064 | 11832 | 12576 | 12960 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3880 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |
| 26A | 13536 | 14112 | 15264 | 15840 | 16416 | 16992 | 17568 | 18336 | 19080 | 19848 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |
| 26A | 20616 | 20616 | 21384 | 22152 | 22920 | 23688 | 24496 | 24496 | 25456 | 26416 |

TABLE 3-continued

| $I_{TBS}$ | \multicolumn{10}{c}{$N_{PRB}$} |
|---|---|---|---|---|---|---|---|---|---|---|
|  | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 28336 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |
| 26A | 26416 | 27376 | 27376 | 29296 | 29296 | 29296 | 30576 | 30576 | 31704 | 32856 |

| $I_{TBS}$ | \multicolumn{10}{c}{$N_{PRB}$} |
|---|---|---|---|---|---|---|---|---|---|---|
|  | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |
| 26A | 32856 | 34008 | 34008 | 35160 | 36696 | 36696 | 36696 | 37888 | 37888 | 39232 |

| $I_{TBS}$ | \multicolumn{10}{c}{$N_{PRB}$} |
|---|---|---|---|---|---|---|---|---|---|---|
|  | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |

TABLE 3-continued

| | | | | | $N_{PRB}$ | | | | | |
|---|---|---|---|---|---|---|---|---|---|---|
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 17568 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |
| 26A | 40576 | 40576 | 40576 | 40576 | 42368 | 42368 | 43816 | 43816 | 45352 | 45352 |

| | | | | | $N_{PRB}$ | | | | | |
|---|---|---|---|---|---|---|---|---|---|---|
| $I_{TBS}$ | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 43816 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |
| 26A | 45352 | 46888 | 46888 | 48936 | 48936 | 48936 | 51024 | 51024 | 51024 | 52752 |

| | | | | | $N_{PRB}$ | | | | | |
|---|---|---|---|---|---|---|---|---|---|---|
| $I_{TBS}$ | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |

TABLE 3-continued

| $I_{TBS}$ | | | | | | | | | |
|---|---|---|---|---|---|---|---|---|---|
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |
| 26A | 52752 | 52752 | 55056 | 55056 | 55056 | 55056 | 57336 | 57336 | 57336 | 59256 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |
| 26A | 59256 | 59256 | 59256 | 61664 | 61664 | 61664 | 63776 | 63776 | 63776 | 66592 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 13536 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 32856 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |
| 26A | 66592 | 66592 | 66592 | 68808 | 68808 | 68808 | 71112 | 71112 | 71112 | 71112 |

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 27 | 648 | 1320 | 1992 | 2664 | 3368 | 4008 | 4584 | 5352 | 5992 | 6712 |
| 28 | 680 | 1384 | 2088 | 2792 | 3496 | 4264 | 4968 | 5544 | 6200 | 6968 |
| 29 | 712 | 1480 | 2216 | 2984 | 3752 | 4392 | 5160 | 5992 | 6712 | 7480 |
| 30 | 776 | 1544 | 2344 | 3112 | 3880 | 4776 | 5544 | 6200 | 6968 | 7736 |
| 31 | 808 | 1608 | 2472 | 3240 | 4136 | 4968 | 5736 | 6456 | 7480 | 8248 |

TABLE 3-continued

| | | | | | | | | | |
|---|---|---|---|---|---|---|---|---|---|
| 32 | 840 | 1672 | 2536 | 3368 | 4264 | 5160 | 5992 | 6712 | 7736 | 8504 |
| 32A | 904 | 1864 | 2792 | 3752 | 4584 | 5544 | 6456 | 7480 | 8248 | 9144 |
| 33 | 968 | 1992 | 2984 | 4008 | 4968 | 5992 | 6968 | 7992 | 8760 | 9912 |
| 33A | 840 | 1736 | 2600 | 3496 | 4392 | 5160 | 5992 | 6968 | 7736 | 8760 |
| 33B | 968 | 1992 | 2984 | 4008 | 4968 | 5992 | 6968 | 7992 | 8760 | 9912 |
| 34 | 1032 | 2088 | 3112 | 4264 | 5160 | 6200 | 7224 | 8504 | 9528 | 10296 |
| 34A | 1064 | 2088 | 3112 | 4264 | 5352 | 6456 | 7480 | 8504 | 9528 | 10680 |
| 35 | 1096 | 2216 | 3240 | 4392 | 5544 | 6712 | 7736 | 8760 | 9912 | 11064 |
| 36 | 1160 | 2280 | 3496 | 4584 | 5736 | 6968 | 7992 | 9144 | 10296 | 11448 |
| 37A | 1192 | 2408 | 3624 | 4776 | 5992 | 7224 | 8504 | 9528 | 10680 | 11832 |
| 37 | 1224 | 2472 | 3752 | 4968 | 6200 | 7480 | 8760 | 9912 | 11064 | 12384 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 27 | 7224 | 7992 | 8504 | 9144 | 9912 | 10680 | 11448 | 11832 | 12576 | 12960 |
| 28 | 7736 | 8504 | 9144 | 9912 | 10680 | 11064 | 11832 | 12576 | 13536 | 14112 |
| 29 | 8248 | 8760 | 9528 | 10296 | 11064 | 11832 | 12576 | 13536 | 14112 | 14688 |
| 30 | 8504 | 9528 | 10296 | 11064 | 11832 | 12576 | 13536 | 14112 | 14688 | 15840 |
| 31 | 9144 | 9912 | 10680 | 11448 | 12216 | 12960 | 14112 | 14688 | 15840 | 16416 |
| 32 | 9528 | 10296 | 11064 | 11832 | 12960 | 13536 | 14688 | 15264 | 16416 | 16992 |
| 32A | 10296 | 11064 | 12216 | 12960 | 14112 | 14688 | 15840 | 16416 | 17568 | 18336 |
| 33 | 10680 | 11832 | 12960 | 13536 | 14688 | 15840 | 16992 | 17568 | 19080 | 19848 |
| 33A | 9528 | 10296 | 11448 | 12216 | 12960 | 14112 | 14688 | 15840 | 16416 | 17568 |
| 33B | 10680 | 11832 | 12960 | 13536 | 14688 | 15840 | 16992 | 17568 | 19080 | 19848 |
| 34 | 11448 | 12576 | 13536 | 14688 | 15840 | 16992 | 17568 | 19080 | 19848 | 20616 |
| 34A | 11448 | 12576 | 13536 | 14688 | 15840 | 16992 | 17568 | 19080 | 19848 | 21384 |
| 35 | 12216 | 12960 | 14112 | 15264 | 16416 | 17568 | 18336 | 19848 | 20616 | 22152 |
| 36 | 12576 | 13536 | 14688 | 15840 | 16992 | 18336 | 19848 | 20616 | 22152 | 22920 |
| 37A | 12960 | 14112 | 15840 | 16992 | 18336 | 19080 | 20616 | 21384 | 22920 | 23688 |
| 37 | 13536 | 14688 | 15840 | 17568 | 18336 | 19848 | 21384 | 22152 | 23688 | 24496 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 27 | 14112 | 14688 | 15264 | 15840 | 16416 | 16992 | 17568 | 18336 | 19080 | 19848 |
| 28 | 14688 | 15264 | 16416 | 16992 | 17568 | 18336 | 19080 | 19848 | 20616 | 21384 |
| 29 | 15840 | 16416 | 16992 | 17568 | 18336 | 19080 | 19848 | 20616 | 21384 | 22152 |
| 30 | 16416 | 16992 | 18336 | 19080 | 19848 | 20616 | 21384 | 22152 | 22920 | 23688 |
| 31 | 17568 | 18336 | 19080 | 19848 | 20616 | 21384 | 22152 | 22920 | 23688 | 24496 |
| 32 | 17568 | 19080 | 19848 | 20616 | 21384 | 22152 | 22920 | 23688 | 24496 | 25456 |
| 32A | 19848 | 20616 | 21384 | 22152 | 22920 | 24496 | 25456 | 26416 | 27376 | 27376 |
| 33 | 20616 | 21384 | 22920 | 23688 | 24496 | 25456 | 26416 | 27376 | 28336 | 29296 |
| 33A | 18336 | 19080 | 19848 | 20616 | 22152 | 22920 | 23688 | 24496 | 25456 | 26416 |
| 33B | 20616 | 21384 | 22920 | 23688 | 24496 | 25456 | 26416 | 27376 | 28336 | 29296 |
| 34 | 22152 | 22920 | 24496 | 25456 | 26416 | 27376 | 28336 | 29296 | 30576 | 31704 |
| 34A | 22152 | 22920 | 24496 | 25456 | 26416 | 27376 | 28336 | 29296 | 30576 | 31704 |
| 35 | 22920 | 24496 | 25456 | 26416 | 27376 | 28336 | 29296 | 30576 | 31704 | 32856 |
| 36 | 24496 | 25456 | 26416 | 27376 | 28336 | 29296 | 30576 | 31704 | 32856 | 34008 |
| 37A | 25456 | 26416 | 27376 | 28336 | 30576 | 31704 | 32856 | 34008 | 35160 | 36696 |
| 37 | 26416 | 27376 | 28336 | 29296 | 30576 | 31704 | 32856 | 35160 | 35160 | 36696 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 27 | 20616 | 21384 | 22152 | 22920 | 22920 | 23688 | 24496 | 25456 | 25456 | 26416 |
| 28 | 22152 | 22152 | 22920 | 23688 | 24496 | 25456 | 26416 | 26416 | 27376 | 28336 |
| 29 | 22920 | 23688 | 24496 | 25456 | 26416 | 26416 | 27376 | 28336 | 29296 | 29296 |
| 30 | 24496 | 25456 | 25456 | 26416 | 27376 | 28336 | 29296 | 29296 | 30576 | 31704 |
| 31 | 25456 | 26416 | 27376 | 28336 | 29296 | 29296 | 30576 | 31704 | 31704 | 32856 |
| 32 | 26416 | 27376 | 28336 | 29296 | 29296 | 30576 | 31704 | 32856 | 32856 | 34008 |
| 32A | 28336 | 29296 | 30576 | 31704 | 32856 | 32856 | 34008 | 35160 | 36696 | 36696 |
| 33 | 30576 | 31704 | 32856 | 34008 | 35160 | 35160 | 36696 | 37888 | 39232 | 39232 |
| 33A | 27376 | 27376 | 29296 | 29296 | 30576 | 30576 | 31704 | 32856 | 34008 | 35160 |
| 33B | 30576 | 31704 | 32856 | 34008 | 35160 | 35160 | 36696 | 37888 | 39232 | 39232 |
| 34 | 32856 | 34008 | 35160 | 35160 | 36696 | 37888 | 39232 | 39232 | 40576 | 42368 |
| 34A | 32856 | 34008 | 35160 | 35160 | 36696 | 37888 | 39232 | 40576 | 40576 | 42368 |
| 35 | 34008 | 35160 | 36696 | 37888 | 37888 | 39232 | 40576 | 42368 | 42368 | 43816 |
| 36 | 35160 | 36696 | 37888 | 39232 | 40576 | 40576 | 42368 | 43816 | 45352 | 45352 |
| 37A | 36696 | 37888 | 39232 | 40576 | 42368 | 43816 | 43816 | 45352 | 46888 | 48936 |
| 37 | 37888 | 39232 | 40576 | 42368 | 43816 | 43816 | 45352 | 46888 | 48936 | 48936 |

TABLE 3-continued

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 27 | 27376 | 27376 | 28336 | 29296 | 29296 | 30576 | 31704 | 31704 | 32856 | 32856 |
| 28 | 29296 | 29296 | 30576 | 30576 | 31704 | 32856 | 32856 | 34008 | 34008 | 35160 |
| 29 | 30576 | 31704 | 31704 | 32856 | 34008 | 34008 | 35160 | 35160 | 36696 | 36696 |
| 30 | 31704 | 32856 | 34008 | 34008 | 35160 | 36696 | 36696 | 37888 | 37888 | 39232 |
| 31 | 34008 | 35160 | 35160 | 36696 | 36696 | 37888 | 39232 | 39232 | 40576 | 40576 |
| 32 | 35160 | 35160 | 36696 | 37888 | 37888 | 39232 | 40576 | 40576 | 42368 | 42368 |
| 32A | 37888 | 39232 | 40576 | 40576 | 42368 | 42368 | 43816 | 43816 | 45352 | 46888 |
| 33 | 40576 | 40576 | 42368 | 43816 | 43816 | 45352 | 46888 | 46888 | 48936 | 48936 |
| 33A | 35160 | 36696 | 36696 | 37888 | 39232 | 40576 | 40576 | 40576 | 42368 | 43816 |
| 33B | 40576 | 40576 | 42368 | 43816 | 43816 | 45352 | 46888 | 46888 | 48936 | 48936 |
| 34 | 42368 | 43816 | 45352 | 46888 | 46888 | 48936 | 48936 | 51024 | 51024 | 52752 |
| 34A | 43816 | 43816 | 45352 | 46888 | 46888 | 48936 | 48936 | 51024 | 51024 | 52752 |
| 35 | 45352 | 46888 | 46888 | 48936 | 48936 | 51024 | 52752 | 52752 | 52752 | 55056 |
| 36 | 46888 | 48936 | 48936 | 51024 | 51024 | 52752 | 55056 | 55056 | 57336 | 57336 |
| 37A | 48936 | 51024 | 51024 | 52752 | 55056 | 55056 | 57336 | 57336 | 59256 | 59256 |
| 37 | 51024 | 52752 | 52752 | 55056 | 55056 | 57336 | 57336 | 59256 | 61664 | 61664 |

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| 28 | 35160 | 36696 | 36696 | 37888 | 39232 | 39232 | 40576 | 40576 | 42368 | 42368 |
| 29 | 37888 | 39232 | 39232 | 40576 | 40576 | 42368 | 42368 | 43816 | 43816 | 45352 |
| 30 | 40576 | 40576 | 42368 | 42368 | 43816 | 43816 | 45352 | 45352 | 46888 | 46888 |
| 31 | 42368 | 42368 | 43816 | 45352 | 45352 | 46888 | 46888 | 46888 | 48936 | 48936 |
| 32 | 43816 | 43816 | 45352 | 46888 | 46888 | 46888 | 48936 | 48936 | 51024 | 51024 |
| 32A | 46888 | 48936 | 48936 | 51024 | 51024 | 52752 | 52752 | 52752 | 55056 | 55056 |
| 33 | 51024 | 51024 | 52752 | 52752 | 55056 | 55056 | 57336 | 57336 | 59256 | 59256 |
| 33A | 43816 | 45352 | 45352 | 46888 | 48936 | 48936 | 48936 | 51024 | 51024 | 52752 |
| 33B | 51024 | 51024 | 52752 | 52752 | 55056 | 55056 | 57336 | 57336 | 59256 | 59256 |
| 34 | 52752 | 55056 | 55056 | 57336 | 57336 | 59256 | 59256 | 61664 | 61664 | 63776 |
| 34A | 52752 | 55056 | 55056 | 57336 | 57336 | 59256 | 59256 | 61664 | 61664 | 63776 |
| 35 | 55056 | 57336 | 57336 | 59256 | 59256 | 61664 | 61664 | 63776 | 63776 | 66592 |
| 36 | 59256 | 59256 | 61664 | 61664 | 63776 | 63776 | 66592 | 66592 | 68808 | 68808 |
| 37A | 61664 | 61664 | 63776 | 63776 | 66592 | 66592 | 68808 | 68808 | 71112 | 71112 |
| 37 | 63776 | 63776 | 66592 | 66592 | 68808 | 68808 | 71112 | 71112 | 73712 | 75376 |

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 27 | 40576 | 40576 | 42368 | 42368 | 43816 | 43816 | 43816 | 45352 | 45352 | 46888 |
| 28 | 42368 | 43816 | 43816 | 45352 | 45352 | 46888 | 46888 | 46888 | 48936 | 48936 |
| 29 | 45352 | 45352 | 46888 | 46888 | 48936 | 48936 | 48936 | 51024 | 51024 | 52752 |
| 30 | 46888 | 48936 | 48936 | 51024 | 51024 | 51024 | 52752 | 52752 | 55056 | 55056 |
| 31 | 51024 | 51024 | 52752 | 52752 | 52752 | 55056 | 55056 | 55056 | 57336 | 57336 |
| 32 | 52752 | 52752 | 52752 | 55056 | 55056 | 57336 | 57336 | 57336 | 59256 | 59256 |
| 32A | 57336 | 57336 | 59256 | 59256 | 59256 | 61664 | 61664 | 63776 | 63776 | 63776 |
| 33 | 59256 | 61664 | 61664 | 63776 | 63776 | 63776 | 66592 | 66592 | 68808 | 68808 |
| 33A | 52752 | 55056 | 55056 | 55056 | 57336 | 57336 | 57336 | 59256 | 59256 | 61664 |
| 33B | 59256 | 61664 | 61664 | 63776 | 63776 | 63776 | 66592 | 66592 | 68808 | 68808 |
| 34 | 63776 | 63776 | 66592 | 66592 | 68808 | 68808 | 71112 | 71112 | 71112 | 73712 |
| 34A | 63776 | 66592 | 66592 | 66592 | 68808 | 68808 | 71112 | 71112 | 73712 | 73712 |
| 35 | 66592 | 68808 | 68808 | 71112 | 71112 | 73712 | 73712 | 75376 | 76208 | 76208 |
| 36 | 71112 | 71112 | 73712 | 73712 | 75376 | 76208 | 76208 | 78704 | 78704 | 81176 |
| 37A | 73712 | 73712 | 75376 | 76208 | 78704 | 78704 | 81176 | 81176 | 81176 | 84760 |
| 37 | 76208 | 76208 | 78704 | 78704 | 81176 | 81176 | 81176 | 84760 | 84760 | 87936 |

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 27 | 46888 | 46888 | 48936 | 48936 | 48936 | 51024 | 51024 | 51024 | 52752 | 52752 |
| 28 | 48936 | 51024 | 51024 | 52752 | 52752 | 52752 | 55056 | 55056 | 55056 | 57336 |
| 29 | 52752 | 52752 | 55056 | 55056 | 55056 | 57336 | 57336 | 57336 | 59256 | 59256 |
| 30 | 55056 | 57336 | 57336 | 57336 | 59256 | 59256 | 59256 | 61664 | 61664 | 63776 |
| 31 | 59256 | 59256 | 59256 | 61664 | 61664 | 63776 | 63776 | 63776 | 66592 | 66592 |
| 32 | 61664 | 61664 | 61664 | 63776 | 63776 | 63776 | 66592 | 66592 | 66592 | 68808 |
| 32A | 66592 | 66592 | 68808 | 68808 | 68808 | 71112 | 71112 | 73712 | 73712 | 73712 |
| 33 | 71112 | 71112 | 71112 | 73712 | 75376 | 76208 | 76208 | 76208 | 78704 | 78704 |
| 33A | 61664 | 61664 | 63776 | 63776 | 66592 | 66592 | 66592 | 68808 | 68808 | 68808 |
| 33B | 71112 | 71112 | 71112 | 73712 | 75376 | 76208 | 76208 | 76208 | 78704 | 78704 |
| 34 | 75376 | 76208 | 76208 | 78704 | 78704 | 78704 | 81176 | 81176 | 81176 | 84760 |
| 34A | 75376 | 76208 | 76208 | 78704 | 78704 | 81176 | 81176 | 81176 | 84760 | 84760 |
| 35 | 78704 | 78704 | 81176 | 81176 | 81176 | 84760 | 84760 | 84760 | 87936 | 87936 |

TABLE 3-continued

| $I_{TBS}$ | | | | | | | | | |
|---|---|---|---|---|---|---|---|---|---|
| 36 | 81176 | 81176 | 84760 | 84760 | 84760 | 87936 | 87936 | 90816 | 90816 | 90816 |
| 37A | 84760 | 84760 | 87936 | 87936 | 90816 | 90816 | 90816 | 93800 | 93800 | 97896 |
| 37 | 87936 | 87936 | 90816 | 90816 | 93800 | 93800 | 93800 | 97896 | 97896 | 97896 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 27 | 52752 | 55056 | 55056 | 55056 | 57336 | 57336 | 57336 | 59256 | 59256 | 59256 |
| 28 | 57336 | 57336 | 59256 | 59256 | 59256 | 61664 | 61664 | 61664 | 61664 | 63776 |
| 29 | 59256 | 61664 | 61664 | 61664 | 63776 | 63776 | 63776 | 66592 | 66592 | 66592 |
| 30 | 63776 | 63776 | 63776 | 66592 | 66592 | 66592 | 68808 | 68808 | 68808 | 71112 |
| 31 | 66592 | 68808 | 68808 | 68808 | 71112 | 71112 | 71112 | 73712 | 73712 | 73712 |
| 32 | 68808 | 71112 | 71112 | 71112 | 73712 | 73712 | 73712 | 75376 | 76208 | 76208 |
| 32A | 75376 | 76208 | 76208 | 78704 | 78704 | 78704 | 81176 | 81176 | 81176 | 84760 |
| 33 | 81176 | 81176 | 81176 | 81176 | 84760 | 84760 | 84760 | 87936 | 87936 | 87936 |
| 33A | 71112 | 71112 | 71112 | 73712 | 75376 | 75376 | 76208 | 78704 | 78704 | 78704 |
| 33B | 81176 | 81176 | 81176 | 81176 | 84760 | 84760 | 84760 | 87936 | 87936 | 87936 |
| 34 | 84760 | 84760 | 87936 | 87936 | 87936 | 90816 | 90816 | 93800 | 93800 | 93800 |
| 34A | 84760 | 87936 | 87936 | 87936 | 90816 | 90816 | 90816 | 93800 | 93800 | 93800 |
| 35 | 87936 | 90816 | 90816 | 93800 | 93800 | 93800 | 93800 | 97896 | 97896 | 97896 |
| 36 | 93800 | 93800 | 93800 | 97896 | 97896 | 97896 | 101840 | 101840 | 101840 | 101840 |
| 37A | 97896 | 97896 | 97896 | 101840 | 101840 | 101840 | 105528 | 105528 | 105528 | 107832 |
| 37 | 101840 | 101840 | 101840 | 105528 | 105528 | 107832 | 107832 | 110136 | 110136 | 112608 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 27 | 59256 | 61664 | 61664 | 61664 | 63776 | 63776 | 63776 | 63776 | 66592 | 66592 |
| 28 | 63776 | 63776 | 66592 | 66592 | 66592 | 66592 | 68808 | 68808 | 68808 | 71112 |
| 29 | 66592 | 68808 | 68808 | 68808 | 71112 | 71112 | 71112 | 73712 | 73712 | 73712 |
| 30 | 71112 | 71112 | 73712 | 73712 | 75376 | 75376 | 76208 | 76208 | 78704 | 78704 |
| 31 | 75376 | 76208 | 76208 | 78704 | 78704 | 78704 | 81176 | 81176 | 81176 | 81176 |
| 32 | 78704 | 78704 | 78704 | 81176 | 81176 | 81176 | 84760 | 84760 | 84760 | 84760 |
| 32A | 84760 | 84760 | 87936 | 87936 | 87936 | 87936 | 90816 | 90816 | 90816 | 93800 |
| 33 | 90816 | 90816 | 90816 | 93800 | 93800 | 93800 | 93800 | 97896 | 97896 | 97896 |
| 33A | 78704 | 81176 | 81176 | 81176 | 81176 | 84760 | 84760 | 84760 | 84760 | 87936 |
| 33B | 90816 | 90816 | 90816 | 93800 | 93800 | 93800 | 93800 | 97896 | 97896 | 100752 |
| 34 | 93800 | 97896 | 97896 | 97896 | 97896 | 101840 | 101840 | 101840 | 105528 | 105528 |
| 34A | 93800 | 97896 | 97896 | 97896 | 101840 | 101840 | 101840 | 101840 | 105528 | 105528 |
| 35 | 97896 | 101840 | 101840 | 101840 | 105528 | 105528 | 105528 | 107832 | 110136 | 110136 |
| 36 | 105528 | 105528 | 107832 | 107832 | 110136 | 110136 | 112608 | 112608 | 115040 | 115040 |
| 37A | 110136 | 110136 | 112608 | 112608 | 115040 | 115040 | 117256 | 117256 | 119816 | 119816 |
| 37 | 112608 | 115040 | 115040 | 115040 | 117256 | 119816 | 119816 | 119816 | 124464 | 125808 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 71112 | 73712 | 73712 | 73712 | 75376 | 75376 | 76208 | 76208 | 76208 |
| 29 | 75376 | 76208 | 76208 | 76208 | 78704 | 78704 | 78704 | 81176 | 81176 | 81176 |
| 30 | 78704 | 81176 | 81176 | 81176 | 81176 | 84760 | 84760 | 84760 | 84760 | 87936 |
| 31 | 84760 | 84760 | 84760 | 84760 | 87936 | 87936 | 87936 | 87936 | 90816 | 90816 |
| 32 | 87936 | 87936 | 87936 | 87936 | 90816 | 90816 | 90816 | 93800 | 93800 | 93800 |
| 32A | 93800 | 93800 | 93800 | 97896 | 97896 | 97896 | 97896 | 101840 | 101840 | 101840 |
| 33 | 97896 | 97896 | 97896 | 97896 | 97896 | 97896 | 97896 | 97896 | 97896 | 97896 |
| 33A | 87936 | 87936 | 87936 | 90816 | 90816 | 90816 | 93800 | 93800 | 93800 | 97896 |
| 33B | 100752 | 100752 | 100752 | 100752 | 100752 | 100752 | 100752 | 100752 | 100752 | 100752 |
| 34 | 105528 | 105528 | 105528 | 105528 | 105528 | 105528 | 105528 | 105528 | 105528 | 105528 |
| 34A | 105528 | 107832 | 107832 | 110136 | 110136 | 112608 | 112608 | 115040 | 115040 | 115040 |
| 35 | 110136 | 110136 | 112608 | 115040 | 115040 | 115040 | 117256 | 119816 | 119816 | 119816 |
| 36 | 117256 | 117256 | 117256 | 119816 | 119816 | 119816 | 124464 | 124464 | 125808 | 125808 |
| 37A | 119816 | 124464 | 124464 | 124464 | 125808 | 125808 | 128496 | 128496 | 130392 | 130392 |
| 37 | 125808 | 125808 | 128496 | 128496 | 128496 | 133208 | 133208 | 133208 | 133208 | 137792 |

The CP length of the new numerology introduced in the R16 WI exceeds 300 μs, a length of a symbol excluding a CP exceeds 2.4 ms, and a length of an entire symbol exceeds 2.7 ms. In this case, a length of a subframe exceeds 2.7 ms and is greater than a length 1 ms of an existing subframe in LTE. If the existing method for determining a TBS of a PMCH continues to be used, the TBS determined by the UE based on the MCS index $I_{MCS}$, the quantity $N_{PRB}$ of RBs, and the second table is less than an actual TBS, that is, an amount of data transmitted within 1 ms is obtained in the existing method. However, an amount of data transmitted within time exceeding 2.7 ms should be actually obtained. Consequently, a TBS configured by using a numerology whose symbol length exceeds 1 ms in the MBSFN is relatively small, and an amount of data transmitted in each subframe is relatively small, limiting a signal transmission rate of a system.

In the conventional technology, to implement transmission in a subframe whose length exceeds 1 ms, the following three manners are provided:

Conventional manner 1: When configuring a TBS of a PDSCH, the UE performs scaling processing on a quantity of RBs in the following three scenarios, and then determines the TBS based on a determined TBS index, a scaled quantity of RBs, and the second table.

Scenario 1: If higher-layer parameters altMCS-Table and altMCS-Table-scaling are configured for the UE, and an MCS index $I_{MCS}$ meets a specified condition, scaling processing is performed on the quantity of RBs by using a determined scale factor. The specified condition is clear to a person skilled in the art, and therefore details are not described herein again.

The scale factor may be set to the higher-layer parameter altMCS-Table-scaling, and a value of the scale factor may be one of {0.5, 0.625, 0.75, 0.875, 1}.

A formula for performing scaling processing on the quantity of RBs by using the determined scale factor is $N_{PRB}=\max\{\lfloor N_{RB}'\times\alpha\rfloor,1\}$, where $N_{PRB}'$ is an actual quantity of RBs configured for the UE, $\alpha$ is the determined scale factor, and $N_{PRB}$ is the scaled quantity of RBs.

Scenario 2: If a subframe belongs to a specified special subframe, a manner of scaling the quantity of RBs is selected from the following two scaling methods based on the special subframe to which the subframe belongs: $N_{PRB}=\max\{\lfloor N_{PRB}'\times 0.375\rfloor,1\}$ and $N_{PRB}=\max\{\lfloor N_{PRB}'\times 0.75\rfloor,1\}$, where $N_{PRB}'$ is an actual quantity of RBs configured for the UE, and $N_{PRB}$ is the scaled quantity of RBs. The specified special subframe is clear to a person skilled in the art, and therefore details are not described herein again.

Scenario 3: If both the scenario 1 and the scenario 2 are satisfied, the quantity of RBs may be scaled with reference to the foregoing two scaling methods. Specific formulas are $N_{PRB}=\max\{\lfloor N_{PRB}'\times 0.375\times\alpha\rfloor,1\}$ and $N_{PRB}=\max\{\lfloor N_{PRB}'\times 0.75\times\alpha\rfloor,1\}$, where $N_{PRB}'$ is an actual quantity of RBs configured for the UE, a is a determined scale factor, and $N_{PRB}$ is the scaled quantity of RBs.

However, in the manner 1 in the conventional technology, because the scaled quantity of RBs is generally rounded down, the scaled quantity of RBs is usually less than or equal to an actual quantity of RBs. Therefore, compared with a TBS determined by using the actual quantity of RBs, the TBS index, and the second table, a TBS determined by using the scaled quantity of RBs, the TBS index, and the second table is smaller. Consequently, a TBS determined in this manner for a subframe whose length exceeds 1 ms is relatively small, and an amount of data transmitted in each subframe is still relatively small.

Conventional manner 2: For a shortened transmission time interval (Shortened Transmission Time Interval, sTTI) technology, the UE first determines the modulation order $Q_m$ and the TBS index $I_{TBS}$ based on the MCS index $I_{MCS}$ and the first table, and then determines a first TBS intermediate variable based on the TBS index $I_{TBS}$, the quantity $N_{PRB}$ of RBs, and the second table.

The UE scales the first TBS intermediate variable by using a scale factor to obtain a second TBS intermediate variable. For a slot-PDSCH, the scale factor is set to 0.5, and for a subslot-PDSCH, the scale factor is set to ⅙. Then, a value closest to the second TBS intermediate variable obtained through scaling is selected, as a TBS, from a specified TBS resource pool.

Different TBS resource pools are used when the TBS is mapped to different quantities of spatial layers. If the TBS is mapped to one spatial layer, a TBS resource pool corresponding to a spatial layer 1 is used. If the TBS is mapped to two spatial layers, a TBS resource pool formed by a combination of a TBS resource pool at a layer 1 and a TBS resource pool at a layer 2 is used. If the TBS is mapped to three spatial layers, a TBS resource pool formed by a combination of a TBS resource pool at a layer 1 and a TBS resource pool at a layer 3 is used. If the TBS is mapped to four spatial layers, a TBS resource pool formed by a combination of a TBS resource pool at a layer 1 and a TBS resource pool at a layer 4 is used.

However, in the conventional manner 2, the scale factor is less than 1, and the second TBS intermediate variable obtained after scaling is performed based on the scale factor is smaller than the first TBS intermediate variable before the scaling. Consequently, for a subframe whose length exceeds 1 ms, a TBS determined in this manner is relatively small, and an amount of data transmitted in each subframe is still relatively small.

Conventional manner 3: For a case in which one TBS is mapped to two-layer spatial multiplexing, three-layer spatial multiplexing, or four-layer spatial multiplexing, the UE determines the TBS by using the following method. The following uses a case in which the TBS is mapped to two-layer spatial multiplexing as an example for description. A case in which the TBS is mapped to three-layer spatial multiplexing or to four-layer spatial multiplexing is similar to the case in which the TBS is mapped to two-layer spatial multiplexing, and therefore details are not described.

In a case of performing mapping to two-layer spatial multiplexing, it is determined that the scale factor is 2, that the quantity of RBs after expansion is twice the actual quantity of RBs, and that a demarcation value is determined based on 110 and the scale factor, to obtain the demarcation value 55.

If the actual quantity of RBs is not less than 1 and is not greater than 55, the UE determines the TBS based on the TBS index, twice the actual quantity of RBs, and the second table. If the actual quantity of RBs is not less than 56 and is not greater than 110, the UE determines a first TBS intermediate variable based on the TBS index, the actual quantity of RBs, and the second table, and then determines a second TBS intermediate variable based on the first TBS intermediate variable and the third table. The second TBS intermediate variable is the TBS to be determined, and the third table shows a correspondence between the first TBS intermediate variable TBS_L1 and the second TBS intermediate variable TBS_L2. Specifically, a corresponding third table used when the TBS is mapped to two-layer spatial multiplexing is shown in Table 4. A corresponding third table used when the TBS is mapped to three-layer spatial multiplexing is shown in Table 5, where TBS_L3 is a third TBS intermediate variable, and the third intermediate variable is the TBS to be determined. A corresponding third table used when the TBS is mapped to four-layer spatial multiplexing is shown in Table 6, where TBS_L4 is a fourth TBS intermediate variable, and the fourth intermediate variable is the TBS to be determined.

TABLE 4

| TBS_L1 | TBS_L2 | TBS_L1 | TBS_L2 | TBS_L1 | TBS_L2 | TBS_L1 | TBS_L2 |
|---|---|---|---|---|---|---|---|
| 1544 | 3112 | 3752 | 7480 | 10296 | 20616 | 28336 | 57336 |
| 1608 | 3240 | 3880 | 7736 | 10680 | 21384 | 29296 | 59256 |
| 1672 | 3368 | 4008 | 7992 | 11064 | 22152 | 30576 | 61664 |
| 1736 | 3496 | 4136 | 8248 | 11448 | 22920 | 31704 | 63776 |
| 1800 | 3624 | 4264 | 8504 | 11832 | 23688 | 32856 | 66592 |
| 1864 | 3752 | 4392 | 8760 | 12216 | 24496 | 34008 | 68808 |
| 1928 | 3880 | 4584 | 9144 | 12576 | 25456 | 35160 | 71112 |
| 1992 | 4008 | 4776 | 9528 | 12960 | 25456 | 36696 | 73712 |

TABLE 4-continued

| TBS_L1 | TBS_L2 | TBS_L1 | TBS_L2 | TBS_L1 | TBS_L2 | TBS_L1 | TBS_L2 |
|---|---|---|---|---|---|---|---|
| 2024 | 4008 | 4968 | 9912 | 13536 | 27376 | 37888 | 76208 |
| 2088 | 4136 | 5160 | 10296 | 14112 | 28336 | 39232 | 78704 |
| 2152 | 4264 | 5352 | 10680 | 14688 | 29296 | 40576 | 81176 |
| 2216 | 4392 | 5544 | 11064 | 15264 | 30576 | 42368 | 84760 |
| 2280 | 4584 | 5736 | 11448 | 15840 | 31704 | 43816 | 87936 |
| 2344 | 4776 | 5992 | 11832 | 16416 | 32856 | 45352 | 90816 |
| 2408 | 4776 | 6200 | 12576 | 16992 | 34008 | 46888 | 93800 |
| 2472 | 4968 | 6456 | 12960 | 17568 | 35160 | 48936 | 97896 |
| 2536 | 5160 | 6712 | 13536 | 18336 | 36696 | 51024 | 101840 |
| 2600 | 5160 | 6968 | 14112 | 19080 | 37888 | 52752 | 105528 |
| 2664 | 5352 | 7224 | 14688 | 19848 | 39232 | 55056 | 110136 |
| 2728 | 5544 | 7480 | 14688 | 20616 | 40576 | 57336 | 115040 |
| 2792 | 5544 | 7736 | 15264 | 21384 | 42368 | 59256 | 119816 |
| 2856 | 5736 | 7992 | 15840 | 22152 | 43816 | 61664 | 124464 |
| 2984 | 5992 | 8248 | 16416 | 22920 | 45352 | 63776 | 128496 |
| 3112 | 6200 | 8504 | 16992 | 23688 | 46888 | 66592 | 133208 |
| 3240 | 6456 | 8760 | 17568 | 24496 | 48936 | 68808 | 137792 |
| 3368 | 6712 | 9144 | 18336 | 25456 | 51024 | 71112 | 142248 |
| 3496 | 6968 | 9528 | 19080 | 26416 | 52752 | 73712 | 146856 |
| 3624 | 7224 | 9912 | 19848 | 27376 | 55056 | 75376 | 149776 |
| 76208 | 152976 | 81176 | 161760 | 87936 | 175600 | 93800 | 187712 |
| 78704 | 157432 | 84760 | 169544 | 90816 | 181656 | 97896 | 195816 |
| 100752 | 201936 | 101840 | 203704 | 105528 | 211936 | | |
| 107832 | 214176 | 110136 | 220296 | 112608 | 226416 | 115040 | 230104 |
| 117256 | 236160 | 119816 | 239656 | 124464 | 248272 | 125808 | 251640 |

TABLE 5

| TBS_L1 | TBS_L3 | TBS_L1 | TBS_L3 | TBS_L1 | TBS_L3 | TBS_L1 | TBS_L3 |
|---|---|---|---|---|---|---|---|
| 1032 | 3112 | 2664 | 7992 | 8248 | 24496 | 26416 | 78704 |
| 1064 | 3240 | 2728 | 8248 | 8504 | 25456 | 27376 | 81176 |
| 1096 | 3240 | 2792 | 8248 | 8760 | 26416 | 28336 | 84760 |
| 1128 | 3368 | 2856 | 8504 | 9144 | 27376 | 29296 | 87936 |
| 1160 | 3496 | 2984 | 8760 | 9528 | 28336 | 30576 | 90816 |
| 1192 | 3624 | 3112 | 9144 | 9912 | 29296 | 31704 | 93800 |
| 1224 | 3624 | 3240 | 9528 | 10296 | 30576 | 32856 | 97896 |
| 1256 | 3752 | 3368 | 9912 | 10680 | 31704 | 34008 | 101840 |
| 1288 | 3880 | 3496 | 10296 | 11064 | 32856 | 35160 | 105528 |
| 1320 | 4008 | 3624 | 10680 | 11448 | 34008 | 36696 | 110136 |
| 1352 | 4008 | 3752 | 11064 | 11832 | 35160 | 37888 | 115040 |
| 1384 | 4136 | 3880 | 11448 | 12216 | 36696 | 39232 | 119816 |
| 1416 | 4264 | 4008 | 11832 | 12576 | 37888 | 40576 | 119816 |
| 1480 | 4392 | 4136 | 12576 | 12960 | 39232 | 42368 | 128496 |
| 1544 | 4584 | 4264 | 12960 | 13536 | 40576 | 43816 | 133208 |
| 1608 | 4776 | 4392 | 12960 | 14112 | 42368 | 45352 | 137792 |
| 1672 | 4968 | 4584 | 13536 | 14688 | 43816 | 46888 | 142248 |
| 1736 | 5160 | 4776 | 14112 | 15264 | 45352 | 48936 | 146856 |
| 1800 | 5352 | 4968 | 14688 | 15840 | 46888 | 51024 | 152976 |
| 1864 | 5544 | 5160 | 15264 | 16416 | 48936 | 52752 | 157432 |
| 1928 | 5736 | 5352 | 15840 | 16992 | 51024 | 55056 | 165216 |
| 1992 | 5992 | 5544 | 16416 | 17568 | 52752 | 57336 | 171888 |
| 2024 | 5992 | 5736 | 16992 | 18336 | 55056 | 59256 | 177816 |
| 2088 | 6200 | 5992 | 18336 | 19080 | 57336 | 61664 | 185728 |
| 2152 | 6456 | 6200 | 18336 | 19848 | 59256 | 63776 | 191720 |
| 2216 | 6712 | 6456 | 19080 | 20616 | 61664 | 66592 | 199824 |
| 2280 | 6712 | 6712 | 19848 | 21384 | 63776 | 68808 | 205880 |
| 2344 | 6968 | 6968 | 20616 | 22152 | 66592 | 71112 | 214176 |
| 2408 | 7224 | 7224 | 21384 | 22920 | 68808 | 73712 | 221680 |
| 2472 | 7480 | 7480 | 22152 | 23688 | 71112 | 75376 | 226416 |
| 2536 | 7480 | 7736 | 22920 | 24496 | 73712 | | |
| 2600 | 7736 | 7992 | 23688 | 25456 | 76208 | | |
| 76208 | 230104 | 81176 | 245648 | 87936 | 266440 | 93800 | 284608 |
| 78704 | 236160 | 84760 | 254328 | 90816 | 275376 | 97896 | 293736 |
| 105528 | 314888 | 107832 | 324336 | 110136 | 324336 | 112608 | 336576 |
| 115040 | 339112 | 117256 | 351224 | 119816 | 363336 | 124464 | 373296 |
| 125808 | 375448 | | | | | | |

TABLE 6

| TBS_L1 | TBS_L4 | TBS_L1 | TBS_L4 | TBS_L1 | TBS_L4 | TBS_L1 | TBS_L4 |
|---|---|---|---|---|---|---|---|
| 776 | 3112 | 2280 | 9144 | 7224 | 29296 | 24496 | 97896 |
| 808 | 3240 | 2344 | 9528 | 7480 | 29296 | 25456 | 101840 |
| 840 | 3368 | 2408 | 9528 | 7736 | 30576 | 26416 | 105528 |
| 872 | 3496 | 2472 | 9912 | 7992 | 31704 | 27376 | 110136 |
| 904 | 3624 | 2536 | 10296 | 8248 | 32856 | 28336 | 115040 |
| 936 | 3752 | 2600 | 10296 | 8504 | 34008 | 29296 | 115040 |
| 968 | 3880 | 2664 | 10680 | 8760 | 35160 | 30576 | 124464 |
| 1000 | 4008 | 2728 | 11064 | 9144 | 36696 | 31704 | 128496 |
| 1032 | 4136 | 2792 | 11064 | 9528 | 37888 | 32856 | 133208 |
| 1064 | 4264 | 2856 | 11448 | 9912 | 39232 | 34008 | 137792 |
| 1096 | 4392 | 2984 | 11832 | 10296 | 40576 | 35160 | 142248 |
| 1128 | 4584 | 3112 | 12576 | 10680 | 42368 | 36696 | 146856 |
| 1160 | 4584 | 3240 | 12960 | 11064 | 43816 | 37888 | 151376 |
| 1192 | 4776 | 3368 | 13536 | 11448 | 45352 | 39232 | 157432 |
| 1224 | 4968 | 3496 | 14112 | 11832 | 46888 | 40576 | 161760 |
| 1256 | 4968 | 3624 | 14688 | 12216 | 48936 | 42368 | 169544 |
| 1288 | 5160 | 3752 | 15264 | 12576 | 51024 | 43816 | 175600 |
| 1320 | 5352 | 3880 | 15264 | 12960 | 51024 | 45352 | 181656 |
| 1352 | 5352 | 4008 | 15840 | 13536 | 55056 | 46888 | 187712 |
| 1384 | 5544 | 4136 | 16416 | 14112 | 57336 | 48936 | 195816 |
| 1416 | 5736 | 4264 | 16992 | 14688 | 59256 | 51024 | 203704 |
| 1480 | 5992 | 4392 | 17568 | 15264 | 61664 | 52752 | 211936 |
| 1544 | 6200 | 4584 | 18336 | 15840 | 63776 | 55056 | 220296 |
| 1608 | 6456 | 4776 | 19080 | 16416 | 66592 | 57336 | 230104 |
| 1672 | 6712 | 4968 | 19848 | 16992 | 68808 | 59256 | 236160 |
| 1736 | 6968 | 5160 | 20616 | 17568 | 71112 | 61664 | 245648 |
| 1800 | 7224 | 5352 | 21384 | 18336 | 73712 | 63776 | 254328 |
| 1864 | 7480 | 5544 | 22152 | 19080 | 76208 | 66592 | 266440 |
| 1928 | 7736 | 5736 | 22920 | 19848 | 78704 | 68808 | 275376 |
| 1992 | 7992 | 5992 | 23688 | 20616 | 81176 | 71112 | 284608 |
| 2024 | 7992 | 6200 | 24496 | 21384 | 84760 | 73712 | 293736 |
| 2088 | 8248 | 6456 | 25456 | 22152 | 87936 | 75376 | 299856 |
| 2152 | 8504 | 6712 | 26416 | 22920 | 90816 | | |
| 2216 | 8760 | 6968 | 28336 | 23688 | 93800 | | |
| 76208 | 305976 | 81176 | 324336 | 87936 | 351224 | 93800 | 375448 |
| 78704 | 314888 | 84760 | 339112 | 90816 | 363336 | 97896 | 391656 |
| 105528 | 422232 | 107832 | 422232 | 110136 | 440616 | 112608 | 452832 |
| 115040 | 460232 | 117256 | 471192 | 119816 | 478400 | 124464 | 501792 |
| 125808 | 502624 | | | | | | |

However, in the conventional manner 3, the TBS can only be scaled by two times, three times, or four times, and expansion by another multiple is not supported. In addition, the conventional manner 3 can be used only when the TBS is mapped to multi-layer spatial multiplexing. Therefore, expansion cannot be performed when use of the TBS is not flexible and when multi-layer spatial multiplexing is not performed. Consequently, the TBS cannot be determined, in all cases, for a subframe whose length exceeds 1 ms. When the TBS cannot be determined for a subframe whose length exceeds 1 ms, an amount of data transmitted in the subframe is still relatively small.

Based on the foregoing descriptions of the TBS determining manner in the conventional technology, it can be learned that the TBS determined in this manner for a subframe whose length exceeds 1 ms in the conventional technology is relatively small, and an amount of data transmitted in each subframe is still relatively small. In view of this, to ensure that a TBS determined for a subframe whose length exceeds 1 ms is large, an amount of data transmitted in each subframe is large, and a signal transmission rate of a system is improved, this application provides a TBS determining method to determine a TBS for a subframe whose length exceeds 1 ms.

Figure 4:
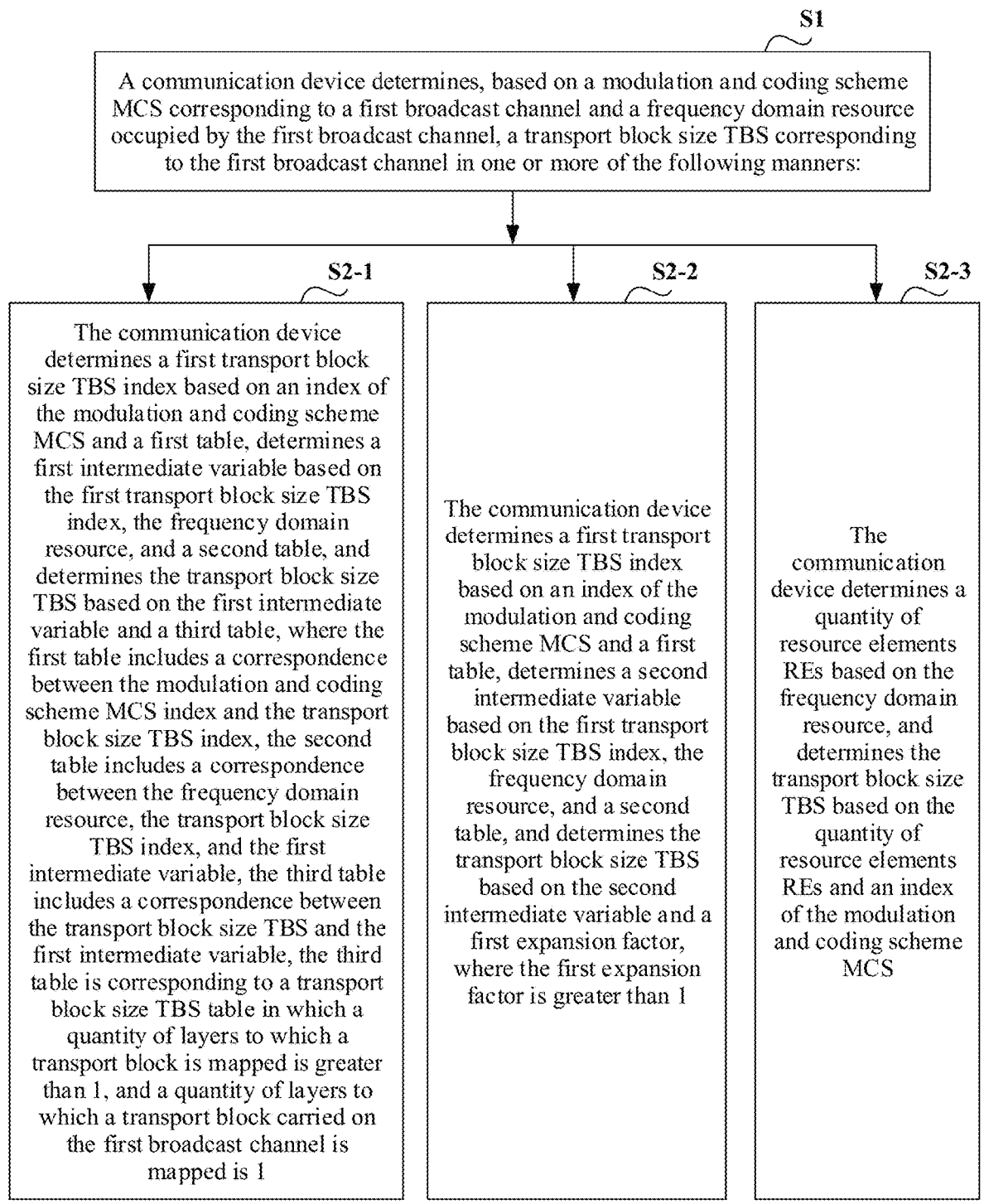
FIG. 4 is a schematic diagram of a TBS determining procedure applicable to an embodiment of this application.

Specifically, in a process in which the UE or the network side device determines, based on the MCS corresponding to the first broadcast channel and the frequency domain resource occupied by the first broadcast channel, the TBS corresponding to the first broadcast channel, a TBS table in which a corresponding quantity of layers to which a transport block is mapped is greater than 1 is used, and a quantity of layers to which a transport block carried on the first broadcast channel is mapped is 1, that is, a relatively large TBS can also be determined when multi-layer spatial multiplexing is not performed, or an obtained intermediate variable is scaled by using the first scale factor to determine an scaled TBS, and therefore, a relatively large TBS can also be determined, or a quantity of REs is determined based on the frequency domain resource, and because a quantity of REs in a subframe whose length exceeds 1 ms is greater than a quantity of REs in a subframe whose length is 1 ms, a relatively large TBS can also be determined when the TBS is determined based on the quantity of REs. A specific TBS determining process is described in detail by using the following embodiments. First, reference is made to a TBS determining process shown in FIG. 4. The process includes the following steps.

Step S1: A communication device determines, based on an MCS corresponding to a first broadcast channel and a frequency domain resource occupied by the first broadcast channel, a TBS corresponding to the first broadcast channel in one or more of the following manners.

If the communication device is UE, a first broadcast channel of the UE is mainly used to receive data to implement communication. If the communication device is a network side device, a first broadcast channel of the network side device is mainly used to send data to implement communication.

Optionally, if the communication device is UE, the MCS corresponding to the first broadcast channel may be predefined in the UE, or configured by using higher layer signaling sent by a network side device.

A higher-layer protocol layer is at least one protocol layer in protocol layers above a physical layer. The higher-layer protocol layer may be specifically at least one of the following protocol layers: a medium access control (Medium Access Control, MAC) layer, a radio link control (Radio Link Control, RLC) layer, a packet data convergence protocol (Packet Data Convergence Protocol, PDCP) layer, a radio resource control (Radio Resource Control, RRC) layer, and a non-access stratum (Non-Access Stratum, NAS). It may be understood that the higher layer signaling may also be generally equivalent to configuration information.

Optionally, if the communication device is a network side device, the MCS corresponding to the first broadcast channel may be predefined in the network side device, or may be sent by a network side to UE.

Optionally, if the communication device is UE, the frequency domain resource occupied by the first broadcast channel may be predefined in the UE, or configured by using higher layer signaling sent by a network side device.

Optionally, if the communication device is a network side device, the frequency domain resource occupied by the first broadcast channel may be predefined in the network side device, or may be sent by a network side to UE.

The communication device determines, based on the MCS corresponding to the first broadcast channel and the frequency domain resource occupied by the first broadcast channel in a combination of one or more of the following manners, the TBS corresponding to the first broadcast channel. A specific manner or a combination of the following manners may be predefined in the communication device, configured by a network side device by sending higher layer signaling to UE, or the like.

After determining the TBS, the communication device may determine, based on the determined TBS, an amount of data that can be transmitted in each subframe during data transmission, to implement data transmission.

The first broadcast channel has at least one of the following characteristics: A time domain resource occupied by a CP is not less than a first threshold, a time domain resource occupied by an OFDM symbol is not less than a second threshold, and a subcarrier spacing (subcarrier spacing, SCS) is not greater than a third threshold, a fast Fourier transform (fast Fourier transform, FFT) length is not less than a fourth threshold, and a parameter used to indicate to perform TBS determining by using the method provided in this application is configured.

The time domain resource occupied by the CP, the time domain resource occupied by the OFDM symbol, the SCS, and the FFT length may all be considered as numerology-related parameters.

When the first broadcast channel has at least one of at least one of the following characteristics, it may be considered that the communication device needs to determine a TBS for a subframe whose length exceeds 1 ms.

The time domain resource occupied by the CP may be considered as a length of the CP. The time domain resource occupied by the CP is not less than the first threshold, and the first threshold is 300 μs, that is, the time domain resource occupied by the CP is not less than 300 μs.

The time domain resource occupied by the OFDM symbol may be considered as a length of the OFDM symbol. A specific length of the OFDM symbol may include a length of the entire OFDM symbol and/or a length of an OFDM symbol that does not include a CP, and the time domain resource occupied by the OFDM symbol is not less than the second threshold. The second threshold is 2.4 ms, that is, the time domain resource occupied by the OFDM symbol is not less than 2.4 ms.

The SCS is not greater than the third threshold, and the third threshold is 417 Hz, 0.417 kHz, or 0.417 KHz, that is, the SCS is not greater than 417 Hz, 0.417 kHz, or 0.417 KHz. For example, if an SCS configured by a higher layer is $\Delta f=0.625$ kHz, the SCS does not satisfy a condition that the SCS is not greater than the third threshold.

The FFT length is not less than the fourth threshold. If a communication system is a 10 MHz system broadband, the fourth threshold is 36864, that is, the FFT length is not less than 36864. If a communication system is a 20 MHz system broadband, the fourth threshold may be correspondingly doubled to 73728, that is, the FFT length is not less than 73728.

The parameter used to indicate to perform TBS determining in the manner provided in this application is configured, and the parameter used to indicate to perform TBS determining in the manner provided in this application is any parameter, provided that the communication device can determine, based on the parameter used to indicate to perform TBS determining in the manner provided in this application, a TBS for a subframe whose length exceeds 1 ms. For example, the parameter may be set to altTBS_PMCH.

If the communication device determines, based on a characteristic of the first broadcast channel, that the communication device does not need to determine a TBS for a subframe whose length exceeds 1 ms, the communication device may determine a TBS by using an existing method, that is, determine a TBS index based on an MCS index and a first correspondence, and determine the TBS based on the TBS index, an actual quantity of RBs, and a second correspondence.

Step S2-1: The communication device determines a first TBS index based on an index of the MCS and a first table, determines a first intermediate variable based on the first TBS index, the frequency domain resource, and a second table, and determines the TBS based on the first intermediate variable and a third table, where the first table includes a correspondence between the MCS index and the TBS index, the second table includes a correspondence between the frequency domain resource, the TBS index, and the first intermediate variable, the third table includes a correspondence between the TBS and the first intermediate variable, the third table is corresponding to a TBS table in which a quantity of layers to which a transport block is mapped is greater than 1, and a quantity of layers to which a transport block carried on the first broadcast channel is mapped is 1.

If the communication device is UE, the index of the MCS corresponding to the first broadcast channel may be an MCS index configured by a network side device.

The communication device determines the first TBS index based on the index of the MCS and the first table, where the first table includes the correspondence between the MCS index and the TBS index. Optionally, the first table may use a first table shown as Table 1 and/or Table 2. The first table may alternatively be a first table obtained after Table 1 and Table 2 are combined or truncated. The first table may alternatively be a first table obtained by scaling Table 1 and/or Table 2. The first table may alternatively be a table applied to a 5G NR system.

The communication device determines the first intermediate variable based on the first TBS index, the frequency domain resource, and the second table, where the second table includes the correspondence between the frequency domain resource, the TBS index, and the first intermediate variable. For example, the frequency domain resource includes a quantity of RBs. Optionally, the quantity of RBs may be an actual quantity of RBs configured for the communication device, and may be an scaled quantity of RBs that is obtained after an actual quantity of RBs is scaled. The second table includes the correspondence between the quantity of RBs, the TBS index, and the first intermediate variable, and the first intermediate variable may be considered as the first intermediate variable used when the TBS is determined.

Optionally, the second table is further corresponding to a TBS table in which a quantity of layers to which a transport block is mapped is 1.

Optionally, the second table may be a second table shown as Table 3. The second table may alternatively be a second table obtained after Table 3 is truncated. The second table may alternatively be a second table obtained by scaling Table 3. The second table may alternatively be a table applied to a 5G NR system.

The communication device determines, based on the first intermediate variable and the third table, the TBS corresponding to the first broadcast channel, where the third table includes a correspondence between the TBS and the first intermediate variable, the quantity of layers to which the transport block carried on the first broadcast channel is mapped is 1, and the third table is corresponding to the TBS table in which the quantity of layers to which the transport block is mapped is greater than 1. In this case, when the TBS is mapped to one layer of space, and multi-layer spatial multiplexing does not need to be performed on the TBS in this application, a TBS with a larger value may be found by searching the third table. Therefore, it can be ensured that the determined TBS corresponding to the first broadcast channel is larger, and an amount of data transmitted in each subframe is larger.

Optionally, the third table is further corresponding to a TBS table in which a quantity of layers to which a transport block is mapped is 2, the third table is further corresponding to a TBS table in which a quantity of layers to which a transport block is mapped is 3, or the third table is further corresponding to a TBS table in which a quantity of layers to which a transport block is mapped is 4.

Optionally, the third table may alternatively be a table obtained by combining a plurality of tables in a TBS table in which a quantity of layers to which a transport block is mapped is 1, a TBS table in which a quantity of layers to which a transport block is mapped is 2, a TBS table in which a quantity of layers to which a transport block is mapped is 3, and a TBS table in which a quantity of layers to which a transport block is mapped is 4, or a table obtained by truncating at least one table.

Optionally, a TBS table in which a quantity of layers to which a transport block is mapped is 1 may be shown as Table 3, a TBS table in which a quantity of layers to which a transport block is mapped is 2 may be shown as Table 4, a TBS table in which a quantity of layers to which a transport block is mapped is 3 may be shown as Table 5, and a TBS table in which a quantity of layers to which a transport block is mapped is 4 may be shown as Table 6.

Optionally, when determining the TBS corresponding to the first broadcast channel in this manner, the communication device determines that the frequency domain resource is greater than a fifth threshold.

If the communication device is a terminal device UE, the fifth threshold may be predefined or may be configured by using higher layer signaling.

If the communication device is a network side device, the fifth threshold may be predefined or may be sent by the network side device to UE.

For example, that the communication device determines that the frequency domain resource is greater than a fifth threshold may be that the communication device determines that an actual quantity of RBs is greater than the fifth threshold.

Optionally, if the communication device determines that the frequency domain resource is less than or equal to the fifth threshold, the communication device may determine the TBS as follows: The communication device determines the first TBS index based on the index of the MCS and the first table, and determines the TBS based on the first TBS index, the frequency domain resource, and the second table.

Optionally, the communication device determines an scaled frequency domain resource based on the frequency domain resource, and the communication device determines the TBS based on the first TBS index, the scaled frequency domain resource, and the second table.

If the frequency domain resource includes a quantity of RBs, optionally, an scaled quantity of RBs is determined based on a determined scale factor and the actual quantity of RBs. For example, $N_{PRB}^{ex}=\alpha \cdot N_{PRB}$, where $N_{PRB}^{ex}$ is the scaled quantity of RBs, $\alpha$ is the determined scale factor, and $N_{PRB}$ is the actual quantity of RBs.

Optionally, the scaled quantity of RBs is determined based on the determined scale factor and the actual quantity of RBs. For example, $N_{PRB}^{ex}=\lceil \alpha \cdot N_{PRB} \rceil$, $N_{PRB}^{ex}=\lfloor \alpha \cdot N_{PRB} \rfloor$, or $N_{PRB}^{ex}=[\alpha \cdot N_{PRB}]$, where $\alpha$ is the determined scale factor, and $N_{PRB}$ is the actual quantity of RBs.

Optionally, the determined scale factor may be configured by using higher layer signaling, and may be determined based on stored data corresponding to a numerology-related parameter.

Optionally, the determined scale factor may be configured by using a master information block MIB, an MBMS master information block MIB-MBMS, a system information block type 1 SIB1, an MBMS system information block type 1 SIB1-MBMS, or a system information block type 13 SIB13.

For example, if the determined scale factor is configured by using higher layer signaling, the scale factor may be the same as a parameter value corresponding to the foregoing configured parameter used to indicate to perform TBS determining in the manner provided in this application.

For example, if it is determined that the scale factor is determined based on the stored data corresponding to the numerology-related parameter, and the SCS is Δf=0.625 kHz, the determined scale factor is 2.

For example, if it is determined that the scale factor is determined based on the stored data corresponding to the numerology-related parameter, and the SCS is Δf=0.37 kHz or Δf=0.371 kHz, the determined scale factor is one of the following possible values.

That is, a possible value of the determined scale factor may be in {3, 3.25, 3.375, 3.56, 3.69, 3.875, 3.93, 4, 4.06, 4.375, 4.5, 4.625, 5.75, 5.875}, or may be in {3, 3.01, 3.02, 3.03, 3.04, 3.05, 3.06, 3.07, 3.08, 3.09, 3.1, 3.11, 3.12, 3.13, 3.14, 3.15, 3.16, 3.17, 3.18, 3.19, 3.2, 3.21, 3.22, 3.23, 3.24, 3.25, 3.26, 3.27, 3.28, 3.29, 3.3, 3.31, 3.32, 3.33, 3.34, 3.35, 3.36, 3.37, 3.38, 3.39, 3.4, 3.41, 3.42, 3.43, 3.44, 3.45, 3.46, 3.47, 3.48, 3.49, 3.51, 3.52, 3.53, 3.54, 3.55, 3.56, 3.57, 3.58, 3.59, 3.6, 3.61, 3.62, 3.63, 3.64, 3.65, 3.66, 3.67, 3.68, 3.69, 3.7, 3.71, 3.72, 3.73, 3.74, 3.75, 3.76, 3.77, 3.78, 3.79, 3.8, 3.81, 3.82, 3.83, 3.84, 3.85, 3.86, 3.87, 3.88, 3.89, 3.9, 3.91, 3.92, 3.93, 3.94, 3.95, 3.96, 3.97, 3.98, 3.99, 4, 4.01, 4.02, 4.03, 4.04, 4.05, 4.06, 4.07, 4.08, 4.09, 4.1, 4.11, 4.12, 4.13, 4.14, 4.15, 4.16, 4.17, 4.18, 4.19, 4.2, 4.21, 4.22, 4.23, 4.24, 4.25, 4.26, 4.27, 4.28, 4.29, 4.3, 4.31, 4.32, 4.33, 4.34, 4.35, 4.36, 4.37, 4.38, 4.39, 4.4, 4.41, 4.42, 4.43, 4.44, 4.45, 4.46, 4.47, 4.48, 4.49, 4.5, 4.51, 4.52, 4.53, 4.54, 4.55, 4.56, 4.57, 4.58, 4.59, 4.6, 4.61, 4.62, 4.63, 4.64, 4.65, 4.66, 4.67, 4.68, 4.69, 4.7, 4.71, 4.72, 4.73, 4.74, 4.75, 4.76, 4.77, 4.78, 4.79, 4.8, 4.81, 4.82, 4.83, 4.84, 4.85, 4.86, 4.87, 4.88, 4.89, 4.9, 4.91, 4.92, 4.93, 4.94, 4.95, 4.96, 4.97, 4.98, 4.99, 5, 5.01, 5.02, 5.03, 5.04, 5.05, 5.06, 5.07, 5.08, 5.09, 5.1, 5.11, 5.12, 5.13, 5.14, 5.15, 5.16, 5.17, 5.18, 5.19, 5.2, 5.21, 5.22, 5.23, 5.24, 5.25, 5.26, 5.27, 5.28, 5.29, 5.3, 5.31, 5.32, 5.33, 5.34, 5.35, 5.36, 5.37, 5.38, 5.39, 5.4, 5.41, 5.42, 5.43, 5.44, 5.45, 5.46, 5.47, 5.48, 5.49, 5.5, 5.51, 5.52, 5.53, 5.54, 5.55, 5.56, 5.57, 5.58, 5.59, 5.6, 5.61, 5.62, 5.63, 5.64, 5.65, 5.66, 5.67, 5.68, 5.69, 5.7, 5.71, 5.72, 5.73, 5.74, 5.75, 5.76, 5.77, 5.78, 5.79, 5.8, 5.81, 5.82, 5.83, 5.84, 5.85, 5.86, 5.87, 5.88, 5.89, 5.9, 5.91, 5.92, 5.93, 5.94, 5.95, 5.96, 5.97, 5.98, 5.99, 6}. For example, the determined scale factor is 3 or 4. The foregoing data set includes all data between 3 and 6. Data that does not appear in the table may be represented by using existing data in the table. For example, 3.005 does not appear in the table and may be represented by using 3 or 3.01. The foregoing possible values of the scale factor are used, so that a determined TBS may be more accurately matched with the MCS.

Optionally, if the fifth threshold may alternatively be determined based on the determined scale factor, a relationship between the fifth threshold and the determined scale factor is $$x = \left\lfloor \frac{110}{\alpha} \right\rfloor$$

or $$x = \left\lceil \frac{110}{\alpha} \right\rceil,$$

which is specifically explained as that the fifth threshold x is equal to 110 divided by a and rounded down or rounded up. For example, if a is 3, it is determined, based on the relationship, that the fifth threshold is 36 (corresponding to a fifth threshold x obtained by performing rounding down) or 37 (corresponding to a fifth threshold x obtained by performing rounding up).

Optionally, if the fifth threshold may alternatively be determined based on the determined scale factor, a relationship between the fifth threshold and the determined scale factor is $$x = \left\lfloor \frac{110}{\alpha} \right\rfloor,$$

$$x = \left\lceil \frac{110}{\alpha} \right\rceil,$$

or $$x = \left| \frac{110}{\alpha} \right|,$$

which is specifically explained as that the fifth threshold x is equal to 110 divided by α and rounded down, rounded up, or rounded off. For example, if α is 3.375, it is determined, based on the relationship, that the fifth threshold is 32 (corresponding to a fifth threshold x obtained by performing rounding down) or 33 (corresponding to a fifth threshold x obtained by performing rounding up or corresponding to a fifth threshold x obtained by performing rounding off).

If the communication device determines, in the manner shown in step S2-1, the TBS corresponding to the first broadcast channel, the communication device only needs to determine, before determining the first intermediate variable, that the first broadcast channel has at least one of the foregoing characteristics. A specific determining occasion is not limited. Optionally, the communication device may first determine that the first broadcast channel has at least one of the foregoing characteristics, then determine the first TBS index based on the index of the MCS and the first table, and determine the first intermediate variable based on the first TBS index, the frequency domain resource, and the second table. Optionally, the communication device may first determine the first TBS index based on the MCS index and the first table, then determine that the first broadcast channel has at least one of the foregoing characteristics, and determine the first intermediate variable based on the first TBS index, the frequency domain resource, and the second table.

Optionally, a process of determining that the first broadcast channel has at least one of the foregoing characteristics may also be implemented by using a determining condition. For example, the communication device determines whether the first broadcast channel has at least one of the foregoing characteristics, and if yes, determines that the first broadcast channel has at least one of the foregoing characteristics.

Step S2-2: The communication device determines a first TBS index based on an index of the MCS and a first table, determines a second intermediate variable based on the first TBS index, the frequency domain resource, and a second table, and determines the TBS based on the second intermediate variable and a first scale factor, where the first scale factor is greater than 1.

In the manner of determining the TBS in step S2-2, a process in which the communication device determines the first TBS index based on the index of the MCS and the first table is the same as a process of determining the first TBS index in step S2-1. Details are not described herein again.

In the manner of determining the TBS in step S2-2, a process in which the communication device determines the second intermediate variable based on the first TBS index, the frequency domain resource, and the second table is similar to a process of determining the first intermediate variable in step S2-1. Details are not described herein again.

The communication device may determine the TBS based on the second intermediate variable and a first scale factor, which is specifically equivalent to scaling the second intermediate variable based on the first scale factor to determine the TBS. Because the TBS after the expansion is larger than the second intermediate variable, the determined TBS corresponding to the first broadcast channel is larger, and an amount of data transmitted in each subframe is larger.

A process of determining the first scale factor in step S2-2 is the same as a process of determining the scale factor in step S2-1, and details are not described herein again.

A possible value of the determined scale factor may be in {3, 3.25, 3.375, 3.56, 3.69, 3.875, 3.93, 4, 4.06, 4.375, 4.5, 4.625, 5.75, 5.875}, or may be in {3, 3.01, 3.02, 3.03, 3.04, 3.05, 3.06, 3.07, 3.08, 3.09, 3.1, 3.11, 3.12, 3.13, 3.14, 3.15, 3.16, 3.17, 3.18, 3.19, 3.2, 3.21, 3.22, 3.23, 3.24, 3.25, 3.26, 3.27, 3.28, 3.29, 3.3, 3.31, 3.32, 3.33, 3.34, 3.35, 3.36, 3.37, 3.38, 3.39, 3.4, 3.41, 3.42, 3.43, 3.44, 3.45, 3.46, 3.47, 3.48, 3.49, 3.5, 3.51, 3.52, 3.53, 3.54, 3.55, 3.56, 3.57, 3.58, 3.59, 3.6, 3.61, 3.62, 3.63, 3.64, 3.65, 3.66, 3.67, 3.68, 3.69, 3.7, 3.71, 3.72, 3.73, 3.74, 3.75, 3.76, 3.77, 3.78, 3.79, 3.8, 3.81, 3.82, 3.83, 3.84, 3.85, 3.86, 3.87, 3.88, 3.89, 3.9, 3.91, 3.92, 3.93, 3.94, 3.95, 3.96, 3.97, 3.98, 3.99, 4, 4.01, 4.02, 4.03, 4.04, 4.05, 4.06, 4.07, 4.08, 4.09, 4.1, 4.11, 4.12, 4.13, 4.14, 4.15, 4.16, 4.17, 4.18, 4.19, 4.2, 4.21, 4.22, 4.23, 4.24, 4.25, 4.26, 4.27, 4.28, 4.29, 4.3, 4.31, 4.32, 4.33, 4.34, 4.35, 4.36, 4.37, 4.38, 4.39, 4.4, 4.41, 4.42, 4.43, 4.44, 4.45, 4.46, 4.47, 4.48, 4.49, 4.5, 4.51, 4.52, 4.53, 4.54, 4.55, 4.56, 4.57, 4.58, 4.59, 4.6, 4.61, 4.62, 4.63, 4.64, 4.65, 4.66, 4.67, 4.68, 4.69, 4.7, 4.71, 4.72, 4.73, 4.74, 4.75, 4.76, 4.77, 4.78, 4.79, 4.8, 4.81, 4.82, 4.83, 4.84, 4.85, 4.86, 4.87, 4.88, 4.89, 4.9, 4.91, 4.92, 4.93, 4.94, 4.95, 4.96, 4.97, 4.98, 4.99, 5, 5.01, 5.02, 5.03, 5.04, 5.05, 5.06, 5.07, 5.08, 5.09, 5.1, 5.11, 5.12, 5.13, 5.14, 5.15, 5.16, 5.17, 5.18, 5.19, 5.2, 5.21, 5.22, 5.23, 5.24, 5.25, 5.26, 5.27, 5.28, 5.29, 5.3, 5.31, 5.32, 5.33, 5.34, 5.35, 5.36, 5.37, 5.38, 5.39, 5.4, 5.41, 5.42, 5.43, 5.44, 5.45, 5.46, 5.47, 5.48, 5.49, 5.5, 5.51, 5.52, 5.53, 5.54, 5.55, 5.56, 5.57, 5.58, 5.59, 5.6, 5.61, 5.62, 5.63, 5.64, 5.65, 5.66, 5.67, 5.68, 5.69, 5.7, 5.71, 5.72, 5.73, 5.74, 5.75, 5.76, 5.77, 5.78, 5.79, 5.8, 5.81, 5.82, 5.83, 5.84, 5.85, 5.86, 5.87, 5.88, 5.89, 5.9, 5.91, 5.92, 5.93, 5.94, 5.95, 5.96, 5.97, 5.98, 5.99, 6}. For example, the determined first scale factor is 3 or 4. The foregoing data set includes all data between 3 and 6. Data that does not appear in the table may be represented by using existing data in the table. For example, 3.005 does not appear in the table and may be represented by using 3 or 3.01. The foregoing possible values of the scale factor are used, so that a determined TBS may be more accurately matched with the MCS.

For example, the communication device may directly determine a first product of the second intermediate variable and the first scale factor as the TBS, that is, TBS_2=α·TBS_1, where TBS_2 is the first product, a is the determined first scale factor, and TBS_1 is the second intermediate variable.

For another example, the communication device may determine the TBS based on the second intermediate variable and the first scale factor, that is, $$TBS\_2 = \left| \frac{\alpha \cdot TBS\_1}{y} \right| \cdot y,$$

$$TBS\_2 = \left\lfloor \frac{\alpha \cdot TBS\_1}{y} \right\rfloor \cdot y,$$

or $$TBS\_2 = \left\lceil \frac{\alpha \cdot TBS\_1}{y} \right\rceil \cdot y,$$

where TBS_2 is the determined TBS, a is the determined first scale factor, TBS_1 is the second intermediate variable, and y is a positive integer and is a multiple of 8, for example, 8, 16, 24, or 32. A specific explanation is: The determined TBS, that is, TBS_2, is equal to a value that is an integer multiple of y and that is closest to a determined product of the first scale factor α and the second intermediate variable TBS_1, is equal to a value that is an integer multiple of y and that is smaller than a determined product of the first scale factor α and the second intermediate variable TBS_1 and is closest to the product, or is equal to a value that is an integer multiple of y and that is greater than a determined product of the first scale factor α and the second intermediate variable TBS_1 and is closest to the product.

For another example, the communication device may select, as the TBS based on a first product of the second intermediate variable and the first scale factor, a value closest to the first product from a predefined or configured TBS resource pool.

Optionally, the communication device selects, as the TBS, a value with a smallest difference from the first product, from all TBS values in the TBS resource pool.

Optionally, the communication device selects, as the TBS, a value with a smallest difference from the first product, from TBS values less than the first product in the TBS resource pool.

Optionally, the communication device selects, as the TBS, a value with a smallest difference from the first product, from TBS values greater than the first product in the TBS resource pool.

Optionally, the TBS resource pool may include the second table and all or some TBS values in the second table.

Optionally, the TBS resource pool may include all or some TBS values in a combination of one or more of Table 3 to Table 6. For example, TBS values in the TBS resource pool include all or some TBS values in any one of Table 3, Table 4, Table 5, and Table 6, or a combination of two of the tables or a combination of three of the tables or a combination of four of the tables. For example, the TBS resource pool may include all TBS values that appear in Table 3. The TBS resource pool may alternatively include all TBS values that appear in Table 3, Table 4, Table 5, and Table 6.

Optionally, the TBS resource pool may be shown in Table 7. Table 7 shows only some TBS values in TBS resources, and does not constitute a limitation on all possible TBS values in the TBS resource pool.

TABLE 7

| 16 | 552 | 1544 | 4264 | 13536 | 45352 | 125808 | 239656 |
|---|---|---|---|---|---|---|---|
| 24 | 568 | 1544 | 4392 | 14112 | 46888 | 128496 | 245648 |
| 32 | 584 | 1608 | 4584 | 14688 | 48936 | 130392 | 248272 |
| 40 | 600 | 1672 | 4776 | 15264 | 51024 | 133208 | 251640 |
| 56 | 616 | 1736 | 4968 | 15840 | 52752 | 137792 | 254328 |
| 72 | 632 | 1800 | 5160 | 16416 | 55056 | 142248 | 266440 |
| 88 | 648 | 1864 | 5352 | 16992 | 57336 | 146856 | 275376 |
| 104 | 680 | 1928 | 5544 | 17568 | 59256 | 149776 | 284608 |
| 120 | 696 | 1992 | 5736 | 18336 | 61664 | 151376 | 293736 |
| 136 | 712 | 2024 | 5992 | 19080 | 63776 | 152976 | 299856 |
| 144 | 744 | 2088 | 6200 | 19848 | 66592 | 157432 | 305976 |
| 152 | 776 | 2152 | 6456 | 20616 | 68808 | 161760 | 314888 |
| 176 | 808 | 2216 | 6712 | 21384 | 71112 | 165216 | 324336 |
| 208 | 840 | 2280 | 6968 | 22152 | 73712 | 169544 | 336576 |
| 224 | 872 | 2344 | 7224 | 22920 | 75376 | 171888 | 339112 |
| 256 | 904 | 2408 | 7480 | 23688 | 76208 | 175600 | 351224 |
| 280 | 936 | 2472 | 7736 | 24496 | 78704 | 177816 | 363336 |
| 288 | 968 | 2536 | 7992 | 25456 | 81176 | 181656 | 373296 |
| 296 | 1000 | 2600 | 8248 | 26416 | 84760 | 185728 | 375448 |
| 328 | 1032 | 2664 | 8504 | 27376 | 87936 | 187712 | 391656 |
| 336 | 1064 | 2728 | 8760 | 28336 | 90816 | 191720 | 422232 |
| 344 | 1096 | 2792 | 9144 | 29296 | 93800 | 195816 | 440616 |
| 376 | 1128 | 2856 | 9528 | 30576 | 97896 | 199824 | 452832 |
| 392 | 1160 | 2984 | 9912 | 31704 | 100752 | 201936 | 460232 |
| 408 | 1192 | 3112 | 10296 | 32856 | 101840 | 203704 | 471192 |
| 424 | 1224 | 3240 | 10680 | 34008 | 105528 | 205880 | 478400 |
| 440 | 1256 | 3368 | 11064 | 35160 | 107832 | 211936 | 501792 |
| 456 | 1288 | 3496 | 11448 | 36696 | 110136 | 214176 | 502624 |
| 472 | 1320 | 3624 | 11832 | 37888 | 112608 | 220296 | |
| 488 | 1352 | 3752 | 12216 | 39232 | 115040 | 221680 | |
| 504 | 1384 | 3880 | 12384 | 40576 | 117256 | 226416 | |
| 520 | 1416 | 4008 | 12576 | 42368 | 119816 | 230104 | |
| 536 | 1480 | 4136 | 12960 | 43816 | 124464 | 236160 | |

If the communication device determines, in the manner shown in step S2-2, the TBS corresponding to the first broadcast channel, the communication device only needs to determine, before determining the second intermediate variable, that the first broadcast channel has at least one of the foregoing characteristics. A specific determining occasion is not limited. Optionally, the communication device may first determine that the first broadcast channel has at least one of the foregoing characteristics, then determine the first TBS index based on the index of the MCS and the first table, and determine the second intermediate variable based on the first TBS index, the frequency domain resource, and the second table. Optionally, the communication device may first determine the first TBS index based on the MCS index and the first table, then determine that the first broadcast channel has at least one of the foregoing characteristics, and determine the second intermediate variable based on the first TBS index, the frequency domain resource, and the second table.

Optionally, a process of determining that the first broadcast channel has at least one of the foregoing characteristics may also be implemented by using a determining condition. For example, the communication device determines whether the first broadcast channel has at least one of the foregoing characteristics, and if yes, determines that the first broadcast channel has at least one of the foregoing characteristics.

Step S2-3: The communication device determines a quantity of REs based on the frequency domain resource, and determines the TBS based on the quantity of REs and an index of the MCS.

The communication device determines the quantity of REs based on the frequency domain resource. Optionally, the determined quantity of REs may include a quantity of REs allocated to a PMCH in one RB, and may include a quantity of REs allocated to the PMCH in all used RBs, that is, a total quantity of REs allocated to the PMCH.

If the quantity of REs includes the quantity of REs allocated to the PMCH in one RB, for example, when the communication device determines the quantity of REs based on the frequency domain resource, the quantity of REs may be determined based on a quantity of subcarriers in one RB, a quantity of symbols allocated to the PMCH in one subframe, and a quantity of REs of an MBSFN reference signal (Reference Signal, RS) in each RB.

Specifically, when the quantity of REs is determined based on the quantity of subcarriers in one RB, the quantity of symbols allocated to the PMCH in one subframe, and the quantity of REs of the MBSFN RS in each RB, the quantity of REs may be calculated and determined by using the following formula: $N_{RE}' = N_{sc}^{RB} \cdot N_{symb}^{sh} - N_{MBSFN}^{PRB}$, where $N_{RE}'$ is the quantity of REs allocated to the PMCH in one RB, $N_{sc}^{RB}$ is the quantity of subcarriers in one RB, $N_{symb}^{sh}$ is the quantity of symbols allocated to the PMCH in one subframe, and $N_{MBSFN}^{PRB}$ is the quantity of REs of the MBSFN RS in each RB.

Optionally, the quantity of subcarriers in one RB, the quantity of symbols allocated to the PMCH in one subframe, and the quantity of REs of the MBSFN RS in each RB may be determined based on the stored data corresponding to the numerology-related parameter. For example, when the numerology-related parameter is the SCS and Δf=15 kHz when the SCS is used, the quantity of subcarriers in one RB is $N_{sc}^{RB}=12$, the quantity of symbols allocated to the PMCH in one subframe is $N_{symb}^{sh}=12$, and the quantity of REs of the MBSFN RS in each RB is $N_{MBSFN}^{PRB}=18$.

Optionally, when determining the quantity $N_{RE}'$ of REs allocated to the PMCH in one RB, the UE may further consider other resource overheads. For example, the quantity of REs allocated to the PMCH in one RB may be determined by using the following formula: $N_{RE}' = N_{sc}^{RB} \cdot N_{symb}^{sh} - N_{MBSFN}^{PRB} - N_{oh}^{PRB}$, where $N_{oh}^{PRB}$ represents overheads of resources except the MBSFN RS. Optionally, the other resource overheads may be configured by using a higher layer parameter of the network side device, or may be obtained in another manner. This is not limited herein. Optionally, $N_{oh}^{PRB}=0$.

If the quantity of REs includes the quantity of REs allocated to the PMCH in all used RBs, for example, the communication device determines the quantity based on a quantity of all RBs allocated to the communication device and the quantity of REs allocated to the PMCH in one RB.

Specifically, when determining, based on the quantity of all RBs allocated to the communication device and the quantity of REs allocated to the PMCH in one RB, the quantity of REs allocated to the PMCH in all used RBs, the quantity of REs may be calculated and determined by using the following formula: $N_{RE} = N_{RE}' \cdot n_{PRB}$, where $N_{RE}$ is the quantity of REs allocated to the PMCH in all used RBs, and $n_{PRB}$ is the quantity of all RBs allocated to the communication device.

Optionally, that the communication device determines the quantity of REs based on the frequency domain resource includes: The communication device determines the quantity of REs based on the frequency domain resource and a sixth threshold.

The sixth threshold is a threshold corresponding to a quantity of available REs of one or more RBs in the frequency domain resource, that is, an upper limit set for the quantity of REs allocated to the PMCH.

The sixth threshold is a threshold corresponding to a quantity of available REs of one RB in the frequency domain resource, and a use process is similar to that of a threshold corresponding to a quantity of available REs of a plurality of RBs in the frequency domain resource. Therefore, an example in which the sixth threshold is the threshold corresponding to the quantity of available REs of one RB in the frequency domain resource is used for description herein. The quantity of REs allocated to the PMCH in one RB, that is, the quantity of available REs of one RB, is min(a,$N_{RE}'$), where $N_{RE}'$ is the quantity that is of REs allocated to the PMCH in one RB and that is calculated according to the foregoing formula, and a is a threshold corresponding to the quantity of available REs of one RB, that is, the corresponding sixth threshold. In this case, a formula for calculating a total quantity of REs is $N_{RE}=\min(a, N_{RE}') \cdot n_{PRB}$.

The sixth threshold may be configured by using higher layer signaling, or may be a predefined value. For example, the sixth threshold is greater than 156 and less than or equal to 846.

For example, if the sixth threshold is the threshold corresponding to the quantity of available REs of one RB, and the sixth threshold is 156, a formula for calculating the foregoing total quantity of REs is $N_{RE}=\min(156, N_{RE}') \cdot n_{PRB}$.

In step S2-3, a quantity of RBs corresponding to a subframe whose length exceeds 1 ms is greater than a quantity of RBs corresponding to a subframe whose length is 1 ms. Therefore, a determined total quantity of REs that are allocated to the PMCH and that are corresponding to the subframe whose length exceeds 1 ms is also greater than a total quantity of REs corresponding to the subframe whose length is 1 ms. Therefore, a determined TBS corresponding to the subframe whose length exceeds 1 ms is also larger, and an amount of data transmitted in each subframe is also larger.

The communication device determines a TBS based on the quantity of REs and the index of the MCS. For example, the communication device determines a modulation order and a code rate based on the index of the MCS and a fourth table, and determines the TBS based on the total quantity of REs allocated to the PMCH and the determined modulation order and code rate. The fourth table includes a correspondence between the MCS index, the modulation order, and the code rate.

For example, the fourth table may be shown as Table 8 or Table 9, where MCS Index $I_{MCS}$ is the index of the MCS, Modulation Order $Q_m$ is the modulation order, Target code Rate R×[1024] is a product of the code rate and 1024, Spectral efficiency is spectral efficiency, and the code rate is a ratio of Target code Rate R×[1024] to 1024.

TABLE 8

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |

TABLE 8-continued

| MCS Index $I_{MCS}$ | Modulation Order $Q_m$ | Target code Rate R × [1024] | Spectral efficiency |
|---|---|---|---|
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

TABLE 9

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

Optionally, the communication device determines a quantity of information bits based on the total quantity of REs allocated to the PMCH and the determined modulation order and code rate, and determines the TBS based on the determined quantity of information bits.

That the communication device determines the quantity of information bits based on the total quantity of REs allocated to the PMCH and the determined modulation order and code rate may be performing calculation by using the following formula: $N_{info}=N_{RE} \cdot Q_m \cdot v$, where $N_{info}$ is the quantity of information bits, $Q_m$ is the modulation order, and i is the code rate.

Optionally, if a plurality of layers of data are configured for the PMCH, determining the quantity of information bits based on the total quantity of REs allocated to the PMCH and the modulation order and code rate may be performing calculation by using the following formula: $N_{info}=N_{RE} \cdot R \cdot Q_m \cdot v$, where R is a quantity of layers, and may represent a quantity of layers for spatial multiplexing, or another quantity of layers that affect the quantity of information bits.

For example, that the communication device determines the TBS based on the determined quantity of information bits may be performing calculation by using the following formula:

$$TBS = 8 \cdot \left\lceil \frac{N_{info} + 24}{8} \right\rceil - 24$$

or $$TBS = 8 \cdot \left\lfloor \frac{N_{info} + 24}{8} \right\rfloor - 24,$$

where a unit of the TBS is bit; the value 24 is used to indicate overheads of a cyclic redundancy check (Cyclic Redundancy Check, CRC), and a unit is bit; and 8 is used to ensure that the TBS is an integer multiple of 8, when the TBS is converted into Bytes, the TBS is an integer, and a conversion formula is as follows: 1 Byte (B)=8 bits (b).

Figure 5:
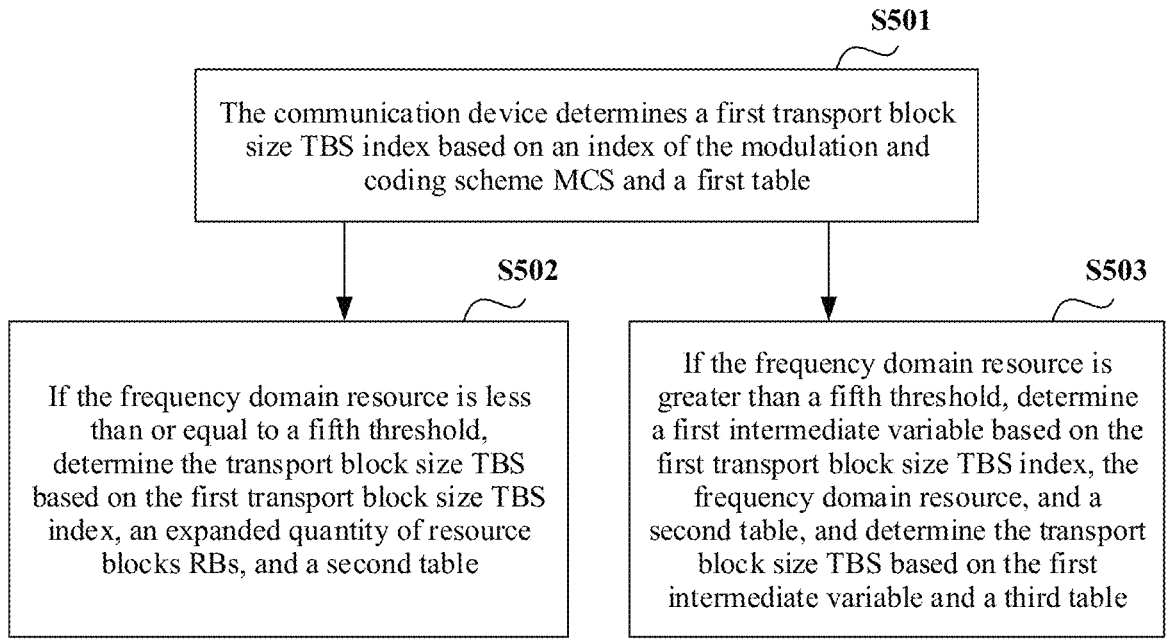
FIG. 5 is a schematic diagram of a TBS determining procedure applicable to an embodiment of this application.

Optionally, in an implementation, in step S2-1, the TBS may be determined in a manner 1 shown in FIG. 5, and the following steps are included:

Step 501: The communication device determines a first TBS index based on the index of the MCS and a first table, where the first table includes a correspondence between the MCS index and a TBS index.

For step 501, refer to the process of determining the first TBS index based on the MCS index and the first table in step S2-1. Details are not described herein again.

Step 502: If the frequency domain resource is less than or equal to the fifth threshold, determine the TBS based on the first TBS index, an scaled quantity of RBs, and a second table, where the scaled quantity of RBs is determined based on the frequency domain resource and an scale factor, and the second table includes a correspondence between the TBS index, the scaled quantity of RBs, and the TBS.

The frequency domain resource includes a quantity of RBs.

For a process of determining the scaled quantity of RBs based on the frequency domain resource and the scale factor, refer to the process shown in step S2-1. Details are not described herein again.

Optionally, the second table may be a second table shown as Table 3. The second table may alternatively be a second table obtained after Table 3 is truncated. The second table may alternatively be a second table obtained by scaling Table 3. The second table may alternatively be a table applied to a 5G NR system.

Step 503: If the frequency domain resource is greater than the fifth threshold, determine a first intermediate variable based on the first TBS index, the frequency domain resource, and a second table, and determine the TBS based on the first intermediate variable and a third table, where the second table includes a correspondence between the frequency domain resource, the TBS index, and the first intermediate variable, the third table includes a correspondence between the TBS and the first intermediate variable, and the third table is corresponding to a TBS table in which a quantity of layers to which a transport block is mapped is greater than 1.

For a process of determining the TBS in step 503, refer to step S2-1. Details are not described herein again.

Figure 6:
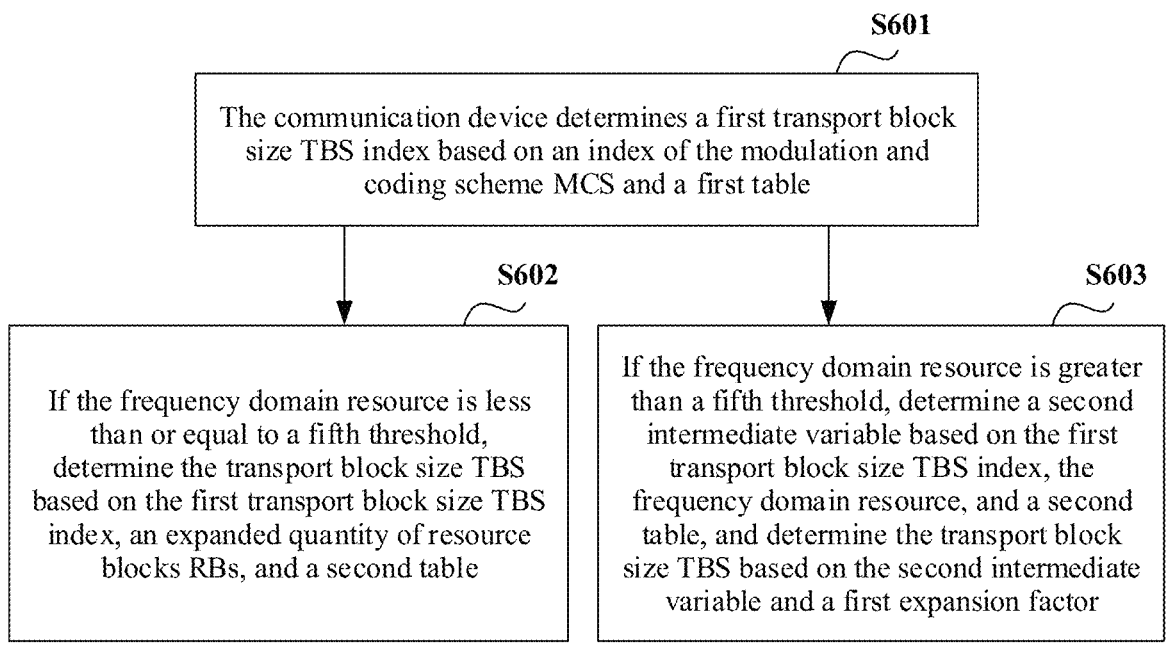
FIG. 6 is a schematic diagram of a TBS determining procedure applicable to an embodiment of this application.

Optionally, in an implementation, in step S2-2, the TBS may be determined in a manner 2 shown in FIG. 6, and the following steps are included:

Step 601: The communication device determines a first TBS index based on the index of the MCS and a first table, where the first table includes a correspondence between the MCS index and a TBS index.

Step 602: If the frequency domain resource is less than or equal to the fifth threshold, determine the TBS based on the first TBS index, an scaled quantity of RBs, and a second table, where the scaled quantity of RBs is determined based on the frequency domain resource and an scale factor, and the second table includes a correspondence between the TBS index, the scaled quantity of RBs, and the TBS.

The frequency domain resource includes a quantity of RBs.

For a process of determining the scaled quantity of RBs based on the frequency domain resource and the scale factor, refer to the process shown in step S2-1. Details are not described herein again.

Optionally, the second table may be a second table shown as Table 3. The second table may alternatively be a second table obtained after Table 3 is truncated. The second table may alternatively be a second table obtained by scaling Table 3. The second table may alternatively be a table applied to a 5G NR system.

Step 603: If the frequency domain resource is greater than the fifth threshold, determine a second intermediate variable based on the first TBS index, the frequency domain resource, and the second table, and determine the TBS based on the second intermediate variable and a first scale factor, where the second table includes a correspondence between the frequency domain resource, the TBS index, and the first intermediate variable.

For a process of determining the TBS in step 603, refer to step S2-2. Details are not described herein again.

Figure 7:
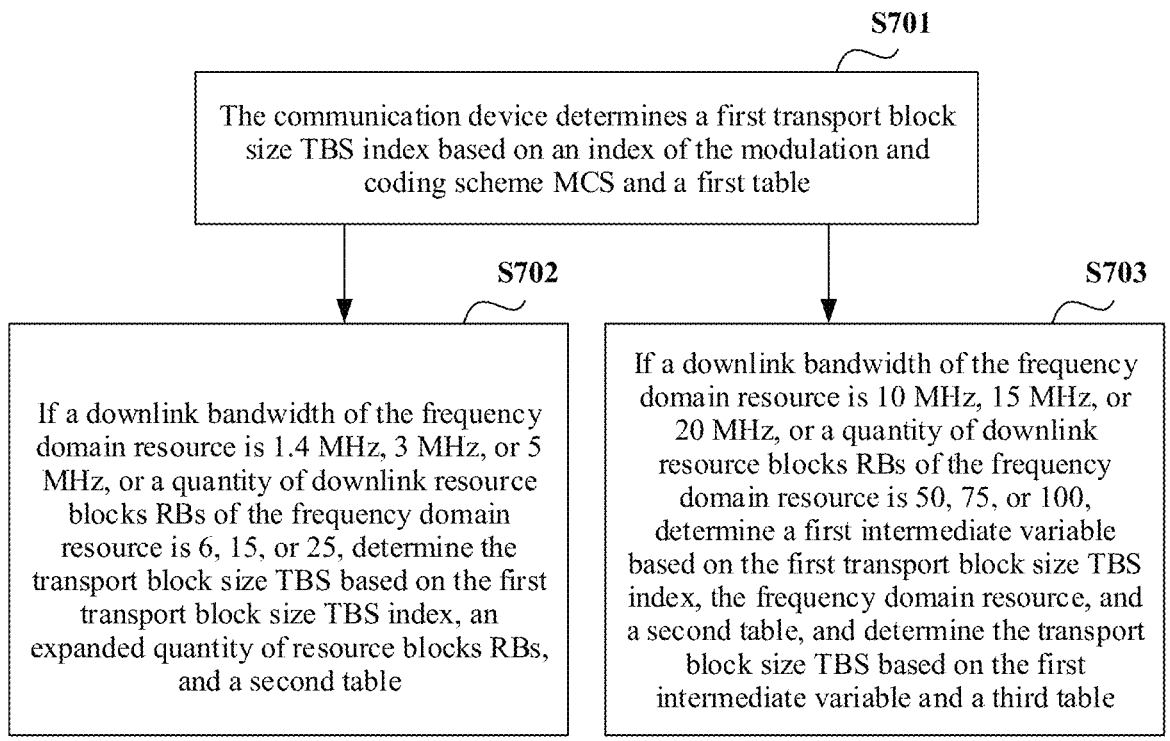
FIG. 7 is a schematic diagram of a TBS determining procedure applicable to an embodiment of this application.

Optionally, in an implementation, in step S2-1, the TBS may be determined in a manner 3 shown in FIG. 7, and the following steps are included:

Step 701: The communication device determines a first TBS index based on the index of the MCS and a first table, where the first table includes a correspondence between the MCS index and a TBS index.

Step 702: If a downlink bandwidth of the frequency domain resource is one of 1.4 MHz, 3 MHz, or 5 MHz, or a quantity of downlink RBs of the frequency domain resource is one of 6, 15, or 25, determine the TBS based on the first TBS index, an scaled quantity of RBs, and a second table, where the scaled quantity of RBs is determined based on the frequency domain resource and an scale factor, and the second table includes a correspondence between the TBS index, the scaled quantity of RBs, and the TBS.

The frequency domain resource includes a quantity of RBs.

For a process of determining the scaled quantity of RBs based on the frequency domain resource and the scale factor, refer to the process shown in step S2-1. Details are not described herein again.

Optionally, the second table may be a second table shown as Table 3. The second table may alternatively be a second table obtained after Table 3 is truncated. The second table may alternatively be a second table obtained by scaling Table 3. The second table may alternatively be a table applied to a 5G NR system.

Step 703: If a downlink bandwidth of the frequency domain resource is one of 10 MHz, 15 MHz, or 20 MHz, or a quantity of downlink RBs of the frequency domain resource is one of 50, 75, or 100, determine a first intermediate variable based on the first TBS index, the frequency domain resource, and a second table, and determine the TBS based on the first intermediate variable and a third table, where the second table includes a correspondence between the frequency domain resource, the TBS index, and the first intermediate variable, the third table includes a correspondence between the TBS and the first intermediate variable, and the third table is corresponding to a TBS table in which a quantity of layers to which a transport block is mapped is greater than 1.

For a process of determining the TBS in step 703, refer to step S2-1. Details are not described herein again.

Figure 8:
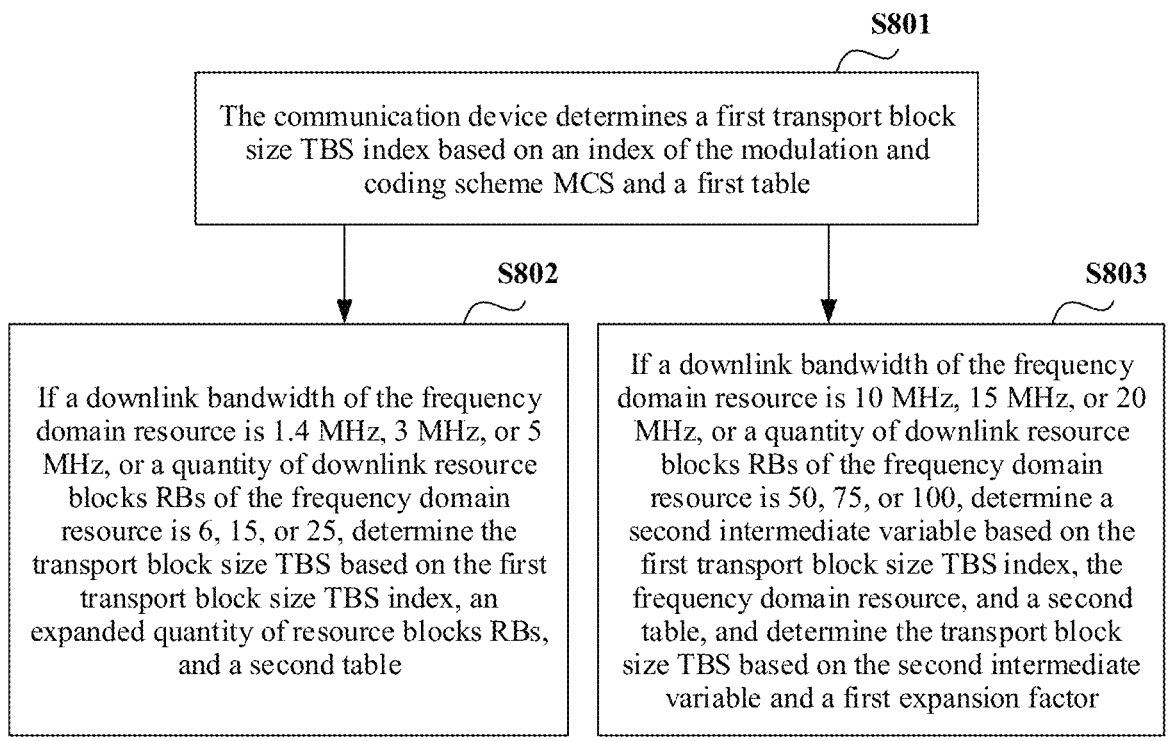
FIG. 8 is a schematic diagram of a TBS determining procedure applicable to an embodiment of this application.

Optionally, in an implementation, in step S2-2, the TBS may be determined in a manner 4 shown in FIG. 8, and the following steps are included:

Step 801: The communication device determines a first TBS index based on the index of the MCS and a first table, where the first table includes a correspondence between the MCS index and a TBS index.

Step 802: If a downlink bandwidth of the frequency domain resource is one of 1.4 MHz, 3 MHz, or 5 MHz, or a quantity of downlink RBs of the frequency domain resource is one of 6, 15, or 25, determine the TBS based on the first TBS index, an scaled quantity of RBs, and a second table, where the scaled quantity of RBs is determined based on the frequency domain resource and an scale factor, and the second table includes a correspondence between the TBS index, the scaled quantity of RBs, and the TBS.

The frequency domain resource includes a quantity of RBs.

For a process of determining the scaled quantity of RBs based on the frequency domain resource and the scale factor, refer to the process shown in step S2-1. Details are not described herein again.

Optionally, the second table may be a second table shown as Table 3. The second table may alternatively be a second table obtained after Table 3 is truncated. The second table may alternatively be a second table obtained by scaling Table 3. The second table may alternatively be a table applied to a 5G NR system.

Step 803: If a downlink bandwidth of the frequency domain resource is one of 10 MHz, 15 MHz, or 20 MHz, or a quantity of downlink RBs of the frequency domain resource is one of 50, 75, or 100, determine a second intermediate variable based on the first TBS index, the frequency domain resource, and a second table, and determine the TBS based on the second intermediate variable and a first scale factor, where the second table includes a correspondence between the frequency domain resource, the TBS index, and the first intermediate variable.

For a process of determining the TBS in step 803, refer to step S2-2. Details are not described herein again.

The following describes a TBS determining process in this application by using three specific embodiments.

Figure 9:
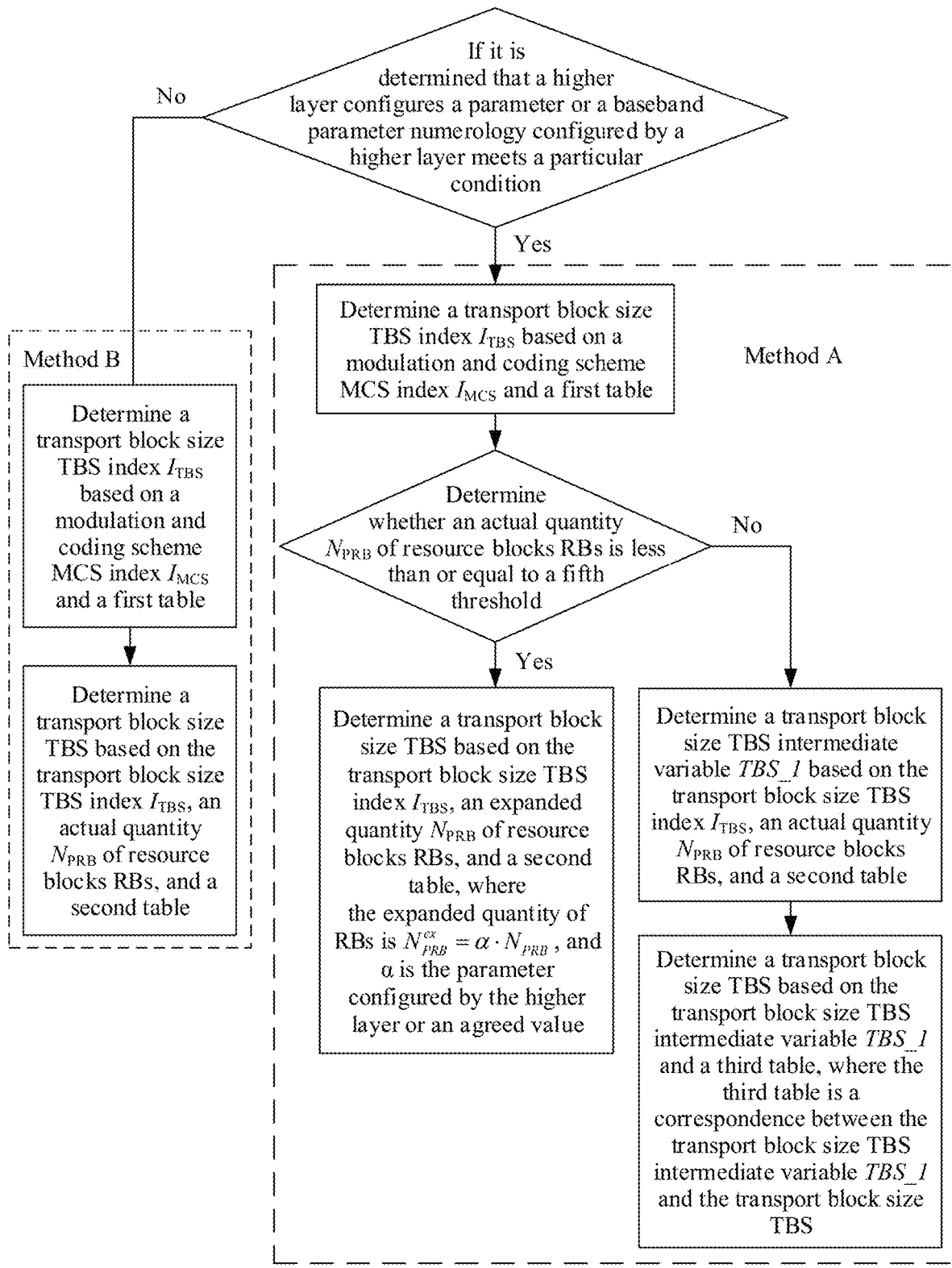
FIG. 9 is a schematic diagram of a TBS determining procedure applicable to an embodiment of this application.

Embodiment 1: Refer to a TBS determining process shown in FIG. 9. The TBS determining process includes the following steps:

Step 0: If UE determines, based on a characteristic of a first broadcast channel, that a TBS needs to be determined for a subframe whose length exceeds 1 ms, the UE determines the TBS by using a method A; otherwise, the UE determines the TBS by using a method B.

Specifically, in step 0, if determining that a parameter, that is, a specified parameter, is configured by a higher layer, or that a numerology configured by a higher layer meets a condition, that is, a specified condition, the UE determines to determine the TBS by using the method A.

For implementation of step 0, refer to the process of determining that the first broadcast channel has at least one of the following characteristics in step 1. Details are not described herein again.

Steps of the method A are as follows:

Step 1 of the method A: The UE determines a TBS index $I_{TBS}$ based on an MCS index $I_{MCS}$ and a first table.

For a first correspondence between the TBS index and the MCS index, refer to the foregoing first table. Details are not described herein again.

Step 2 of the method A: Determine whether an actual quantity $N_{PRB}$ of RBs is less than or equal to a fifth threshold, and if yes, perform step 2a of the method A, or if no, perform step 2b.1 of the method A.

Step 2a of the method A: The UE determines the TBS based on the TBS index $I_{TBS}$, an scaled quantity $N_{PRB}^{ex}$ of RBs, and a second table. The scaled quantity of RBs is $N_{PRB}^{ex}=\alpha \cdot N_{PRB}$, and a is a parameter configured by a higher layer or an agreed value.

Step 2b.1 of the method A: The UE determines a TBS intermediate variable TBS_1 based on the TBS index $I_{TBS}$, an actual quantity $N_{PRB}$ of RBs, and a second table. Step 2b.2 of the method A is performed.

The TBS intermediate variable TBS_1 may be considered as the first intermediate variable.

Step 2b.2 of the method A: The UE determines the TBS based on the TBS intermediate variable TBS_1 and a third table. The third table shows a correspondence between the TBS intermediate variable TBS_1 and the TBS.

In the method A, Step 2a is mutually exclusive with step 2b.1 and step 2b.2.

Step 1 of the method B: The UE determines a TBS index $I_{TBS}$ based on an MCS index $I_{MCS}$ and a first table.

Step 2 of the method B: The UE determines a TBS based on the TBS index $I_{TBS}$, an actual quantity $N_{PRB}$ of RBs, and a second table.

Figure 10:
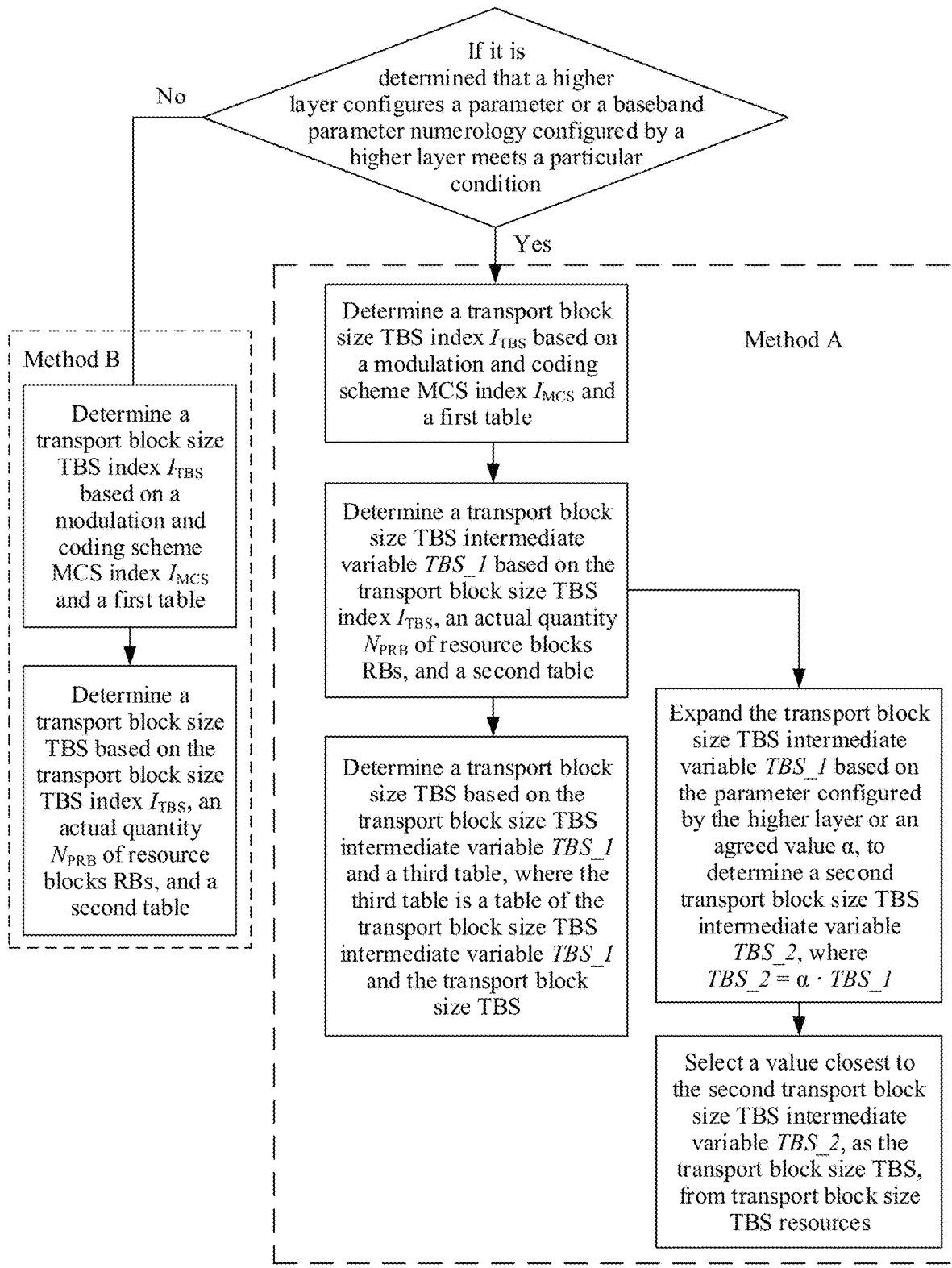
FIG. 10 is a schematic diagram of a TBS determining procedure applicable to an embodiment of this application.

Embodiment 2: Refer to a TBS determining process shown in FIG. 10. The TBS determining process includes the following steps:

Step 0: If UE determines, based on a characteristic of a first broadcast channel, that a TBS needs to be determined for a subframe whose length exceeds 1 ms, the UE determines the TBS by using a method A; otherwise, the UE determines the TBS by using a method B.

Specifically, in step 0, if determining that a parameter, that is, a specified parameter, is configured by a higher layer, or that a numerology configured by a higher layer meets a condition, that is, a specified condition, the UE determines to determine the TBS by using the method A.

For implementation of step 0, refer to the process of determining that the first broadcast channel has at least one of the following characteristics in step S1. Details are not described herein again.

Steps of the method A are as follows:

Step 1 of the method A: The UE determines a TBS index $I_{TBS}$ based on an MCS index $I_{MCS}$ and a first table.

Step 2 of the method A: The UE determines a TBS intermediate variable TBS_1 based on the TBS index $I_{TBS}$, an actual quantity $N_{PRB}$ of RBs, and a second table.

The TBS intermediate variable TBS_1 may be considered as the first intermediate variable.

Step 3a of the method A: The UE determines the TBS based on the TBS intermediate variable TBS_1 and a third table, where the third table shows a correspondence between the TBS intermediate variable TBS_1 and the TBS.

Step 3b.1 of the method A: The UE scales the TBS intermediate variable TBS_1 based on a parameter configured by a higher layer or an agreed value a to determine a second TBS intermediate variable TBS_2, where TBS_2=α·TBS_1.

For a process of determining a, refer to the foregoing process of determining the scale factor. Details are not described herein again.

Step 3b.2 of the method A: The UE selects, as the TBS, a value closest to the second TBS intermediate variable TBS_2 from predefined or specified TBS resources.

For a specific implementation process of step 3b.2, refer to the foregoing process of determining the TBS based on the second intermediate variable and the first scale factor. Details are not described herein again.

In the method A, step 3a is in parallel with step 3b.1 and step 3b.2.

Step 1 of the method B: The UE determines a TBS index $I_{TBS}$ based on an MCS index $I_{MCS}$ and a first table.

Step 2 of the method B: The UE determines a TBS based on the TBS index $I_{TBS}$, an actual quantity $N_{PRB}$ of RBs, and a second table.

Figure 11:
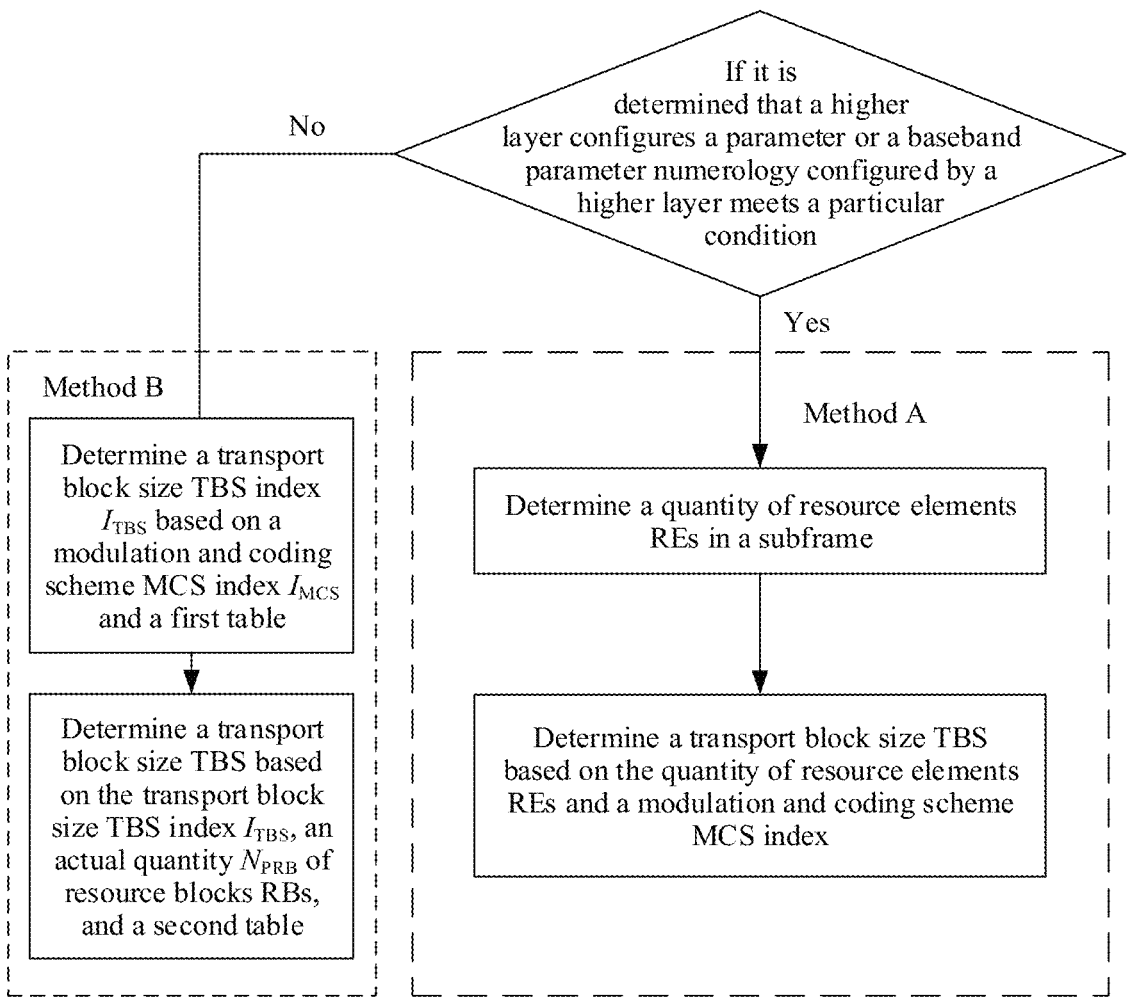
FIG. 11 is a schematic diagram of a TBS determining procedure applicable to an embodiment of this application.

Embodiment 3: Refer to a TBS determining process shown in FIG. 11. The TBS determining process includes the following steps:

Step 0: If UE determines, based on a characteristic of a first broadcast channel, that a TBS needs to be determined for a subframe whose length exceeds 1 ms, the UE determines the TBS by using a method A; otherwise, the UE determines the TBS by using a method B.

Specifically, in step 0, if determining that a parameter, that is, a specified parameter, is configured by a higher layer, or that a numerology configured by a higher layer meets a condition, that is, a specified condition, the UE determines to determine the TBS by using the method A.

For implementation of step 0, refer to the process of determining that the first broadcast channel has at least one of the following characteristics in step S1. Details are not described herein again.

Steps of the method A are as follows:

Step 1 of the method A: The UE determines a quantity of REs in a subframe.

For a process in which the quantity of REs is specifically determined based on the frequency domain resource in this step, details are not described herein again.

Step 2 of the method A: The UE determines the TBS based on a modulation order and a code rate or an MCS.

In this step, the MCS is specifically an index of the MCS, and the modulation order and the code rate are determined based on the index of the MCS based on a fourth table. For details, refer to a process of determining the TBS based on the quantity of REs and the index of the MCS. Details are not described herein again.

Step 1 of the method B: The UE determines a TBS index $I_{TBS}$ based on an MCS index $I_{MCS}$ and a first table.

Step 2 of the method B: The UE determines a TBS based on the TBS index $I_{TBS}$, an actual quantity $N_{PRB}$ of RBs, and a second table.

In addition, there is further an association relationship between a modulation scheme and the TBS index in the embodiments of this application and a channel quality indicator (Channel Quality Indicator, CQI). If a modulation scheme configured by a higher layer and supported by the UE varies, a corresponding association relationship between the modulation scheme and the CQI varies. Specifically, if the higher layer configures that the UE may use QPSK, 16QAM, and 64QAM, an association relationship between the modulation scheme and the CQI may be shown in Table 10. If a higher layer configures that the UE may use QPSK, 16QAM, 64QAM, and 256QAM, an association relationship between the modulation scheme and the CQI may be shown in Table 11.

Table 10 is a CQI table corresponding to QPSK, 16QAM, and 64QAM modulation schemes, where a CQI index represents an index of a CQI, modulation represents a modulation scheme, code rate×1024 represents a value of a code rate×1024, efficiency represents spectral efficiency, and out of range represents out of range.

TABLE 10

| CQI index | Modulation | Code rate × 1024 | Efficiency |
| --- | --- | --- | --- |
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

An association relationship between the modulation order $Q_m$, the TBS index $I_{TBS}$, and the CQI may be represented in Table 2 and Table 10. Table 2 may be obtained based on Table 10. Details are as follows:

$I_{TBS}$ in Table 2 is 14 rows of even numbers 0, 2, 4, 6, 8, 10, 12, 14, 16, 18, 20, 22, 24, 26 (or 26A), which are in a one-to-one correspondence with 14 rows of CQI indexes 2, 3, 4, 5, 6, 7, 8, 9, 10, 11, 12, 13, 14, and 15 in Table 10. $Q_m$ in Table 2 is corresponding to the modulation scheme in Table 10. A modulation scheme corresponding to $Q_m$ 2 is QPSK, a modulation scheme corresponding to $Q_m$ 4 is 16QAM, and a modulation scheme corresponding to $Q_m$ 6 is 64QAM. $I_{TBS}$ in Table 2 is corresponding to a value of code rate×1024 in Table 10. A TBS may be determined based on $I_{TBS}$ in Table 2 and a quantity of RBs, and a code rate may be obtained by dividing the determined TBS by a quantity of bits occupied by a PMCH or a PDSCH. The code rate obtained based on $I_{TBS}$ in Table 2 and the quantity of RBs is similar to or close to a code rate corresponding to a value of code rate×1024 in Table 10. For example, a row in Table 2 where $Q_m$ is 2 and $I_{TBS}$ is 0 is corresponding to a row in Table 10 where a modulation scheme is QPSK and a value of code rate×1024 is 120.

A row whose $I_{TBS}$ is an odd number in Table 2 is obtained based on two adjacent rows whose $I_{TBS}$ is an even number in Table 2. The odd-numbered $I_{TBS}$ is an average value of two $I_{TBS}$ that are adjacent to the odd-numbered $I_{TBS}$, that is, the odd-numbered $I_{TBS}$ is an average value of two $I_{TBS}$ corresponding to two adjacent rows whose $I_{TBS}$ is even-numbered. If $Q_m$ corresponding to two rows whose $I_{TBS}$ is an even number and adjacent to a row whose $I_{TBS}$ is an odd number in Table 2 is equal and is the first value, $Q_m$ corresponding to the row whose $I_{TBS}$ is an odd number is also the first value. If $Q_m$ corresponding to two rows whose $I_{TBS}$ is an even number and adjacent to a row whose $I_{TBS}$ is an odd number in Table 2 is not equal and is separately a first value and a second value, where the first value is less than the second value, $Q_m$ corresponding to the row whose $I_{TBS}$ is an odd number is the first value or the second value. Two adjacent rows whose corresponding $Q_m$ is not equal are a switching point of the modulation scheme. For example, in Table 2, $I_{TBS}$ corresponding to an MCS index $I_{MCS}$ of 9 is 9, and $I_{TBS}$ corresponding to $I_{MCS}$ of 10 is 9. Two adjacent rows whose $I_{TBS}$ is 9 in Table 2 and corresponding modulation orders $Q_m$ are not equal are a switching point of the modulation scheme. Specifically, MCS indexes 9 and 10 are corresponding to TBS indexes 9 in Table 2 are a switching point between QPSK and 16QAM; MCS indexes 16 and 17 are corresponding to TBS indexes 15 in Table 2 are a switching point between 16QAM and 64QAM.

Table 11 is a CQI table corresponding to QPSK, 16QAM, 64QAM, and 256QAM modulation schemes, where a CQI index represents an index of a CQI, modulation represents a modulation scheme, code rate×1024 represents a value of a code rate×1024, efficiency represents spectral efficiency, and out of range represents out of range.

TABLE 11

| CQI index | Modulation | Code rate × 1024 | Efficiency |
| --- | --- | --- | --- |
| 0 | | Out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

An association relationship between the modulation order $Q_m$, the TBS index $I_{TBS}$, and the CQI may be represented in Table 1 and Table 11. Table 1 may be obtained based on Table 11. $Q_m$ in Table 1 is corresponding to the modulation scheme in Table 10. A modulation scheme corresponding to $Q_m$ 2 is QPSK, a modulation scheme corresponding to $Q_m$ 4 is 16QAM, a modulation scheme corresponding to $Q_m$ 6 is 64QAM, and a modulation scheme corresponding to $Q_m$ 8 is 256QAM. For a specific process, refer to the foregoing process of obtaining Table 2 based on Table 10. Similarities are not described again.

There is also a switching point of the modulation scheme in the CQI tables of Table 10 and Table 11. For example, in Table 10, a modulation scheme corresponding to a row whose QCI index is 6 is QPSK, and a modulation scheme corresponding to a row whose QCI index is 7 is 16QAM. Therefore, the rows whose QCI is 6 and 7 are a switching point between modulation schemes QPSK and 16QAM. For another example, in Table 10, a modulation scheme corresponding to a row whose QCI index is 9 is 16QAM, and a modulation scheme corresponding to a row whose QCI index is 10 is 64QAM. Therefore, the rows whose QCI is 9 and 10 are a switching point between modulation schemes 16QAM and 64QAM. The switching point of the modulation scheme is a point of switching to a modulation scheme with optimal link performance when the target spectral efficiency is achieved, that is, when the target spectral efficiency is achieved, better link performance can be achieved by switching the modulation scheme. For example, a modulation scheme corresponding to a CQI index 6 in Table 10 is QPSK, indicating that when spectral efficiency is 1.1758, link performance of using the modulation scheme QPSK is better than that of using modulation schemes 16QAM and 64QAM. A modulation scheme corresponding to a CQI index 7 is 16QAM, indicating that when spectral efficiency is 1.4766, link performance of using the modulation scheme 16QAM is better than that of using the modulation schemes QPSK and 64QAM. That is, spectral efficiency corresponding to a switching point between QPSK and 16QAM ranges from 1.1758 to 1.4766.

In a new numerology with an SCS of 0.37 kHz introduced in the R16 WI, each RB includes 486 REs. However, in an existing numerology (for example, with an SCS of 15 kHz, 7.5 kHz, 2.5 kHz, or 1.25 kHz), each RB includes 144 REs. Therefore, a quantity of REs included in each RB in the new numerology is 3.375 times a quantity of REs included in each RB in the existing numerology. When the TBS is determined in the foregoing embodiment of this application, if a value of a used scale factor α is 3, the value is less than 3.375. For a same MCS index $I_{MCS}$ configured by a higher layer for the UE, a quantity of REs used by the new numerology whose SCS is 0.37 kHz is 3.375 times the quantity of REs used by the existing numerology, but the scale factor is 3, and the TBS is three times a TBS corresponding to the existing numerology, resulting in a case in which spectral efficiency corresponding to the new numerology whose SCS is 0.37 kHz is lower than spectral efficiency corresponding to the existing numerology. Consequently, link performance of the two modulation schemes is not switched at the switching point of the modulation scheme in the modulation and TBS index tables shown as Table 1 and Table 2. For example, $I_{TBS}$ of 15 and $I_{TBS}$ of 16 in Table 1 are a switching point between the modulation schemes 16QAM and 64QAM, and/or $I_{TBS}$ of 15 in Table 2 is a switching point between the modulation schemes 16QAM and 64QAM. However, when spectral efficiency is 2.7305, link performance of using the modulation scheme 64QAM is not higher than that of using the modulation scheme 16QAM.

Figure 12:
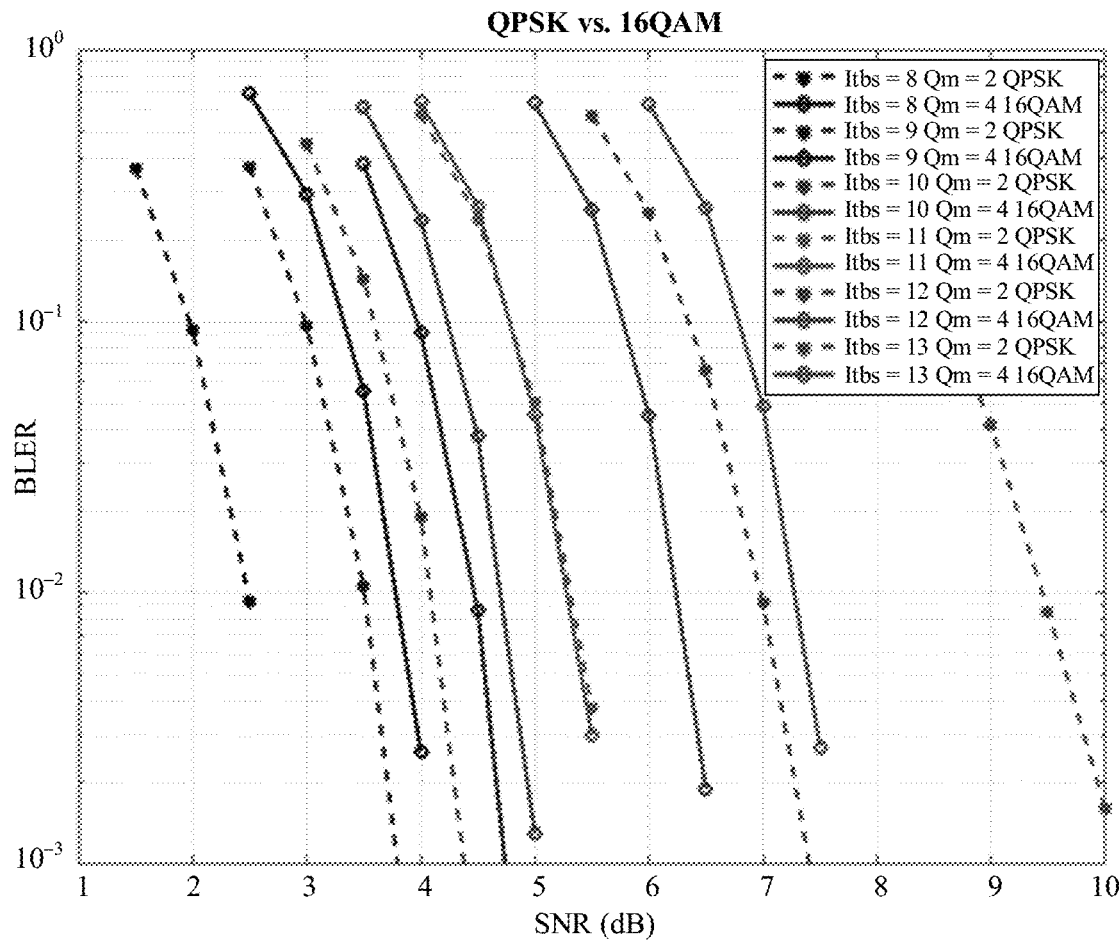
FIG. 12 is a schematic diagram of a link simulation result applicable to an embodiment of this application.

FIG. 12 shows link simulation results obtained when TBS indexes are different when UE separately uses two modulation schemes: QPSK and 16QAM. $I_{TBS}$ represents a TBS index, $Q_m$ represents a modulation order, a unit of a signal-to-noise ratio (signal noise ratio, SNR) is dB, a block error rate (block error rate, BLER), a dashed line represents a link simulation result of QPSK modulation, and a solid line represents a link simulation result of 16QAM modulation. When SNRs are the same, a higher BLER indicates lower link performance, and a lower BLER indicates higher link performance. With a same TBS index, spectral efficiency of QPSK and 16QAM is the same. That is, a code rate of QPSK is twice that of 16QAM. For the modulation and TBS index tables shown in Table 1 and/or Table 2, a switching point between QPSK and 16QAM modulation is a TBS index 9. That is, when a TBS index is 8, a same BLER (for example, 1%) is achieved, and an SNR (unit: dB) required by QPSK is lower. When a TBS index is 10, a same BLER (for example, 1%) is achieved, and an SNR (unit: dB) required by 16QAM is lower. When a TBS index is 9, a same BLER (for example, 1%) is achieved, and SNRs (unit: dB) required by QPSK and 16QAM are close. The simulation results shown in FIG. 12 show that when the TBS index is 9, an SNR required by QPSK modulation is 1 dB lower than that required by 16QAM modulation for a new numerology; when the TBS index is 10, an SNR required by QPSK modulation is 0.6 dB lower than that required by 16QAM modulation for a new numerology. Consequently, when the TBS index $I_{TBS}$ is 10, a used modulation scheme in the modulation and TBS index tables shown as the existing Table 1 and Table 2 is 16QAM, but performance of QPSK is better for the new numerology in this case. If the 16QAM modulation scheme is used according to Table 1 and Table 2, a success rate of demodulating a PMCH by the UE decreases, and a system throughput is limited.

Based on this, on the basis of the foregoing embodiments of this application, in this embodiment of this application, the modulation and TBS index tables shown as Table 1 and Table 2 are further adjusted. The UE determines an MCS index corresponding to the PMCH. The UE determines a third correspondence, where the third correspondence includes a correspondence between the MCS index, a modulation order, and a TBS index. The UE determines the modulation order and the TBS index based on the MCS index and the third correspondence. The UE determines, based on the TBS index, a TBS corresponding to the PMCH. A maximum modulation order included in the third correspondence is equal to 6, and a maximum TBS index corresponding to a modulation order 2 is greater than or equal to 10, and/or a maximum TBS index corresponding to a modulation order 4 is greater than or equal to 16; or a maximum modulation order included in the third correspondence is equal to 8, and a maximum TBS index corresponding to a modulation order 2 is greater than or equal to 9, and/or a maximum TBS index corresponding to a modulation order 4 is greater than or equal to 16, and/or a maximum TBS index corresponding to a modulation order 6 is greater than or equal to 25. In this way, a maximum TBS index corresponding to a modulation order is increased, and spectral efficiency determined based on the increased maximum TBS index is further improved, so that spectral efficiency corresponding to a switching point of switching a modulation scheme is also improved. Therefore, better link performance can be ensured when the modulation scheme is switched at the switching point, and a PMCH demodulation success rate of the UE can be increased, thereby increasing a system throughput.

Before the UE determines the third correspondence, the UE may further receive information that is about a maximum modulation order and that is sent by a network device.

For example, the information about the maximum modulation order may be a value of the maximum modulation order, and/or may be information about a modulation scheme corresponding to the maximum modulation order.

For another example, the information about the maximum modulation order is one bit. A value 0 of the one bit indicates that the maximum modulation order is 6, and a value 1 of the one bit indicates that the maximum modulation order is 8. Alternatively, a value 0 of the one bit indicates that the maximum modulation order is 8, and a value 1 of the one bit indicates that the maximum modulation order is 6.

For a case in which the maximum modulation order included in the third correspondence is equal to 6, that is, the QPSK, 16QAM, and 64QAM modulation schemes are supported in the third correspondence, UE that does not support the 256QAM modulation scheme and UE that supports the 256QAM modulation scheme both can use the third correspondence.

For a case in which the maximum modulation order included in the third correspondence is equal to 8, that is, the QPSK, 16QAM, 64QAM, and 256QAM modulation schemes are supported in the third correspondence, UE that supports the 256QAM modulation scheme may use the third correspondence.

Figure 13:
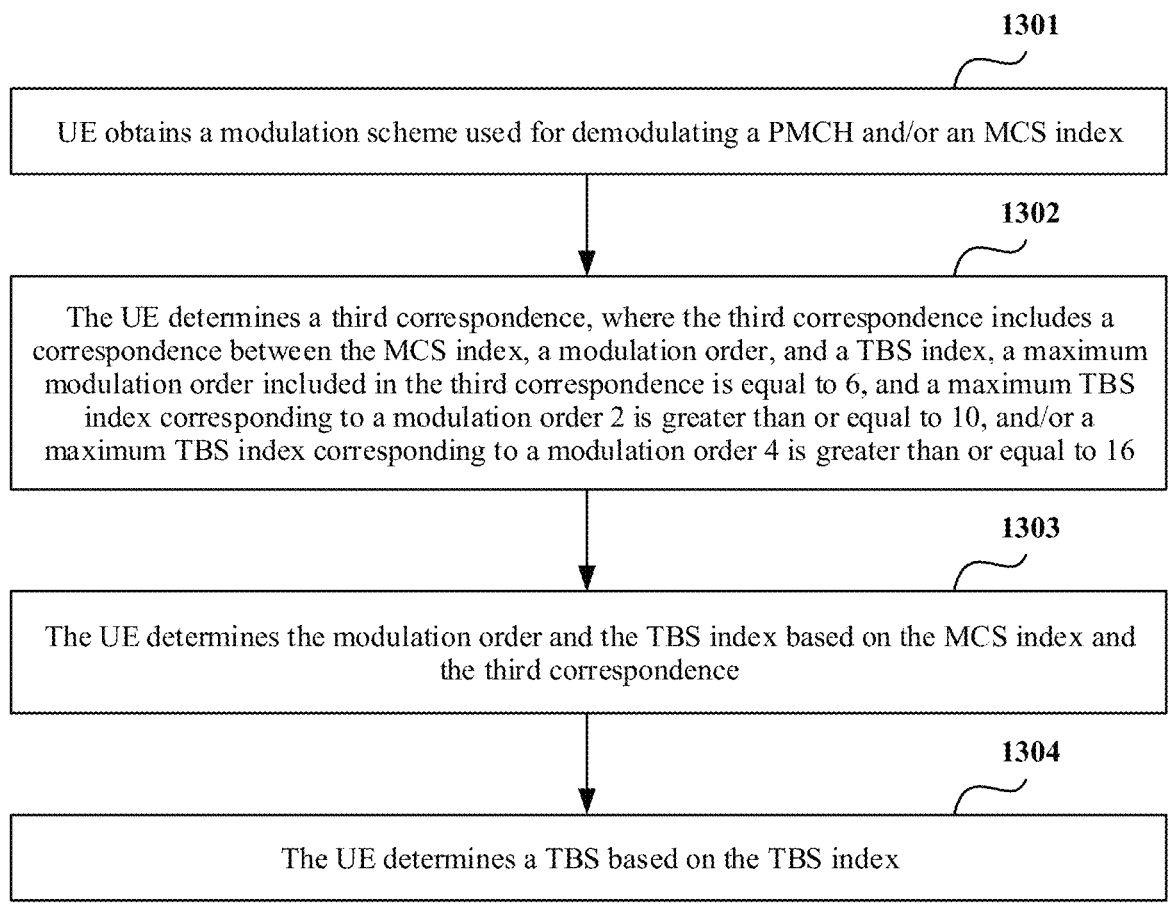
FIG. 13 is a schematic diagram of a TBS determining procedure applicable to an embodiment of this application.

For a case in which the maximum modulation order included in the third correspondence is equal to 6, that is, the QPSK, 16QAM, and 64QAM modulation schemes are supported in the third correspondence, refer to a TBS determining process shown in FIG. 13. The process includes the following steps:

Step 1301: UE obtains a modulation scheme used for demodulating a PMCH and/or an MCS index.

In step 1301, a network device may send the PMCH to the UE, where the PMCH carries information about a maximum modulation order and/or the MCS index, and the UE may demodulate the PMCH sent by the network device, and obtains the modulation scheme used for demodulating the PMCH and/or the MCS index.

Optionally, in addition to the PMCH, the UE may further use one or more of a physical broadcast channel (Physical Broadcast Channel, PBCH), a physical downlink shared channel (Physical Downlink Shared Channel, PDSCH), or a physical downlink control channel (Physical Downlink Control Channel, PDCCH) sent by the network device, to obtain the modulation scheme and/or the MCS index.

In step 1301, the modulation scheme used for demodulating the PMCH includes one or more of QPSK, 16QAM, or 64QAM, a modulation order corresponding to QPSK is 2, a modulation order corresponding to 16QAM is 4, and a modulation order corresponding to 64QAM is 6.

Optionally, a value range of the MCS index $I_{MCS}$ is an integer ranging from 0 to 28. In other words, $I_{MCS}$ is an integer greater than or equal to 0 and less than or equal to 28. In other words, the value range of $I_{MCS}$ is an integer in 0, 1, 2, . . . , and 28.

Step 1302: The UE determines a third correspondence, where the third correspondence includes a correspondence between the MCS index, a modulation order, and a TBS index, a maximum modulation order included in the third correspondence is equal to 6, and a maximum TBS index corresponding to a modulation order 2 is greater than or equal to 10, and/or a maximum TBS index corresponding to a modulation order 4 is greater than or equal to 16.

Optionally, the UE determines the third correspondence based on the obtained information about the maximum modulation order and/or the obtained modulation scheme. For example, if the UE determines, based on the information about the maximum modulation order carried in the PMCH, that an indicated maximum modulation order is 6, the UE determines that the third correspondence is a third correspondence including the maximum modulation order being equal to 6.

Step 1303: The UE determines the modulation order and the TBS index based on the MCS index and the third correspondence.

For example, the third correspondence is shown in Table 12. MCS Index represents an MCS index, Modulation Order represents a modulation order, and TBS index represents a TBS index. In Table 12, a maximum TBS index corresponding to the modulation order 2 is 11, and a maximum TBS index corresponding to the modulation order 4 is 15. In Table 12, when the MCS index is 10, a corresponding modulation order is 2, and a corresponding TBS index is 10; when the MCS index is 11, a corresponding modulation order is 2, and a corresponding TBS index is 11. When the MCS index is 0, a corresponding modulation order is 2, and a corresponding TBS index is 0. When the MCS index is 1, a corresponding modulation order is 2, and a corresponding TBS index is 1. When the MCS index is 2, a corresponding modulation order is 2, and a corresponding TBS index is 2. When the MCS index is 3, a corresponding modulation order is 2, and a corresponding TBS index is 3. When the MCS index is 4, a corresponding modulation order is 2, and a corresponding TBS index is 4. When the MCS index is 5, a corresponding modulation order is 2, and a corresponding TBS index is 5. When the MCS index is 6, a corresponding modulation order is 2, and a corresponding TBS index is 6. When the MCS index is 7, a corresponding modulation order is 2, and a corresponding TBS index is 7. When the MCS index is 8, a corresponding modulation order is 2, and a corresponding TBS index is 8. When the MCS index is 9, a corresponding modulation order is 2, and a corresponding TBS index is 9. When the MCS index is 12, a corresponding modulation order is 4, and a corresponding TBS index is 11. When the MCS index is 13, a corresponding modulation order is 4, and a corresponding TBS index is 12. When the MCS index is 14, a corresponding modulation order is 4, and a corresponding TBS index is 13. When the MCS index is 15, a corresponding modulation order is 4, and a corresponding TBS index is 14. When the MCS index is 16, a corresponding modulation order is 4, and a corresponding TBS index is 15. When the MCS index is 17, a corresponding modulation order is 6, and a corresponding TBS index is 15. When the MCS index is 18, a corresponding modulation order is 6, and a corresponding TBS index is 16. When the MCS index is 19, a corresponding modulation order is 6, and a corresponding TBS index is 17. When the MCS index is 20, a corresponding modulation order is 6, and a corresponding TBS index is 18. When the MCS index is 21, a corresponding modulation order is 6, and a corresponding TBS index is 19. When the MCS index is 22, a corresponding modulation order is 6, and a corresponding TBS index is 20. When the MCS index is 23, a corresponding modulation order is 6, and a corresponding TBS index is 21. When the MCS index is 24, a corresponding modulation order is 6, and a corresponding TBS index is 22. When the MCS index is 25, a corresponding modulation order is 6, and a corresponding TBS index is 23. When the MCS index is 26, a corresponding modulation order is 6, and a corresponding TBS index is 24. When the MCS index is 27, a corresponding modulation order is 6, and a corresponding TBS index is 25. When the MCS index is 28, a corresponding modulation order is 6, and a corresponding TBS index is at least one of 26 and 26A.

TABLE 12

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |

TABLE 12-continued

| MCS Index $I_{MCS}$ | Modulation Order $Q_m$ | TBS Index $I_{TBS}$ |
|---|---|---|
| 24 | 6 | 22 |
| 25 | 6 | 23 |
| 26 | 6 | 24 |
| 27 | 6 | 25 |
| 28 | 6 | 26/26A |
| 29 | 2 | Reserved |
| 30 | 4 | |
| 31 | 6 | |

For example, the third correspondence is shown in Table 13. MCS Index represents an MCS index, Modulation Order represents a modulation order, and TBS index represents a TBS index. In Table 13, a maximum TBS index corresponding to the modulation order 2 is 9, and a maximum TBS index corresponding to the modulation order 4 is 17. In Table 13, when the MCS index is 17, a corresponding modulation order is 4, and a corresponding TBS index is 16; when the MCS index is 18, a corresponding modulation order is 4, and a corresponding TBS index is 17. When the MCS index is 0, a corresponding modulation order is 2, and a corresponding TBS index is 0. When the MCS index is 1, a corresponding modulation order is 2, and a corresponding TBS index is 1. When the MCS index is 2, a corresponding modulation order is 2, and a corresponding TBS index is 2. When the MCS index is 3, a corresponding modulation order is 2, and a corresponding TBS index is 3. When the MCS index is 4, a corresponding modulation order is 2, and a corresponding TBS index is 4. When the MCS index is 5, a corresponding modulation order is 2, and a corresponding TBS index is 5. When the MCS index is 6, a corresponding modulation order is 2, and a corresponding TBS index is 6. When the MCS index is 7, a corresponding modulation order is 2, and a corresponding TBS index is 7. When the MCS index is 8, a corresponding modulation order is 2, and a corresponding TBS index is 8. When the MCS index is 9, a corresponding modulation order is 2, and a corresponding TBS index is 9. When the MCS index is 10, a corresponding modulation order is 4, and a corresponding TBS index is 9. When the MCS index is 11, a corresponding modulation order is 4, and a corresponding TBS index is 10. When the MCS index is 12, a corresponding modulation order is 4, and a corresponding TBS index is 11. When the MCS index is 13, a corresponding modulation order is 4, and a corresponding TBS index is 12. When the MCS index is 14, a corresponding modulation order is 4, and a corresponding TBS index is 13. When the MCS index is 15, a corresponding modulation order is 4, and a corresponding TBS index is 14. When the MCS index is 16, a corresponding modulation order is 4, and a corresponding TBS index is 15. When the MCS index is 19, a corresponding modulation order is 4, and a corresponding TBS index is 18. When the MCS index is 20, a corresponding modulation order is 4, and a corresponding TBS index is 19. When the MCS index is 21, a corresponding modulation order is 6, and a corresponding TBS index is 19. When the MCS index is 22, a corresponding modulation order is 6, and a corresponding TBS index is 20. When the MCS index is 23, a corresponding modulation order is 6, and a corresponding TBS index is 21. When the MCS index is 24, a corresponding modulation order is 6, and a corresponding TBS index is 22. When the MCS index is 25, a corresponding modulation order is 6, and a corresponding TBS index is 23. When the MCS index is 26, a corresponding modulation order is 6, and a corresponding TBS index is 24. When the MCS index is 27, a corresponding modulation order is 6, and a corresponding TBS index is 25. When the MCS index is 28, a corresponding modulation order is 6, and a corresponding TBS index is at least one of 26 and 26A.

TABLE 13

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | Reserved |
| 30 | 4 | |
| 31 | 6 | |

For example, the third correspondence is shown in Table 14. MCS Index represents an MCS index, Modulation Order represents a modulation order, and TBS index represents a TBS index. In Table 14, a maximum TBS index corresponding to the modulation order 2 is 9, and a maximum TBS index corresponding to the modulation order 4 is 19. In Table 14, when the MCS index is 17, a corresponding modulation order is 4, and a corresponding TBS index is 16; when the MCS index is 18, a corresponding modulation order is 4, and a corresponding TBS index is 17; when the MCS index is 19, a corresponding modulation order is 4, and a corresponding TBS index is 18; when the MCS index is 20, a corresponding modulation order is 4, and a corresponding TBS index is 19. When the MCS index is 0, a corresponding modulation order is 2, and a corresponding TBS index is 0. When the MCS index is 1, a corresponding modulation order is 2, and a corresponding TBS index is 1. When the MCS index is 2, a corresponding modulation order is 2, and a corresponding TBS index is 2. When the MCS index is 3, a corresponding modulation order is 2, and a corresponding TBS index is 3. When the MCS index is 4, a corresponding modulation order is 2, and a corresponding TBS index is 4. When the MCS index is 5, a corresponding modulation order is 2, and a corresponding TBS index is 5. When the MCS index is 6, a corresponding modulation order is 2, and a corresponding TBS index is 6. When the MCS index is 7, a corresponding modulation order is 2, and a corresponding TBS index is 7. When the MCS index is 8, a corresponding modulation order is 2, and a corresponding TBS index is 8. When the MCS index is 9, a corresponding modulation order is 2, and a corresponding TBS index is 9. When the MCS index is 10, a corresponding modulation order is 4, and a corresponding TBS index is 9. When the MCS index is 11, a corresponding modulation order is 4, and a corresponding TBS index is 10. When the MCS index is 12, a corresponding modulation order is 4, and a corresponding TBS index is 11. When the MCS index is 13, a corresponding modulation order is 4, and a corresponding TBS index is 12. When the MCS index is 14, a corresponding modulation order is 4, and a corresponding TBS index is 13. When the MCS index is 15, a corresponding modulation order is 4, and a corresponding TBS index is 14. When the MCS index is 16, a corresponding modulation order is 4, and a corresponding TBS index is 15. When the MCS index is 21, a corresponding modulation order is 6, and a corresponding TBS index is 19. When the MCS index is 22, a corresponding modulation order is 6, and a corresponding TBS index is 20. When the MCS index is 23, a corresponding modulation order is 6, and a corresponding TBS index is 21. When the MCS index is 24, a corresponding modulation order is 6, and a corresponding TBS index is 22. When the MCS index is 25, a corresponding modulation order is 6, and a corresponding TBS index is 23. When the MCS index is 26, a corresponding modulation order is 6, and a corresponding TBS index is 24. When the MCS index is 27, a corresponding modulation order is 6, and a corresponding TBS index is 25. When the MCS index is 28, a corresponding modulation order is 6, and a corresponding TBS index is at least one of 26 and 26A.

TABLE 14

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | Reserved |
| 30 | 4 | |
| 31 | 6 | |

For example, the third correspondence is shown in Table 15. MCS Index represents an MCS index, Modulation Order represents a modulation order, and TBS index represents a TBS index. In Table 15, a maximum TBS index corresponding to the modulation order 2 is 11, and a maximum TBS index corresponding to the modulation order 4 is 17. In Table 15, when the MCS index is 10, a corresponding modulation order is 2, and a corresponding TBS index is 10; when the MCS index is 11, a corresponding modulation order is 2, and a corresponding TBS index is 11; when the MCS index is 17, a corresponding modulation order is 4, and a corresponding TBS index is 16; when the MCS index is 18, a corresponding modulation order is 4, and a corresponding TBS index is 17. When the MCS index is 0, a corresponding modulation order is 2, and a corresponding TBS index is 0. When the MCS index is 1, a corresponding modulation order is 2, and a corresponding TBS index is 1. When the MCS index is 2, a corresponding modulation order is 2, and a corresponding TBS index is 2. When the MCS index is 3, a corresponding modulation order is 2, and a corresponding TBS index is 3. When the MCS index is 4, a corresponding modulation order is 2, and a corresponding TBS index is 4. When the MCS index is 5, a corresponding modulation order is 2, and a corresponding TBS index is 5. When the MCS index is 6, a corresponding modulation order is 2, and a corresponding TBS index is 6. When the MCS index is 7, a corresponding modulation order is 2, and a corresponding TBS index is 7. When the MCS index is 8, a corresponding modulation order is 2, and a corresponding TBS index is 8. When the MCS index is 9, a corresponding modulation order is 2, and a corresponding TBS index is 9. When the MCS index is 12, a corresponding modulation order is 4, and a corresponding TBS index is 11. When the MCS index is 13, a corresponding modulation order is 4, and a corresponding TBS index is 12. When the MCS index is 14, a corresponding modulation order is 4, and a corresponding TBS index is 13. When the MCS index is 15, a corresponding modulation order is 4, and a corresponding TBS index is 14. When the MCS index is 16, a corresponding modulation order is 4, and a corresponding TBS index is 15. When the MCS index is 19, a corresponding modulation order is 4, and a corresponding TBS index is 18. When the MCS index is 20, a corresponding modulation order is 4, and a corresponding TBS index is 19. When the MCS index is 21, a corresponding modulation order is 6, and a corresponding TBS index is 19. When the MCS index is 22, a corresponding modulation order is 6, and a corresponding TBS index is 20. When the MCS index is 23, a corresponding modulation order is 6, and a corresponding TBS index is 21. When the MCS index is 24, a corresponding modulation order is 6, and a corresponding TBS index is 22. When the MCS index is 25, a corresponding modulation order is 6, and a corresponding TBS index is 23. When the MCS index is 26, a corresponding modulation order is 6, and a corresponding TBS index is 24. When the MCS index is 27, a corresponding modulation order is 6, and a corresponding TBS index is 25. When the MCS index is 28, a corresponding modulation order is 6, and a corresponding TBS index is at least one of 26 and 26A.

TABLE 15

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |

TABLE 15-continued

| MCS Index $I_{MCS}$ | Modulation Order $Q_m$ | TBS Index $I_{TBS}$ |
| --- | --- | --- |
| 9 | 2 | 9 |
| 10 | 2 | 10 |
| 11 | 2 | 11 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | Reserved |
| 30 | 4 | |
| 31 | 6 | |

For example, the third correspondence is shown in Table 16. MCS Index represents an MCS index, Modulation Order represents a modulation order, and TBS index represents a TBS index. In Table 16, a maximum TBS index corresponding to the modulation order 2 is 11, and a maximum TBS index corresponding to the modulation order 4 is 19. In Table 16, when the MCS index is 10, a corresponding modulation order is 2, and a corresponding TBS index is 10; when the MCS index is 11, a corresponding modulation order is 2, and a corresponding TBS index is 11; when the MCS index is 17, a corresponding modulation order is 4, and a corresponding TBS index is 16; when the MCS index is 18, a corresponding modulation order is 4, and a corresponding TBS index is 17; when the MCS index is 19, a corresponding modulation order is 4, and a corresponding TBS index is 18; when the MCS index is 20, a corresponding modulation order is 4, and a corresponding TBS index is 19. When the MCS index is 0, a corresponding modulation order is 2, and a corresponding TBS index is 0. When the MCS index is 1, a corresponding modulation order is 2, and a corresponding TBS index is 1. When the MCS index is 2, a corresponding modulation order is 2, and a corresponding TBS index is 2. When the MCS index is 3, a corresponding modulation order is 2, and a corresponding TBS index is 3. When the MCS index is 4, a corresponding modulation order is 2, and a corresponding TBS index is 4. When the MCS index is 5, a corresponding modulation order is 2, and a corresponding TBS index is 5. When the MCS index is 6, a corresponding modulation order is 2, and a corresponding TBS index is 6. When the MCS index is 7, a corresponding modulation order is 2, and a corresponding TBS index is 7. When the MCS index is 8, a corresponding modulation order is 2, and a corresponding TBS index is 8. When the MCS index is 9, a corresponding modulation order is 2, and a corresponding TBS index is 9. When the MCS index is 12, a corresponding modulation order is 4, and a corresponding TBS index is 11. When the MCS index is 13, a corresponding modulation order is 4, and a corresponding TBS index is 12. When the MCS index is 14, a corresponding modulation order is 4, and a corresponding TBS index is 13. When the MCS index is 15, a corresponding modulation order is 4, and a corresponding TBS index is 14. When the MCS index is 16, a corresponding modulation order is 4, and a corresponding TBS index is 15. When the MCS index is 21, a corresponding modulation order is 6, and a corresponding TBS index is 19. When the MCS index is 22, a corresponding modulation order is 6, and a corresponding TBS index is 20. When the MCS index is 23, a corresponding modulation order is 6, and a corresponding TBS index is 21. When the MCS index is 24, a corresponding modulation order is 6, and a corresponding TBS index is 22. When the MCS index is 25, a corresponding modulation order is 6, and a corresponding TBS index is 23. When the MCS index is 26, a corresponding modulation order is 6, and a corresponding TBS index is 24. When the MCS index is 27, a corresponding modulation order is 6, and a corresponding TBS index is 25. When the MCS index is 28, a corresponding modulation order is 6, and a corresponding TBS index is at least one of 26 and 26A.

TABLE 16

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | Reserved |
| 30 | 4 | |
| 31 | 6 | |

Step 1304: The UE determines a TBS based on the TBS index.

For a process of determining the TBS based on the TBS index in step 1304, refer to the TBS determining process in the foregoing embodiment. Repeated parts are not described again.

Figure 14:
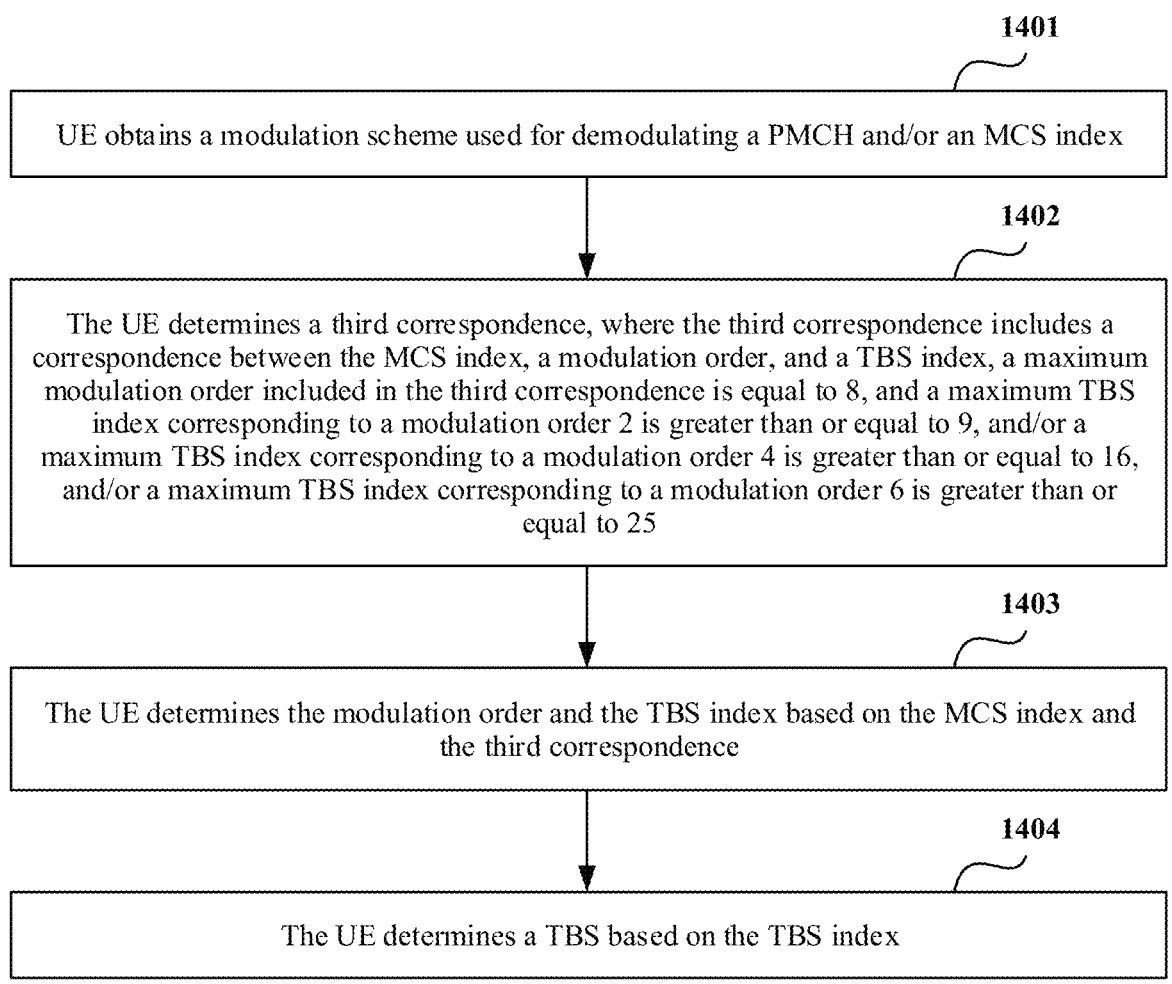
FIG. 14 is a schematic diagram of a TBS determining procedure applicable to an embodiment of this application.

For a case in which the maximum modulation order included in the third correspondence is equal to 8, that is, the QPSK, 16QAM, 64QAM, and 256QAM modulation schemes are supported in the third correspondence, refer to a TBS determining process shown in FIG. 14. The process includes the following steps:

Step 1401: UE obtains a modulation scheme used for demodulating a PMCH and/or an MCS index.

In step 1401, a network device may send the PMCH to the UE, where the PMCH carries information about a maximum modulation order and/or the MCS index, and the UE may demodulate a channel signal sent by the network device, and obtains the modulation scheme used for demodulating the PMCH and/or the MCS index.

Optionally, the channel signal sent by the network device includes one or more of the following: the PMCH, a physical broadcast channel (Physical Broadcast Channel, PBCH), a physical downlink shared channel (Physical Downlink Shared Channel, PDSCH), or a physical downlink control channel (Physical Downlink Control Channel, PDCCH).

In step 1401, the modulation scheme used for demodulating the PMCH includes one or more of QPSK, 16QAM, 64QAM, or 256QAM, a modulation order corresponding to QPSK is 2, a modulation order corresponding to 16QAM is 4, a modulation order corresponding to 64QAM is 6, and a modulation order corresponding to 256QAM is 8.

Optionally, a value range of the MCS index $I_{MCS}$ is an integer ranging from 0 to 27. In other words, $I_{MCS}$ is an integer greater than or equal to 0 and less than or equal to 27. In other words, the value range of $I_{MCS}$ is an integer in 0, 1, 2, ..., and 27.

Step 1402: The UE determines a third correspondence, where the third correspondence includes a correspondence between the MCS index, a modulation order, and a TBS index, a maximum modulation order included in the third correspondence is equal to 8, and a maximum TBS index corresponding to a modulation order 2 is greater than or equal to 9, and/or a maximum TBS index corresponding to a modulation order 4 is greater than or equal to 16, and/or a maximum TBS index corresponding to a modulation order 6 is greater than or equal to 25.

Optionally, the UE determines the third correspondence based on the obtained information about the maximum modulation order and/or the obtained modulation scheme. For example, if the UE determines, based on the information about the maximum modulation order carried in the PMCH, that an indicated maximum modulation order is 8, the UE determines that the third correspondence is a third correspondence including the maximum modulation order being equal to 8.

Step 1403: The UE determines the modulation order and the TBS index based on the MCS index and the third correspondence.

For example, the third correspondence is shown in Table 17. MCS Index represents an MCS index, Modulation Order represents a modulation order, and TBS index represents a TBS index. In Table 17, a maximum TBS index corresponding to the modulation order 2 is one of 8, 10, and 11, and/or a maximum TBS index corresponding to the modulation order 4 is one of 15, 16, 17, 18, and 19, and/or a maximum TBS index corresponding to the modulation order 6 is one of 24, 25, and 27. In Table 17, when the MCS index is 5, a corresponding modulation order is A1, and a corresponding TBS index is 10; when the MCS index is 6, a corresponding modulation order is A2, and a corresponding TBS index is 11; when the MCS index is 11, a corresponding modulation order is A3, and a corresponding TBS index is 16; when the MCS index is 12, a corresponding modulation order is A4, and a corresponding TBS index is 17; when the MCS index is 13, a corresponding modulation order is A5, and a corresponding TBS index is 18; when the MCS index is 14, a corresponding modulation order is A6, and a corresponding TBS index is 19; when the MCS index is 20, a corresponding modulation order is A7, and a corresponding TBS index is 25; when the MCS index is 21, a corresponding modulation order is A8, and a corresponding TBS index is 27. When the MCS index is 0, a corresponding modulation order is 2, and a corresponding TBS index is 0. When the MCS index is 1, a corresponding modulation order is 2, and a corresponding TBS index is 2. When the MCS index is 2, a corresponding modulation order is 2, and a corresponding TBS index is 4. When the MCS index is 3, a corresponding modulation order is 2, and a corresponding TBS index is 6. When the MCS index is 4, a corresponding modulation order is 2, and a corresponding TBS index is 8. When the MCS index is 7, a corresponding modulation order is 4, and a corresponding TBS index is 12. When the MCS index is 8, a corresponding modulation order is 4, and a corresponding TBS index is 13. When the MCS index is 9, a corresponding modulation order is 4, and a corresponding TBS index is 14. When the MCS index is 10, a corresponding modulation order is 4, and a corresponding TBS index is 15. When the MCS index is 15, a corresponding modulation order is 6, and a corresponding TBS index is 20. When the MCS index is 16, a corresponding modulation order is 6, and a corresponding TBS index is 21. When the MCS index is 17, a corresponding modulation order is 6, and a corresponding TBS index is 22. When the MCS index is 18, a corresponding modulation order is 6, and a corresponding TBS index is 23. When the MCS index is 19, a corresponding modulation order is 6, and a corresponding TBS index is 24. When the MCS index is 22, a corresponding modulation order is 8, and a corresponding TBS index is 28. When the MCS index is 23, a corresponding modulation order is 8, and a corresponding TBS index is 29. When the MCS index is 24, a corresponding modulation order is 8, and a corresponding TBS index is 30. When the MCS index is 25, a corresponding modulation order is 8, and a corresponding TBS index is 31. When the MCS index is 26, a corresponding modulation order is 8, and a corresponding TBS index is 32. When the MCS index is 27, a corresponding modulation order is 8, and a corresponding TBS index is at least one of 33, 33A, and 33B.

TABLE 17

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | A1 | 10 |
| 6 | A2 | 11 |
| 7 | 4 | 12 |
| 8 | 4 | 13 |
| 9 | 4 | 14 |
| 10 | 4 | 15 |
| 11 | A3 | 16 |
| 12 | A4 | 17 |
| 13 | A5 | 18 |
| 14 | A6 | 19 |
| 15 | 6 | 20 |
| 16 | 6 | 21 |
| 17 | 6 | 22 |
| 18 | 6 | 23 |
| 19 | 6 | 24 |
| 20 | A7 | 25 |
| 21 | A8 | 27 |
| 22 | 8 | 28 |
| 23 | 8 | 29 |
| 24 | 8 | 30 |
| 25 | 8 | 31 |
| 26 | 8 | 32 |
| 27 | 8 | 33/33A/33B |
| 28 | 2 | Reserved |
| 29 | 4 | |
| 30 | 6 | |
| 31 | 8 | |

Values of the modulation orders {A1, A2, A3, A4, A5, A6, A7, A8} in Table 17 are at least one combination in Table 18. Table 18 shows 44 combinations, that is, the values of the modulation orders {A1, A2, A3, A4, A5, A6, A7, A8} in Table 17 are in a one-to-one correspondence with at least one combination in 44 arrays {2, 2, 4, 4, 4, 4, 6, 6}, {2, 2, 4, 4, 4, 4, 6, 8}, {2, 2, 4, 4, 4, 4, 8, 8}, {2, 2, 4, 4, 4, 6, 6, 6}, {2, 2, 4, 4, 4, 6, 6, 8}, {2, 2, 4, 4, 4, 6, 8, 8}, {2, 2, 4, 4, 6, 6, 6, 6}, {2, 2, 4, 4, 6, 6, 6, 8}, {2, 2, 4, 4, 6, 6, 8, 8}, {2, 2, 4, 6, 6, 6, 6, 6}, {2, 2, 4, 6, 6, 6, 6, 8}, {2, 2, 4, 6, 6, 6, 8, 8}, {2, 2, 6, 6, 6, 6, 6, 6}, {2, 2, 6, 6, 6, 6, 6, 8}, {2, 2, 6, 6, 6, 6, 8, 8}, {2, 4, 4, 4, 4, 4, 6, 6}, {2, 4, 4, 4, 4, 4, 6, 8}, {2, 4, 4, 4, 4, 4, 8, 8}, {2, 4, 4, 4, 4, 6, 6, 6}, {2, 4, 4, 4, 4, 6, 6, 8}, {2, 4, 4, 4, 4, 6, 8, 8}, {2, 4, 4, 4, 6, 6, 6, 6}, {2, 4, 4, 4, 6, 6, 6, 8}, {2, 4, 4, 4, 6, 6, 8, 8}, {2, 4, 4, 6, 6, 6, 6, 6}, {2, 4, 4, 6, 6, 6, 6, 8}, {2, 4, 4, 6, 6, 6, 8, 8}, {2, 4, 6, 6, 6, 6, 6, 6}, {2, 4, 6, 6, 6, 6, 6, 8}, {2, 4, 6, 6, 6, 6, 8, 8}, {4, 4, 4, 4, 4, 4, 6, 6}, {4, 4, 4, 4, 4, 4, 6, 8}, {4, 4, 4, 4, 4, 4, 8, 8}, {4, 4, 4, 4, 4, 6, 6, 6}, {4, 4, 4, 4, 4, 6, 6, 8}, {4, 4, 4, 4, 4, 6, 8, 8}, {4, 4, 4, 4, 6, 6, 6, 6}, {4, 4, 4, 4, 6, 6, 6, 8}, {4, 4, 4, 4, 6, 6, 8, 8}, {4, 4, 4, 6, 6, 6, 6, 6}, {4, 4, 4, 6, 6, 6, 6, 8}, {4, 4, 4, 6, 6, 6, 8, 8}, {4, 4, 6, 6, 6, 6, 6, 6}, and {4, 4, 6, 6, 6, 6, 6, 8} shown in Table 18.

TABLE 18

| Sequence number | A1 | A2 | A3 | A4 | A5 | A6 | A7 | A8 |
|---|---|---|---|---|---|---|---|---|
| 1 | 2 | 2 | 4 | 4 | 4 | 4 | 6 | 6 |
| 2 | 2 | 2 | 4 | 4 | 4 | 4 | 6 | 8 |
| 3 | 2 | 2 | 4 | 4 | 4 | 4 | 8 | 8 |
| 4 | 2 | 2 | 4 | 4 | 4 | 6 | 6 | 6 |
| 5 | 2 | 2 | 4 | 4 | 4 | 6 | 6 | 8 |
| 6 | 2 | 2 | 4 | 4 | 4 | 6 | 8 | 8 |
| 7 | 2 | 2 | 4 | 4 | 6 | 6 | 6 | 6 |
| 8 | 2 | 2 | 4 | 4 | 6 | 6 | 6 | 8 |
| 9 | 2 | 2 | 4 | 4 | 6 | 6 | 8 | 8 |
| 10 | 2 | 2 | 4 | 6 | 6 | 6 | 6 | 6 |
| 11 | 2 | 2 | 4 | 6 | 6 | 6 | 6 | 8 |
| 12 | 2 | 2 | 4 | 6 | 6 | 6 | 8 | 8 |
| 13 | 2 | 2 | 6 | 6 | 6 | 6 | 6 | 6 |
| 14 | 2 | 2 | 6 | 6 | 6 | 6 | 6 | 8 |
| 15 | 2 | 2 | 6 | 6 | 6 | 6 | 8 | 8 |
| 16 | 2 | 4 | 4 | 4 | 4 | 4 | 6 | 6 |
| 17 | 2 | 4 | 4 | 4 | 4 | 4 | 6 | 8 |
| 18 | 2 | 4 | 4 | 4 | 4 | 4 | 8 | 8 |
| 19 | 2 | 4 | 4 | 4 | 4 | 6 | 6 | 6 |
| 20 | 2 | 4 | 4 | 4 | 4 | 6 | 6 | 8 |
| 21 | 2 | 4 | 4 | 4 | 4 | 6 | 8 | 8 |
| 22 | 2 | 4 | 4 | 4 | 6 | 6 | 6 | 6 |
| 23 | 2 | 4 | 4 | 4 | 6 | 6 | 6 | 8 |
| 24 | 2 | 4 | 4 | 4 | 6 | 6 | 8 | 8 |
| 25 | 2 | 4 | 4 | 6 | 6 | 6 | 6 | 6 |
| 26 | 2 | 4 | 4 | 6 | 6 | 6 | 6 | 8 |
| 27 | 2 | 4 | 4 | 6 | 6 | 6 | 8 | 8 |
| 28 | 2 | 4 | 6 | 6 | 6 | 6 | 6 | 6 |
| 29 | 2 | 4 | 6 | 6 | 6 | 6 | 6 | 8 |
| 30 | 2 | 4 | 6 | 6 | 6 | 6 | 8 | 8 |
| 31 | 4 | 4 | 4 | 4 | 4 | 4 | 6 | 6 |
| 32 | 4 | 4 | 4 | 4 | 4 | 4 | 6 | 8 |
| 33 | 4 | 4 | 4 | 4 | 4 | 4 | 8 | 8 |
| 34 | 4 | 4 | 4 | 4 | 4 | 6 | 6 | 6 |
| 35 | 4 | 4 | 4 | 4 | 4 | 6 | 6 | 8 |
| 36 | 4 | 4 | 4 | 4 | 4 | 6 | 8 | 8 |
| 37 | 4 | 4 | 4 | 4 | 6 | 6 | 6 | 6 |
| 38 | 4 | 4 | 4 | 4 | 6 | 6 | 6 | 8 |
| 39 | 4 | 4 | 4 | 4 | 6 | 6 | 8 | 8 |
| 40 | 4 | 4 | 4 | 6 | 6 | 6 | 6 | 6 |
| 41 | 4 | 4 | 4 | 6 | 6 | 6 | 6 | 8 |
| 42 | 4 | 4 | 4 | 6 | 6 | 6 | 8 | 8 |
| 43 | 4 | 4 | 6 | 6 | 6 | 6 | 6 | 6 |
| 44 | 4 | 4 | 6 | 6 | 6 | 6 | 6 | 8 |

For example, values of the modulation orders {A1, A2, A3, A4, A5, A6, A7, A8} in Table 17 are in a one-to-one correspondence with values in {2, 2, 4, 4, 4, 4, 6, 8}. The third correspondence is specifically shown in Table 19. MCS Index represents an MCS index, Modulation Order represents a modulation order, and TBS index represents a TBS index. In Table 19, a maximum TBS index corresponding to the modulation order 2 is 11, a maximum TBS index corresponding to the modulation order 4 is 19, and a maximum TBS index corresponding to the modulation order 6 is 25. In Table 19, when the MCS index is 5, a corresponding modulation order is 2, and a corresponding TBS index is 10; when the MCS index is 6, a corresponding modulation order is 2, and a corresponding TBS index is 11; when the MCS index is 11, a corresponding modulation order is 4, and a corresponding TBS index is 16; when the MCS index is 12, a corresponding modulation order is 4, and a corresponding TBS index is 17; when the MCS index is 13, a corresponding modulation order is 4, and a corresponding TBS index is 18; when the MCS index is 14, a corresponding modulation order is 4, and a corresponding TBS index is 19; when the MCS index is 20, a corresponding modulation order is 6, and a corresponding TBS index is 25; when the MCS index is 21, a corresponding modulation order is 8, and a corresponding TBS index is 27. When the MCS index is 0, a corresponding modulation order is 2, and a corresponding TBS index is 0. When the MCS index is 1, a corresponding modulation order is 2, and a corresponding TBS index is 2. When the MCS index is 2, a corresponding modulation order is 2, and a corresponding TBS index is 4. When the MCS index is 3, a corresponding modulation order is 2, and a corresponding TBS index is 6. When the MCS index is 4, a corresponding modulation order is 2, and a corresponding TBS index is 8. When the MCS index is 7, a corresponding modulation order is 4, and a corresponding TBS index is 12. When the MCS index is 8, a corresponding modulation order is 4, and a corresponding TBS index is 13. When the MCS index is 9, a corresponding modulation order is 4, and a corresponding TBS index is 14. When the MCS index is 10, a corresponding modulation order is 4, and a corresponding TBS index is 15. When the MCS index is 15, a corresponding modulation order is 6, and a corresponding TBS index is 20. When the MCS index is 16, a corresponding modulation order is 6, and a corresponding TBS index is 21. When the MCS index is 17, a corresponding modulation order is 6, and a corresponding TBS index is 22. When the MCS index is 18, a corresponding modulation order is 6, and a corresponding TBS index is 23. When the MCS index is 19, a corresponding modulation order is 6, and a corresponding TBS index is 24. When the MCS index is 22, a corresponding modulation order is 8, and a corresponding TBS index is 28. When the MCS index is 23, a corresponding modulation order is 8, and a corresponding TBS index is 29. When the MCS index is 24, a corresponding modulation order is 8, and a corresponding TBS index is 30. When the MCS index is 25, a corresponding modulation order is 8, and a corresponding TBS index is 31. When the MCS index is 26, a corresponding modulation order is 8, and a corresponding TBS index is 32. When the MCS index is 27, a corresponding modulation order is 8, and a corresponding TBS index is at least one of 33, 33A, and 33B.

TABLE 19

| MCS Index $I_{MCS}$ | Modulation Order $Q_m$ | TBS Index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 2 | 10 |
| 6 | 2 | 11 |
| 7 | 4 | 12 |
| 8 | 4 | 13 |
| 9 | 4 | 14 |
| 10 | 4 | 15 |
| 11 | 4 | 16 |
| 12 | 4 | 17 |
| 13 | 4 | 18 |
| 14 | 4 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33/33A/33B |
| 28 | 2 | Reserved |
| 29 | 4 | |
| 30 | 6 | |
| 31 | 8 | |

Step 1404: The UE determines a TBS based on the TBS index.

For a process of determining the TBS based on the TBS index in step 1404, refer to the TBS determining process in the foregoing embodiment. Repeated parts are not described again.

Figure 15:
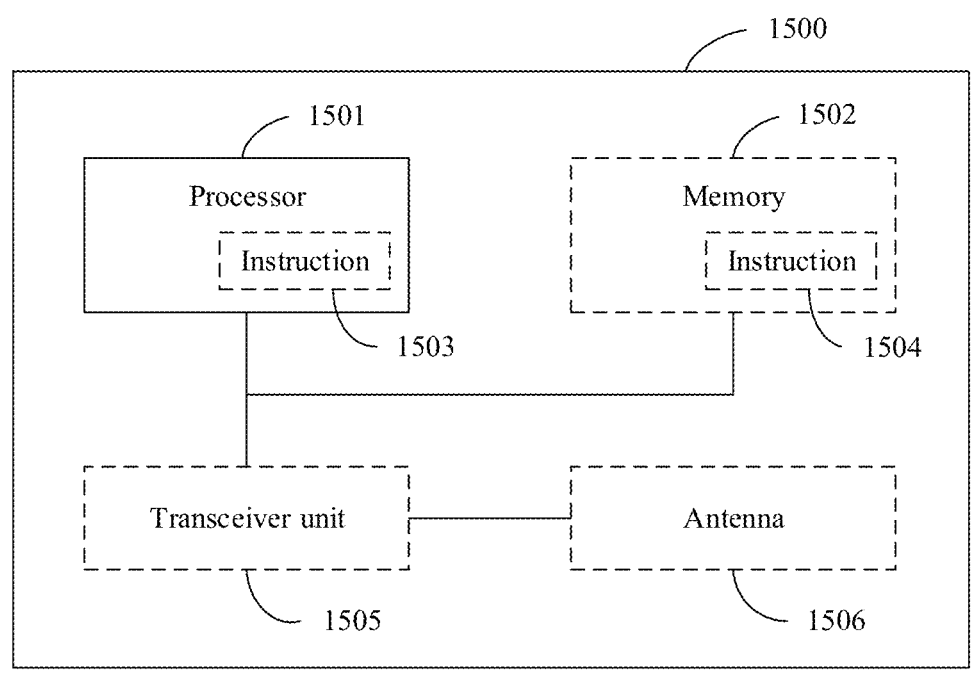
FIG. 15 is a structural diagram of a TBS determining apparatus applicable to an embodiment of this application.

The TBS determining method in the embodiments of this application is described in detail above with reference to FIG. 4 to FIG. 14. Based on a same inventive concept as that of the foregoing TBS determining method, as shown in FIG. 15, this application further provides a schematic structural diagram of a TBS determining apparatus. The apparatus 1500 may be configured to implement the method described in the foregoing method embodiments applied to the communication device. For details, refer to the specification of the foregoing method embodiments. The apparatus 1500 may be located in a communication device or may be the communication device.

The apparatus 1500 includes one or more processors 1501. The processor 1501 may be a general-purpose processor, a dedicated processor, or the like. For example, the processor 1501 may be a baseband processor or a central processing unit. The baseband processor may be configured to process a communication protocol and communication data. The central processing unit may be configured to control a communication apparatus (for example, a base station, a terminal, or a chip), execute a software program, and process data of the software program. The communication apparatus may include a transceiver unit, configured to input (receive) and output (send) a signal. For example, the transceiver unit may be a transceiver, a radio frequency chip, or the like.

The apparatus 1500 includes one or more processors 1501, and the one or more processors 1501 may implement the method of the communication device in the foregoing embodiments.

Optionally, in a design, the processor 1501 may execute instructions, to enable the apparatus 1500 to perform the method described in the foregoing method embodiments. All or some of the instructions, for example, an instruction 1503, may be stored in the processor. Alternatively, all or some of the instructions, for example, an instruction 1504, may be stored in the memory 1502 coupled to the processor. Alternatively, instructions 1503 and 1504 may be used together to enable the apparatus 1500 to perform the method described in the foregoing method embodiments.

In still another possible design, the communication apparatus 1500 may alternatively include a circuit, and the circuit may implement a function of the communication device in the foregoing method embodiments.

In still another possible design, the apparatus 1500 may include one or more memories 1502, storing an instruction 1504, and the instruction may be run on the processor, to enable the apparatus 1500 to perform the method described in the foregoing method embodiments. Optionally, the memory may further store data. Optionally, the processor may further store instructions and/or data. For example, the one or more memories 1502 may store the correspondence described in the foregoing embodiments, or the related parameter, the related table, or the like in the foregoing embodiments. The processor and the memory may be separately disposed, or may be integrated together.

In another possible design, the apparatus 1500 may further include a transceiver unit 1505 and an antenna 1506. The processor 1501 may be referred to as a processing unit, to control an apparatus (a terminal or a base station). The transceiver unit 1505 may be referred to as a transceiver machine, a transceiver circuit, a transceiver, or the like, and is configured to implement a transceiver function of the apparatus by using the antenna 1506.

It should be noted that, the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware in the decoding processor and software modules. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor.

It may be understood that the memory in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

An embodiment of this application further provides a computer-readable medium, where the computer-readable medium stores a computer program; and when the computer program is executed by a computer, the TBS determining method in any method embodiment applied to the communication device is implemented.

An embodiment of this application further provides a computer program product. When the computer program product is executed by a computer, the TBS determining method in any method embodiment applied to the communication device is implemented.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc, DVD)), a semiconductor medium (for example, a solid-state disk (Solid State Disk, SSD)), or the like.

An embodiment of this application further provides a processing apparatus, including a processor and an interface, where the processor is configured to perform the TBS determining method according to any method embodiment applied to the communication device.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general-purpose processor. The general-purpose processor is implemented by reading software code stored in a memory. The memory may be integrated into the processor, or may be located outside the processor and exist independently.

A person of ordinary skill in the art may be aware that, the units and algorithm steps in the examples described with reference to the embodiments disclosed in this specification may be implemented by electronic hardware, computer software, or a combination thereof. To clearly describe interchangeability between the hardware and the software, the foregoing has generally described compositions and steps of each example based on functions. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed in a plurality of network units. Some or all of the units may be selected based on an actual requirement to achieve the objectives of the solutions of the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL), or wireless technologies such as infrared, radio, and microwave, the coaxial cable, the optical fiber/cable, the twisted pair, the DSL, or the wireless technologies such as infrared, radio, and microwave are included in fixation of a medium to which they belong. A disk (Disk) and a disc (disc) that are used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination shall also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A transport block size (TBS) determining method, comprising:
   receiving, by a communication device, a maximum modulation order;
   determining, by the communication device, a modulation and coding scheme (MCS) index;
   determining, by the communication device, a third correspondence, wherein the third correspondence comprises a correspondence between the MCS index, a modulation order, and a first TBS index;
   determining, by the communication device, the modulation order and the first TBS index based on the MCS index and the third correspondence;
   wherein a maximum modulation order in the third correspondence is equal to 6, a maximum TBS index corresponding to a modulation order 2 is equal to 10, and a maximum TBS index corresponding to a modulation order 4 is greater than or equal to 19; or
   wherein the maximum modulation order in the third correspondence is equal to 8, a maximum TBS index corresponding to a modulation order 2 is equal to 10, a maximum TBS index corresponding to a modulation order 4 is equal to 19, and a maximum TBS index corresponding to a modulation order 6 is equal to 25;
   determining, by the communication device, an intermediate variable based on the first TBS index, a frequency domain resource occupied by a first broadcast channel, and a second table, wherein the second table comprises a correspondence between the frequency domain resource, the first TBS index, and the intermediate variable; and determining, by the communication device, a TBS corresponding to the first broadcast channel based on the intermediate variable and a first scale factor, wherein the first scale factor is greater than 1.

2. The method according to claim 1, wherein a time domain resource occupied by a cyclic prefix (CP) corresponding to the first broadcast channel is not less than 300 microseconds.

3. The method according to claim 1, wherein a time domain resource occupied by an Orthogonal Frequency Division Multiplexing (OFDM) symbol corresponding to the first broadcast channel is not less than 2.4 milliseconds.

4. The method according to claim 1, wherein a subcarrier spacing (SCS) corresponding to the first broadcast channel is not greater than 417 hertz.

5. The method according to claim 1, wherein the first scale factor is 3.

6. A transport block size (TBS) determining apparatus, comprising:
at least one processor; and
a memory coupled to the at least one processor and storing programming instructions for execution by the at least one processor to perform operations comprising:
receiving a maximum modulation order;
determining a modulation and coding scheme (MCS) index;
determining a third correspondence, wherein the third correspondence comprises a correspondence between the MCS index, a modulation order, and a first TBS index;
determining the modulation order and the first TBS index based on the MCS index and the third correspondence;
wherein a maximum modulation order in the third correspondence is equal to 6, a maximum TBS index corresponding to a modulation order 2 is equal to 10, and a maximum TBS index corresponding to a modulation order 4 is greater than or equal to 19; or
wherein the maximum modulation order in the third correspondence is equal to 8, a maximum TBS index corresponding to a modulation order 2 is equal to 10, a maximum TBS index corresponding to a modulation order 4 is equal to 19, and a maximum TBS index corresponding to a modulation order 6 is equal to 25;
determining an intermediate variable based on the first TBS index, a frequency domain resource occupied by a first broadcast channel, and a second table, wherein the second table comprises a correspondence between the frequency domain resource, the first TBS index, and the intermediate variable; and
determining a TBS corresponding to the first broadcast channel based on the intermediate variable and a first scale factor, wherein the first scale factor is greater than 1.

7. The apparatus according to claim 6, wherein a time domain resource occupied by a cyclic prefix (CP) corresponding to the first broadcast channel is not less than 300 microseconds.

8. The apparatus according to claim 6, wherein a time domain resource occupied by an Orthogonal Frequency Division Multiplexing (OFDM) symbol corresponding to the first broadcast channel is not less than 2.4 milliseconds.

9. The apparatus according to claim 6, wherein a subcarrier spacing (SCS) corresponding to the first broadcast channel is not greater than 417 hertz.

10. The apparatus according to claim 6, wherein the first scale factor is 3.

11. A non-transitory computer-readable storage medium comprising instructions which, when executed by one or more processors, cause the one or more processors to perform operations comprising:
receiving a maximum modulation order;
determining a modulation and coding scheme (MCS) index;
determining a third correspondence, wherein the third correspondence comprises a correspondence between the MCS index, a modulation order, and a first TBS index;
determining the modulation order and the first TBS index based on the MCS index and the third correspondence;
wherein a maximum modulation order in the third correspondence is equal to 6, a maximum TBS index corresponding to a modulation order 2 is equal to 10, and a maximum TBS index corresponding to a modulation order 4 is greater than or equal to 19; or
wherein the maximum modulation order in the third correspondence is equal to 8, a maximum TBS index corresponding to a modulation order 2 is equal to 10, a maximum TBS index corresponding to a modulation order 4 is equal to 19, and a maximum TBS index corresponding to a modulation order 6 is equal to 25;
determining an intermediate variable based on the first TBS index, a frequency domain resource occupied by a first broadcast channel, and a second table, wherein the second table comprises a correspondence between the frequency domain resource, the first TBS index, and the intermediate variable; and
determining a TBS corresponding to the first broadcast channel based on the intermediate variable and a first scale factor, wherein the first scale factor is greater than 1.

12. The non-transitory computer-readable storage medium according to claim 11, wherein a time domain resource occupied by a cyclic prefix (CP) corresponding to the first broadcast channel is not less than 300 microseconds, a time domain resource occupied by an Orthogonal Frequency Division Multiplexing (OFDM) symbol corresponding to the first broadcast channel is not less than 2.4 milliseconds, or a subcarrier spacing (SCS) corresponding to the first broadcast channel is not greater than 417 hertz.

13. The non-transitory computer-readable storage medium according to claim 11, wherein the first scale factor is 3.

* * * * *

UNITED STATES PATENT AND TRADEMARK OFFICE
CERTIFICATE OF CORRECTION

| | |
|---|---|
| PATENT NO. | : 12,081,326 B2 |
| APPLICATION NO. | : 17/489327 |
| DATED | : September 3, 2024 |
| INVENTOR(S) | : Hongjian Yang et al. |

Page 1 of 1

It is certified that error appears in the above-identified patent and that said Letters Patent is hereby corrected as shown below:

On the Title Page

Item [30], In Line 1, Delete "(WO)" and insert -- (CN) --.

Item [30], In Line 2, Delete "(WO)" and insert -- (CN) --.

Signed and Sealed this
Twenty-fourth Day of December, 2024

Derrick Brent
*Acting Director of the United States Patent and Trademark Office*